United States Patent
Gulati et al.

(10) Patent No.: US 10,263,790 B2
(45) Date of Patent: *Apr. 16, 2019

(54) UNIFIED PROGRAMMING ENVIRONMENT FOR PROGRAMMABLE DEVICES

(71) Applicant: Data I/O Corporation, Redmond, WA (US)

(72) Inventors: Rajeev Gulati, Sammamish, WA (US); David R. Christie, Woodinville, WA (US); Edwin R. Musch, Redmond, WA (US); Benjamin M. Deagen, Lynnwood, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,469

(22) Filed: Sep. 4, 2018

(65) Prior Publication Data

US 2018/0375666 A1    Dec. 27, 2018

Related U.S. Application Data

(63) Continuation of application No. 15/717,925, filed on Sep. 27, 2017, now Pat. No. 10,069,633.

(Continued)

(51) Int. Cl.
*H04L 9/32* (2006.01)
*G06F 8/61* (2018.01)

(Continued)

(52) U.S. Cl.
CPC .............. *H04L 9/3263* (2013.01); *G06F 8/61* (2013.01); *G06F 9/4406* (2013.01); *H04L 9/14* (2013.01);

(Continued)

(58) Field of Classification Search
CPC . H04L 9/32; H04L 9/14; H04L 9/3263; H04L 9/30; G06F 8/61; G06F 11/30;

(Continued)

(56) References Cited

U.S. PATENT DOCUMENTS 6,401,140 B1 *  6/2002  Wu ...................... G06F 9/4406
                                                            710/10
9,100,189 B2 *  8/2015  Hartley ................. H04L 9/3247

(Continued)

FOREIGN PATENT DOCUMENTS

JP         2010033290 A       2/2010

OTHER PUBLICATIONS

U.S. Appl. No. 15/717,925, Non-Final Office Action dated Dec. 29, 2017.

(Continued)

*Primary Examiner* — Jayesh M Jhaveri
(74) *Attorney, Agent, or Firm* — Wong & Rees LLP

(57) ABSTRACT

A secure programming system can receive a job control package having a security kernel and a target payload of content for programming into a pre-defined set of trusted devices. A device programmer can install a security kernel on the trusted devices and reboot the trusted devices using the security kernel to validate the proper operation of the security kernel. The target payload can then be securely installed on the trusted devices and validated.

20 Claims, 25 Drawing Sheets

Related U.S. Application Data

(60) Provisional application No. 62/401,953, filed on Sep. 30, 2016.

(51) Int. Cl.
| | |
|---|---|
| *H04L 9/30* | (2006.01) |
| *H04L 9/14* | (2006.01) |
| *G06F 21/57* | (2013.01) |
| *G06F 9/44* | (2018.01) |
| *G06F 9/4401* | (2018.01) |

(52) U.S. Cl.
CPC ............... *H04L 9/30* (2013.01); *G06F 9/44* (2013.01); *G06F 21/57* (2013.01); *G06F 21/572* (2013.01); *G06F 21/575* (2013.01)

(58) Field of Classification Search
CPC .......... G06F 12/14; G06F 9/44; G06F 9/4406; G06F 21/57; G06F 21/572; G06F 21/575
See application file for complete search history.

(56) References Cited

U.S. PATENT DOCUMENTS

| | | |
|---|---|---|
| 2011/0035587 A1 | 2/2011 | DeVore et al. |
| 2012/0036373 A1 | 2/2012 | Kofman et al. |
| 2012/0084562 A1* | 4/2012 | Farina .................. G06F 21/575 |
| | | 713/168 |
| 2012/0311314 A1 | 12/2012 | Cumming et al. |
| 2014/0189340 A1 | 7/2014 | Hadley |
| 2014/0317394 A1* | 10/2014 | Buhler .................. G06F 9/4416 |
| | | 713/2 |
| 2015/0317471 A1 | 11/2015 | Baentsch et al. |
| 2016/0187870 A1 | 6/2016 | Ekle |
| 2017/0199777 A1 | 7/2017 | Shah et al. |

OTHER PUBLICATIONS

U.S. Appl. No. 15/717,925, Notice of Allowance dated May 7, 2018.
World Intellectual Property Organization, Application No. PCT/US17/54124, International Search Report dated Jan. 5, 2018.
World Intellectual Property Organization, Application No. PCT/US17/54124, Pending Claims as of Jan. 5, 2018.

* cited by examiner

UNIFIED PROGRAMMING ENVIRONMENT FOR PROGRAMMABLE DEVICES

CROSS REFERENCE TO RELATED APPLICATIONS AND PRIORITY CLAIM

This application claims benefit as a Continuation of U.S. application Ser. No. 15/717,925, filed Sep. 27, 2017, which claims the benefit of U.S. Provisional Patent Application Ser. No. 62/401,953 filed Sep. 30, 2016, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

This application is related to Provisional Application Ser. No. 62/371,184, entitled COUNTERFEIT PREVENTION, filed Aug. 4, 2016, Provisional Application Ser. No. 62/372,242, entitled EMBEDDING FOUNDATIONAL ROOT OF TRUST USING SECURITY ALGORITHMS, filed Aug. 8, 2016, Provisional Application Ser. No. 62/369,304, entitled DEVICE PROGRAMMING WITH SYSTEM GENERATION, filed Aug. 1, 2016, each of which is owned by Applicant and is incorporated herein in its entirety by this reference thereto.

TECHNICAL FIELD

Embodiments relate generally to device programming systems, and, more specifically, to a uniform programming environment for secure programming systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable devices such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines. In addition, system level components, such as smart phones, circuit boards, Internet of Things (IoT) devices, media players, can also require specific security configuration support.

The systems and sub-assemblies that are manufactured or assembled in bulk on a manufacturing line are generally functionally identical. Such products share similar problems in regards to functionality and operation. Issues manifesting in one device are typically found in all similarly manufactured devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
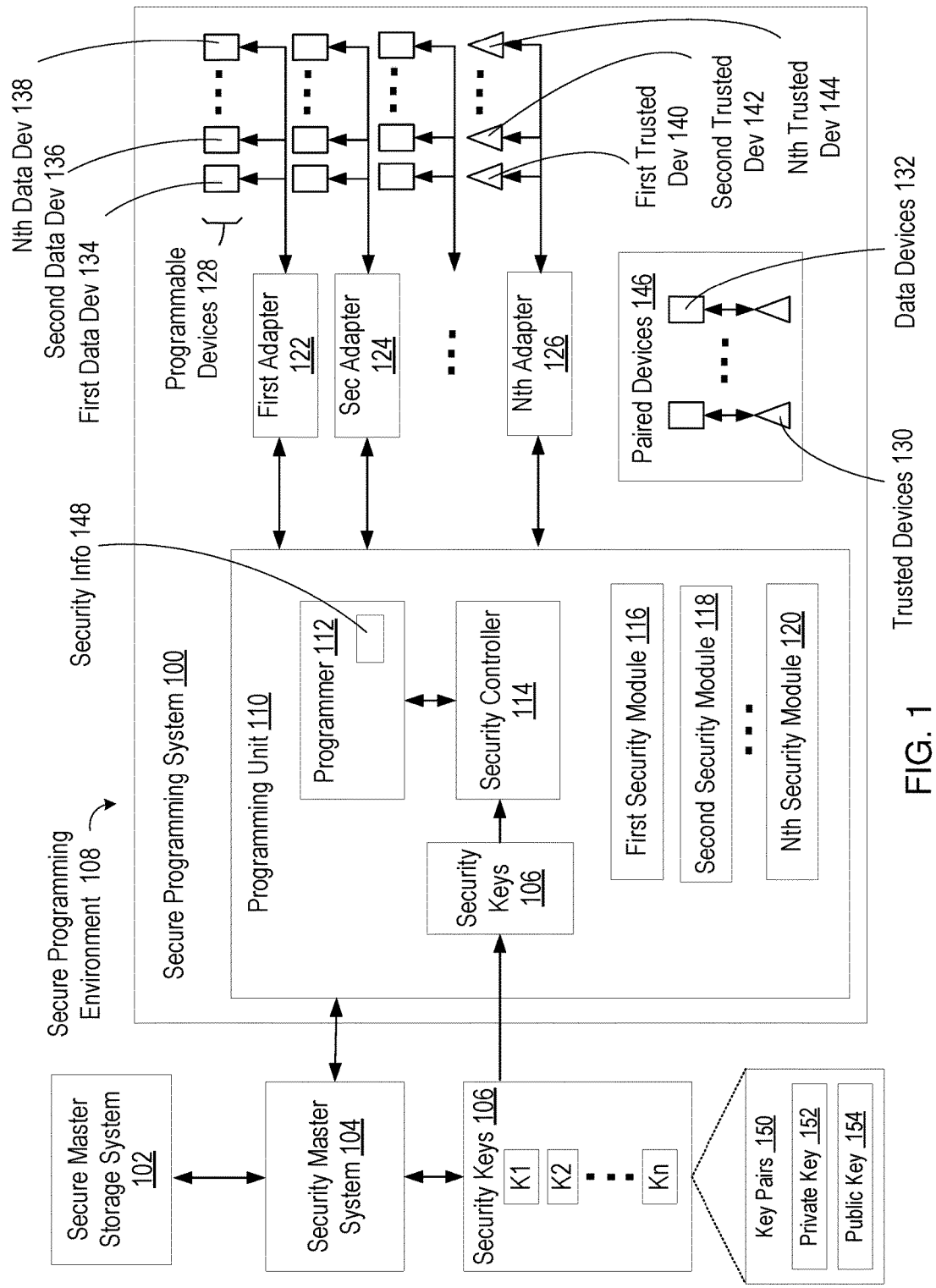
FIG. 1 depicts an illustrative view of a secure programming system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. Structural Overview
 3.0. Functional Overview 4.0. Example Embodiments
5.0. Implementation Mechanism—Hardware Overview
6.0. Extensions and Alternatives 1.0. General Overview Approaches, techniques, and mechanisms are disclosed for provisioning programmable devices in a secure manner. The secure programming system can individually encrypt a target payload of data and code and then program the information into each individual one of the programmable devices. The secure programming system can create a customized payload package that can only be decrypted by a system or device having the correct security keys.

The programmable devices can include memory chips, circuit boards, and complete electronic devices such as smart phones, media players, or other consumer and industrial electronic devices. The configuration of the security keys can control the operation of the programmable devices.

The secure programming system can securely configure individual devices including components, circuit boards, and complete products. By implementing security features at the individual component manufacturing time, operation can be controlled on a device by device basis. The secure content, executable code, and keys can interoperate to provide a high degree of security and control.

According to one embodiment, the system can install the security kernel into the programmable device mounted in the programmer and then reboot the programmable device in the programmer to validate the security kernel before provisioning the programmable device with the target payload. This can validate that the security kernel is properly installed in the programmable device.

According to another embodiment, by individually encrypting a target payload on one of the programmable devices, such as a circuit board, then the circuit board can be configured to only work with components that have registered security codes. This can be used to ensure that circuit boards can only be operated with certain category parts. This provides the manufacturer with a degree of control over the final use of the boards.

According to another embodiment, the programmable devices can validate a serial number or other parameter as a prerequisite for provisioning of the programmable device. In yet another embodiment, the system can limit operation based on the security codes in a job control package. This can prevent duplication or unauthorized provisioning of the programmable devices.

In other aspects, the invention encompasses computer apparatuses and computer-readable media configured to carry out the foregoing techniques.

2.0. Structural Overview

FIG. 1 illustrates an illustrative view of various aspects of a secure programming system 100 in which the techniques described herein may be practiced, according to an embodiment. The secure programming system 100 can individually configure data devices and active, trusted device with cryptographic information to provide a secure programming and operation environment.

The secure programming system 100 comprises a programming unit 110 having a programmer 112, a security controller 114, security keys 106, adapters for coupling to programmable devices, a first security module 116, a second security module 118, and an nth security module 120. The secure programming system 100 can be coupled to a security master system 104 having a secure master storage system 102. The security master system 104 and the secure master storage system 102 can generate and securely store the security keys 106 for encrypting and decrypting information. The security keys 106 can implement a variety of security paradigms. For example, the security keys 106 can include key pairs 150 having a private key 152 and a public key 154. The key pairs 150 can be used to implement a public key cryptography system where data encrypted by the public key 154 can be decrypted using the private key 152. The secure programming system 100 can include as many different key pairs 150 as necessary. The key pairs 150, the private key 152, and the public key 154 can be implemented for different devices or system elements including the secure programming system 100, the programming unit 110, the programmer 112, the security controller 114, the security modules, the programmable devices 128, the data devices 132, the trusted devices 130, or any other system element. The security keys 106 can be used with a variety of devices including hardware security modules (HSM), a trusted security module (TPM), microprocessors, microcontrollers, dedicated security units, or a combination thereof.

The system 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can receive security information from the security master system 104, process the information, and transfer an individually configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126.

In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, or a similar device with active components, then the adapters can include mechanisms to communicate with the programmable devices 128. The adapters can include a cable link, a Universal Serial Bus link, a serial connection, a parallel connection, a wireless communication link, an electronic data bus interface, an optical interface, or any other communication mechanism.

The programmable devices 128 are devices that can be provisioned with secure information by the programming unit 110. For example, the programmable devices 128 can include data devices such as Flash memory units, programmable read only memories, secure data storage devices, or other data storage devices. The programmable devices 128 can also include logic devices such as microcontroller units, microprocessor units, programmable logic units, application-specific integrated circuit (ASIC), field programmable gate arrays (FPGA), or other programmable logic devices.

Provisioning may include transferring data and/or code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit board, or similar devices.

The data devices 132 can include any number of devices, e.g., a first data device 134, a second data device 136, and a nth data device 138. The trusted devices 130 can include any number of trusted devices, e.g., a first trusted device 140, a second trusted device 142, and up to a nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security. Each of the programmable devices 128 can be personalized with individual security keys 106.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus data from one of the paired devices 146 can be shared with another one of the paired devices 146. This can allow functionality such as sharing information, authenticating a bi-directional secure communication channel between two or more of the paired devices 146, identifying other related devices, or a combination thereof. The new key pairs can be stored in a database, a manufacturing execution system, or other data system where the information can be retrieve later to detect device tampering, counterfeit devices, versioning problems, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 are computing devices for processing security information. The security controller 114 can include specific cryptographic and computational hardware to facility the processing of the cryptographic information. For example, the security controller 114 can include a quantum computer, parallel computing circuitry, field programmable gate arrays (FPGA) configured to process security information, a co-processor, an array logic unit, a microprocessor, or a combination thereof.

The security controller 114 can be a secure device specially configured to prevent unauthorized access to security information at the input, intermediate, or final stages of processing the security information. The security controller 114 can provide a secure execution environment for code elements to execute in. For example, the security controller 114 can be a hardware security module (HSM), a microprocessor, a trusted security module (TPM), a dedicated security unit, or a combination thereof. The security controller 114 can be part of the programming unit 110. For example, the security controller 114, such as a hardware security module, can be included within the programmer 112.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof. For example, the security modules can be hardware, software, or a combination thereof. In another example, a secure programming environment 108 can be implemented using a configuration having the programmer 112, the security controller 114 implemented using a hardware security module, the first security module 116 implementing a serial number server module to secure provide valid serial number for the programmable devices 128, and appropriate security keys.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more the security keys 106. The security keys 106 can be calculated internal to the secure programming system 100, can be calculated externally and received by the secure programming system 100, or a combination thereof. In addition, each of the internal devices and components of the secure programming system 100 can communicate with other external and internal components using communication interfaces (not shown) that support the transfer of information between the devices and components. It is understood that each of the elements of the diagrams can communicate with other elements using the communication interfaces. The communication interfaces are omitted from the figures for clarity.

The security keys 106 can be used to encrypt and decrypt the security information. The security keys 106 can be used to implement different security methodologies and protocols. For example, the security keys 106 can be used to implement a public key encryption system. In another example, the security keys 106 can be used to implement a different security protocol or methodology. Although the security keys 106 can be described as used for a public key encryption system, it is understood that the security keys 106 can be used to implement different security paradigms, such as symmetric encryption, asymmetric encryption, or other security protocols.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
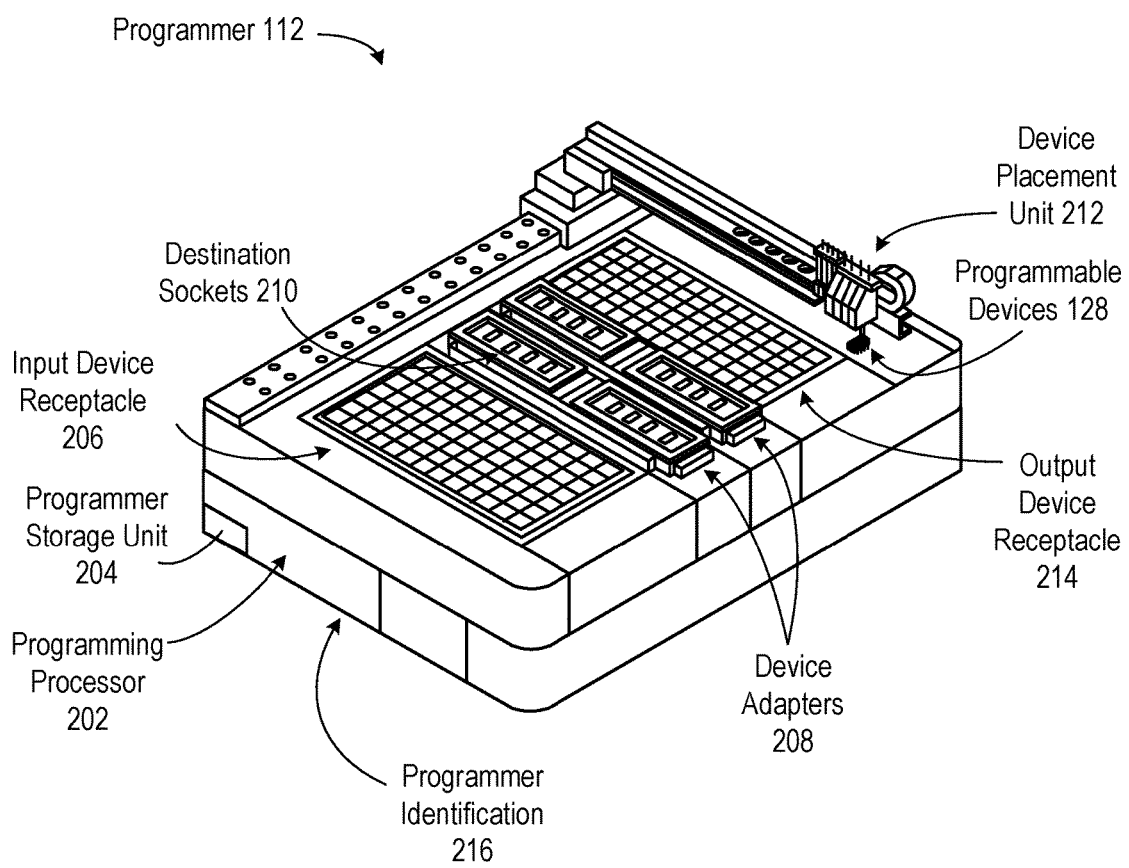
FIG. 2 depicts an example of a programmer.

FIG. 2 illustrates an example of the programmer 112. The programmer 112 is an electromechanical device for provisioning the programmable devices 128.

The programmer 112 can be used to access the programmable devices 128 and provision the programmable devices 128 with the content payload. The content payload can include data, code, security keys 106 of FIG. 1, the security information 148 of FIG. 1, and other related content.

The programmer 112 can have a variety of configurations. The programmer 112 can include a programming processor 202, an input device receptacle 206, device adapters 208, destination sockets 210, a device placement unit 212, and an output device receptacle 214. For example, the programmer 112 can be a programmer 112, a chip programmer, a device provisioning system, a circuit board programmer, or a similar provisioning system.

The programmer 112 can have a programmer identification 216. The programmer identification 216 is a unique value for identifying the programmer 112.

The programmer 112 can configure the programmable devices 128 by initializing and writing a data image into the programmable devices 128. The data image can be configured for the device type of the programmable devices 128. The programmer 112 can transfer the data to the programmable devices 128 using direct or indirect memory access.

The programmer 112 can receive a payload image for the programmable devices 128 and store the image in a local programmer storage unit. Although only the payload image is described as a single image, it is understood that the payload image can include multiple code images. For example, the payload image can be a file archive holding several different executable images and data. One image could provide a secure boot or kernel capability, while one of the other images can provide other functionality. The payload image can be processed into individual images targeted for each of the programmable devices 128. Configuring the programmable devices 128 can store memory structure, cryptographic data, and user data on the programmable devices 128. Configuring can include forming one-time structures such as partitions on the programmable devices 128.

The programmer 112 can include the programming processor 202. The programming processor 202 is a computing unit for controlling the programmer 112. The programming processor 202 can include a central processing unit (not shown), a programmer storage unit 204, a communication interface (not shown), and a software (not shown).

The programming processor 202 can have a variety of configurations. For example, the programming processor 202 can include the security controller or be coupled to the system controller. The programming processor 202 can be a single processor, a multiprocessor, a cloud computing element, or a combination thereof.

The programmer storage unit 204 is a device for storing and retrieving information. For example, the programmer storage unit 204 of the programmer 112 can be a disk drive, a solid-state memory, an optical storage device, or a combination thereof.

The programmer 112 can include the software for operating the programmer 204. The software is control information for executing on the programming processor 202. The software can be stored in the programmer storage unit 204 and executed on the programming processor 202.

The programmer 112 can include the input device receptacle 206. The input device receptacle 206 is a source of the programmable devices 128. For example, the input device receptacle 206 can be a tray that conforms to the Joint Electron Device Engineering Council (JEDEC) standards. The input device receptacle 206 can be used for holding unprogrammed devices.

The programmer 112 can include the output device receptacle 214. The output device receptacle 214 is a destination for the programmable devices 128 that have been provisioned. For example, the output device receptacle 214 can be an empty JEDEC tray for holding finished devices, a storage tube, a shipping package, or other similar structure.

The programmer 112 can include the device adapters 208. The device adapters 208 are mechanisms for coupling to the programmable devices 128. For example, the device adapters 208 can include the first adapter 122 of FIG. 1, the second adapter 124 of FIG. 1, and the nth adapter 126 of FIG. 1.

The device adapters 208 can have a variety of configurations. For example, the device adapters 208 can include destination sockets 210 for mounting the programmable devices 128 such as chips. The sockets are mechanisms for holding and interfacing with the programmable devices 128. The device adapters 208 can be modular and removable from the programmer 112 to accommodate different socket configurations. The device adapters 208 can include a latch mechanism (not shown) for attaching to the programmer 112.

The destination sockets 210 can hold the programmable devices 128. The destination sockets 210 can be used to read or write new information to the programmable devices 128.

The programmer 112 can include the device placement unit 212. The device placement unit 212 is a mechanism for positioning the programmable devices 128 in one of the destination sockets 210.

The device placement unit 212 can be implemented in a variety of ways. For example, the device placement unit 212 can be a robotic arm, a pick and place mechanism, or a combination thereof. Although the device placement unit 212 can be described as a rail-based positioning system, it is understood that any system capable of positioning one of the programmable devices 128 in the destination sockets 210 can be used.

The device placement unit 212 can retrieve one or more of the programmable devices 128 that are blank from the input device receptacle 206. The device placement unit 212 can transfer the programmable devices 128 to the destination sockets 210 of the device adapters 208.

Once the programmable devices 128 are engaged and secured by the device adapters 208, the device programming process can begin. The programmer 112 can program a local copy of the information into the programmable devices 128 in one of the destination sockets 210. For example, the local copy of the programming information can be in a pre-programmed master device, from a file in local storage, or from a remote server. The information programmed into the programmable devices 128 can be unique and customized for each of the programmable devices 128. For example, the information can be specifically customized based on the device identification of each of the individual programmable devices 128. The programmer 112 can program each of the programmable devices 128 with a different image and is not limited to duplicating the same data in each device.

Once programming is complete, the device placement unit 212 can transport the programmable devices 128 that have been programmed to the output device receptacle 214. The device placement unit 212 can transports any of the programmable devices 128 that have errors to a reject bin (not shown).

The programmer 112 can include a programmer identification 216. The programmer identification 216 is a unique value for the programmer 112. The programmer identification 216 can be used to identify the programmer 112. The programmer identification 216 can be incorporated into a device identification of each of the programmable devices 128 to indicate which programmer 112 was used to program the devices.

Figure 3:
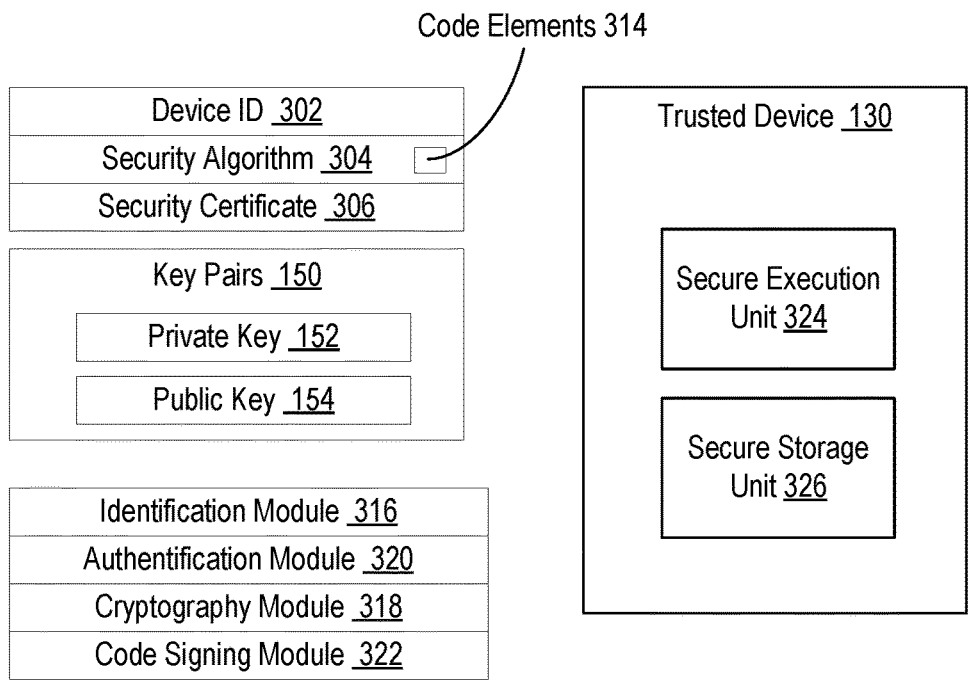
FIG. 3 depicts an example of a trusted device.

FIG. 3 illustrates an example of the trusted devices 130. The trusted devices 130 are components having the secure storage unit 326 and the secure execution unit 324. The trusted devices 130 are active components capable of executing secure code in the secure execution unit 324 to perform operations on the secure data in the secure storage unit 326.

The trusted devices 130 can be provisioned by the secure programming system 100 of FIG. 1 to include security information. For example, the trusted devices 130 can include the device identification 302, security algorithms 304, a security certificate 306 and the key pairs 150 each having the private key 152 and the public key 154.

In an illustrative example, the security keys 106 of FIG. 1 can comprise one or more of the key pairs 150 for a public key encryption system. The security information can be encrypted with the public key 154 of one of the key pairs 150 and decrypted using the private key 152. However, it is understood that the system can take advantage of different security paradigms including symmetric encryption, asymmetric encryption, data encryption standard (DES), hash codes, PGP, or other cryptographic systems. In a further example, the key pairs 150 can be used to provide a digital signature using two different sets of the security keys 106. In the digital signature example, a message or payload can be encrypted using the private key 152 of a first element and the public key 154 of a second element. The resulting encrypted message can be decrypted using the public key 154 of the first element and the private key 152 of the second element. If the message is successfully decrypted, then it shows that the message was encrypted by the first element thus established the digital signature.

The device identification 302 is a data value that can uniquely identify each of the trusted devices 130 individually. For example, the device identification 302 can include serial numbers, markers, security codes, or a combination thereof.

The security algorithms 304 are code elements 314 used to implement security features. The security algorithms 304 can provide an application programming interface to external systems to control security functionality on the trusted devices 130. The security algorithms 304 can be customized to each of the trusted devices 130. For example, the security algorithms 304 can include the code elements 314 such as source code, executable code, a library module, a link module, configuration files, initialization data, hardware control code, or a combination thereof.

The security certificate 306 is a security object associated with one of the trusted devices 130. The security certificate 306 can be pre-programmed to certify that a device has a particular root of trust embedded in it. The security certificate 306 can have one or more of the public key 154 in them. The security certificate 306 can include or be linked to security data such as key pairs 150, security keys 106, encrypted passwords, or a combination thereof.

The security certificate 306 can be a securely stored data element. For example, the security certificate 306 can be encrypted security information that must be decrypted before use.

The key pairs 150 can be security elements having two or more separate security keys used to encrypt and decrypt data. For example, the key pairs 150 can include the private key 152 and the public key 154. The security information encrypted with the public key 154 can be decrypted using the private key 152.

The key pairs 150 can be implemented in a variety of ways. For example, the key pairs 150 can be configured to have different key lengths to change the level of security. The private key 152 and the public key 154 can be implemented with the same or different character lengths.

Although the key pairs 150 are described in the context of a public key encryption system, it is understood that the key pairs 150 can also be used to implement other encryption paradigms. For example, the key pairs 150 can be used for symmetric encryption, asymmetric encryption, standards based encryption, hashing algorithms, or any other encryption system.

The trusted devices 130 can include security functionality implemented as security modules. For example, the trusted devices 130 can include an identification module 316, an authentication module 320, a cryptography module 318, and a code signing module 322.

The identification module 316 can verify the identification of one of the programmable devices 128 of FIG. 1. The identification module 316 can receive the device identification 302 of one of the programmable devices 128 and determine if the device identification 302 is correct. For example, the device identification 320 can be compared to a list of known devices, compared against a checksum, compared using a computational algorithm, or similar techniques.

The authentication module 320 can authenticate one or more of the properties of one of the programmable devices 128. The authentication module 320 can receive the device identification 302, the security parameters including one or more of the security keys 106 to determine if the security parameter provided is valid. The authentication module 320 can also be used to validate the device identification 302.

The validity of the security parameter can be determined in a variety of ways. For example, the validity of the security parameter can be validated by successfully decoding the security parameter using one of the security keys available to one of the trusted devices 130. In another example, the validity of the security parameters can be validated by decrypting one of the security parameters and comparing it to a predefined value stored within one of the trusted devices 130.

The cryptography module 318 is a unit for performing cryptographic operations. The cryptography module 318 can provide an interface to perform computationally intensive operations such as encryption and decryption. The other security modules can be coupled with the cryptography module 318 to provide security functionality.

The cryptography module 318 can be implemented in a variety of ways. For example, the cryptography module 318 can include hardware, software, or a combination thereof. The cryptography module 318 can provide a standardized interface to allow the other security modules to perform the required cryptographic functions.

The code signing module 322 is a unit for securing code elements 314. The code signing module 322 can be used for securing the code element 314 and can encrypt code elements, decrypt code elements, and control the execution of the code elements. The code signing module 322 can be used to ensure that one of the code elements 314 can be executed on one of the trusted devices 130 by verifying that the security information associated with the code element 314.

In an illustrative example, each of the code elements 314 can include an execution parameter that indicates the model number of the trusted devices 130 where the code elements 314 are authorized to execute. The code signing module 322 can be used to validate the execution parameter, compare the parameter to the model number information in one of the trusted devices 130, and only allow execution of the code elements 314 if the two values match. This could be used to limit operation of the code element 314 to a particular high end phone or other specific device.

One of the advantages of the trusted devices 130 is that the trusted devices 130 can identify and authenticate the security information internally to increase the level of security. The trusted devices 130 can validate the security information using the security keys 106 stored in the secure storage unit 326.

The trusted devices 130 can provide a measure of trust when the trusted devices 130 are secure. The trusted devices 130 can have a variety of configurations. For example, the trusted devices 130 can have a system identification, an authentication mechanism, encryption and decryption functionality, code signing to protect executables, trusted storage, and a trusted execution environment.

The system identification can include elements that identify or describe hardware and software components. The trusted devices 130 can have the ability to securely authenticate its identity and other properties. The trusted devices must be able to securely encrypt and decrypt information. The trusted devices 130 must be able to authenticate trusted code. The trusted devices must have secure storage and execution capability.

The secure programming system 100 must be able to implement a system of roots of trust. The roots of trust (RoT) are a set of functions in a trusted computing environment that are always trusted by the system. For example, the roots of trust can serve as a separate secure compute engine controlling the trusted computing platform cryptographic process. Alternatively, devices can implement the roots of trust as hardware and software components that are inherently trusted. They are secure by design and can be implemented in hardware or protected by hardware. They can be used to perform security critical functions such as measuring or verifying software, protecting cryptographic keys, and performing device authentication.

The roots of trust can provide a variety of security functionality including: on the fly encryption, detection and reporting of tampering with secure data, detection of active tampering attempts, digital rights management, and other security functions.

Implementing secure operation in a mobile hardware space is difficult because of the higher risk resulting from physical access to the devices. Such secure devices require the hardware to work closely with protected data and software to insure secure operation.

Figure 4:
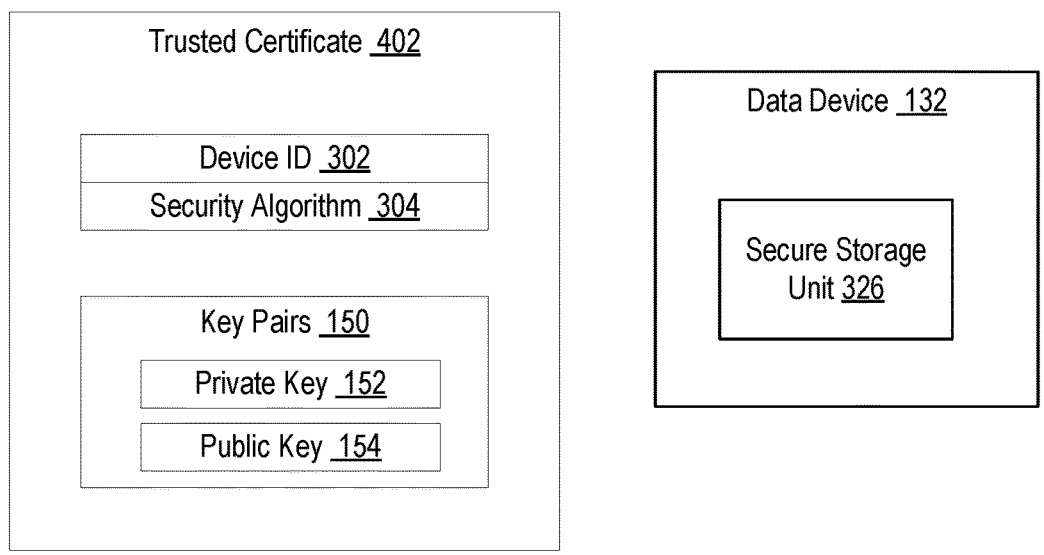
FIG. 4 depicts an example of a data device.

FIG. 4 illustrates an example of the data devices 132. The data devices 132 are components having the secure storage unit 326. The data devices 132 are passive components capable storing the secure data in the secure storage unit 326 and providing access to the stored data when accessed by one of the trusted devices 130 of FIG. 1.

The data devices 132 can be provisioned by the secure programming system 100 of FIG. 1 to include security information. For example, the data devices 132 can include the device identification 302, the security algorithms 304, the security certificate 306 of FIG. 3, and the key pairs 150 each having the private key 152 and the public key 154. In this case, the data within the secure storage unit 326 may be internally accessed from within the data devices 132.

The secure storage unit 326 can be used as a write once data area. Information can be programmed into the secure storage unit 326 and then the secure storage unit 326 can be processed to eliminate the access to the data within the secure storage unit 326 from outside the data devices 132.

In an illustrative example, one of the data devices 132 can be a flash memory device. Within the flash memory device, the flash memory can be partitioned into different blocks. Some of the blocks can be used to provide general memory space. Some of the other blocks may be configured to be private and used to store information that is not accessible from outside the flash memory drive. A private block can be used to form the secure storage unit 326.

In another example, the secure storage unit 326 can be a dedicated memory area on one of the data devices 132 that is protected by a security fuse. The data can be written to the secure storage unit 326 and then external access can be eliminated by blowing the security fuse.

Each of the data devices 132 can include a trusted certificate 402. The trusted certificate 402 is a data structure that can include other security parameters. For example, the trusted certificate 402 can include the device identification 302, the security algorithms 304, one or more of the public key 154, and other security information.

Figure 5:
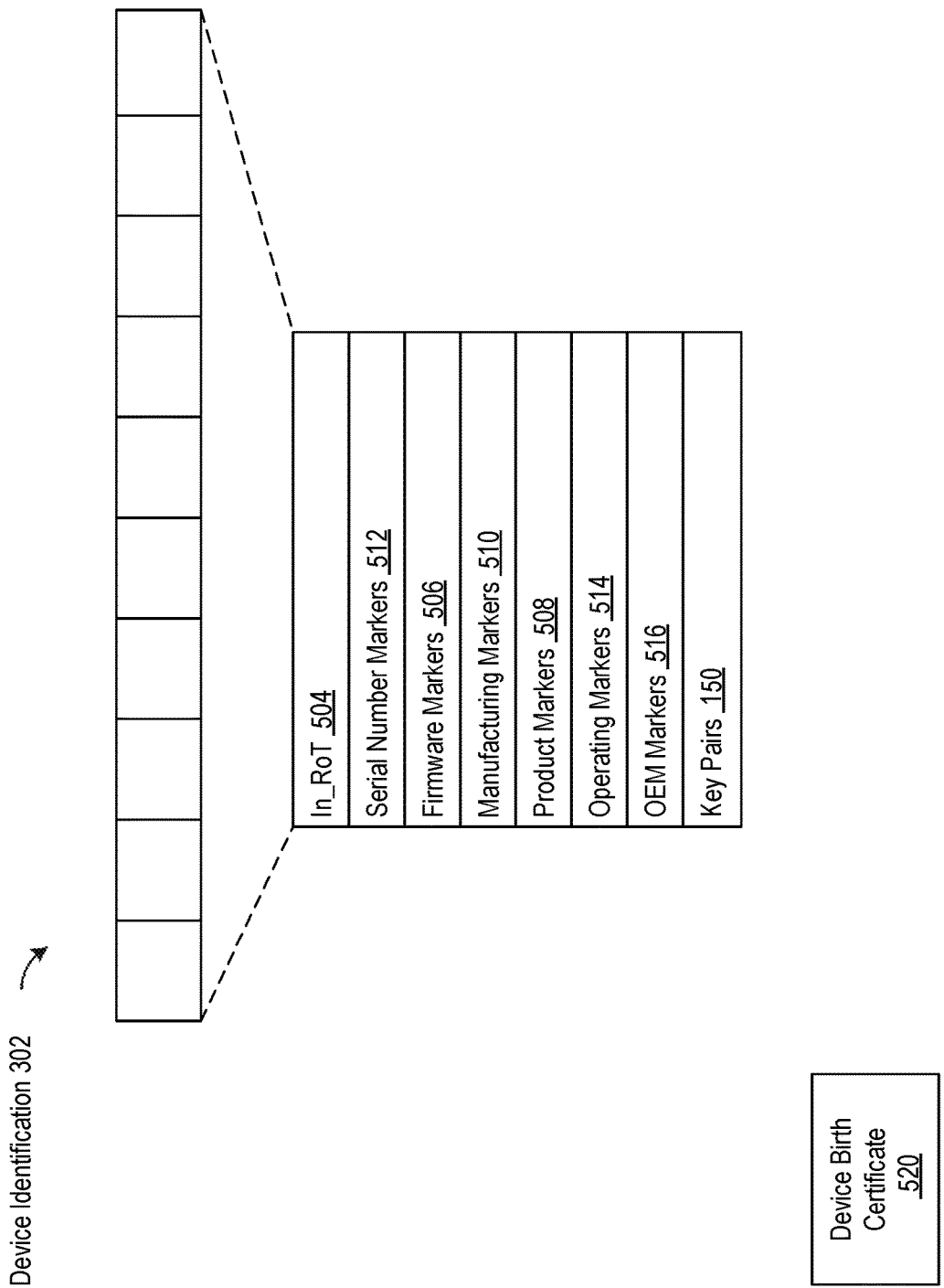
FIG. 5 depicts an example of a device identification.

FIG. 5 illustrates an example of the device identification 302. The device identification 302 is a data structure that can be used to uniquely identify one of the programmable devices 128 of FIG. 1, the secure programming system 100 of FIG. 1, the programmer 112 of FIG. 1, or a combination thereof. The device identification 302 can be used to describe the programmable devices 128 including the data devices 132 of FIG. 1 and the trusted devices 130 of FIG. 1.

The device identification 302 can have a variety of configurations. For example, the device identification 302 can include an incoming root of trust 504, serial number markers 512, firmware markers 506, manufacturing markers 510, product markers 508, operating markers 514, original equipment manufacturer markers 516 (OEM markers), the key pairs 150, or similar markers.

The incoming root of trust 504 is a security element. The incoming root of trust 504 can be programmed into one of the programmable devices 128 at manufacture or programming time. For example, the incoming root of trust 504 can be a serial number and a key value. In another example, the incoming root of trust 504 can be an embedded identifier, such as a device identifier implanted at silicon creation time in one of the programmable devices 128. The incoming root of trust 504 can be checked against a known set of values if created at manufacturer or can be recorded if created during programming for later cross check in production and or in application, service and repair stage. The incoming root of trust 504 can be stored in a database, the MES, or a similar data system.

The serial number markers 512 are security elements that can include a serial number for one of the programmable devices 128. The device identification 302 can include one or more of the serial number markers 512.

The firmware markers 506 are security elements that can describe or identify the firmware used in one of the programmable devices 128. The firmware markers 506 can include a version number, a calculated checksum value, a partial or complete hash value, a text string identifier, a numeric identifier, or a combination thereof. For example, one of the programmable devices 128 can be a circuit board having firmware installed on the board. The firmware markers 506 can identify the version number for each separate firmware element. The firmware version information could be used to coordinate interoperability between code elements 314 of FIG. 3 in the programmable devices 128. In another example, the firmware markers 506 can include a calculated hash checksum, such as a MD5 hash or fingerprint. The hash checksum can be used to verify the data integrity of the firmware by comparing the hash checksum against a hash calculated against the live version of the firmware. Any difference would indicate that the firmware has been modified.

The manufacturing markers 510 are security identifiers that can describe one or more manufacturing properties. For example, one of the programmable devices 128 can include the manufacturing markers 510 such as location information, programmer identification, programming unit identification, manufacturing time information, manufacturing location information, time windows, manufacturing execution system identification information, factory identification, vendor identification, manufacturing equipment information, or manufacturing related parameters.

The product markers 508 are security elements that can describe the products used with the programmable devices 128. The product markers 508 can include related manufacturers, branding information, product line information, model information, or other product related parameters.

The operating markers 514 are security elements that can describe the operating properties for the programmable devices 128. The operating markers 514 can include operating voltage, voltage patterns, current levels, power draw, heating factors, critical operating frequencies, operating sequence information, or operating parameters.

The OEM markers 516 are security elements that can describe the original equipment manufacturers or related contract manufacturers who can use the programmable devices 128. The OEM markers 516 can include manufacturer identifiers, license information, time windows, authorized locations, authorized factories, product lot size, serial number ranges, or other OEM related parameters.

The device identification 302 is a multi-variable data structure that includes security information for the programmable devices 128. The data elements of the device identification 302 can be individually encrypted within the device identification 302. The device identification 302 itself can be encrypted. The device identification 302 can be specific to each one of the programmable devices 128 both in terms of the data elements forming the device identification 302 and the degree of encryption and other security mechanisms used to protect the device identification 302 itself. The device identification 302 can include the public key 154 of FIG. 1 linked to the private key 152 of FIG. 1 of the key pairs 150 associated with one of the programmable devices 128.

One of many advantages of the device identification 302 is the enablement of access to specific data elements within the device identification 302 by decrypting only the elements required. By encrypting both the device identification 302 and the individual data elements, a finer granularity of security can be provided.

The device identification 302 can be incorporated into a device birth certificate 520. The device birth certificate 520 can include the device identification 302 and additional manufacturing and device lifecycle information. The device birth certificate 520 can be used to track and authenticate the stages of the device lifecycles for the programmable devices 128. The device birth certificate 520 can be generated as part of the programming process and is programmed into each of the programmable devices 128. The device birth certificate 520 is described in detail below.

Figure 6:
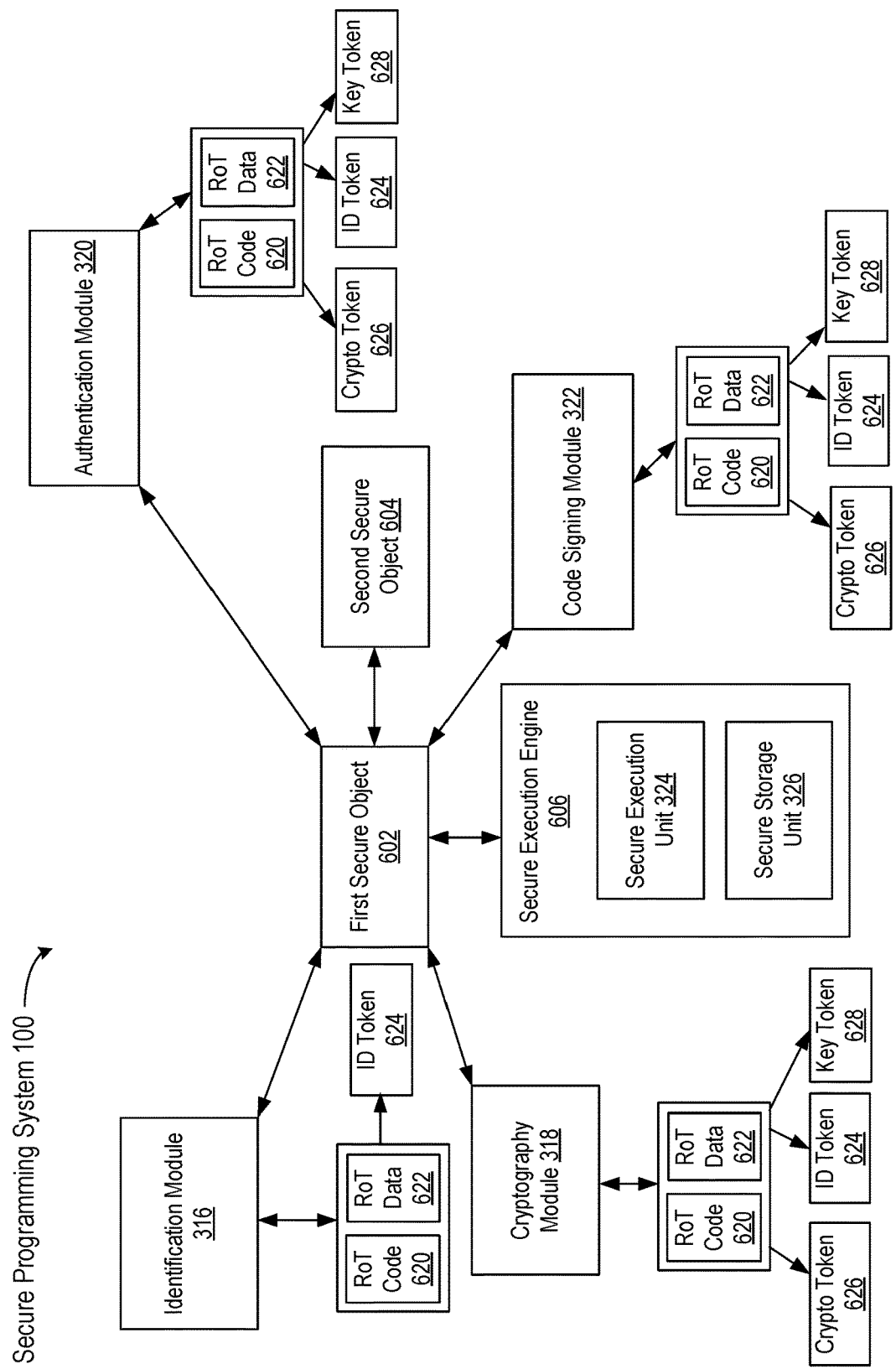
FIG. 6 depicts an example block diagram of a secure programming system.

FIG. 6 illustrates an example block diagram of the secure programming system 100. The secure programming system 100 includes a number of secure objects, such as a first secure object 602 and a second secure object 604. The first secure object 602 may interface or communicate with the second secure object 604.

The secure objects represent any hardware or software objects having security mechanisms or protocols for protection from unauthorized interception or duplication. For example, the secure objects may include, but is not limited to, one of the data devices 132 of FIG. 1, one of the trusted devices 134 of FIG. 1, an electronic component, an electronic device, a boot loader, a firmware (FW), an operating system (OS), a software application, a hardware programmer, a peripheral device, a website, a machine, etc.

The first secure object 602 may interface with the identification module 316, the authentication module 320, the cryptography module 318, and the code signing module 322. For illustrative purposes, although the second secure object 604 is shown connected only with the first secure object 602, the second secure object 604 may also be connected with any combination of the identification module 316, the cryptography module 318, the authentication module 320, the code signing module 322. The first secure object 602 or the second secure object 604 is protected from security breach using, but is not limited to, a combination of the identification module 316, the cryptography module 318, the authentication module 320, the code signing module 322, any other units, modules, or functions of the secure programming system 100.

The identification module 316 generates an identity of a secure object to protect the secure object from an unauthorized access to the secure object. The identification module 316 extracts identification tokens 624 (ID tokens). The ID tokens 624 include information that is employed to verify an identity before access to a secure object is granted. The ID tokens 624 may include, but are not limited to, a user identification, a serial number of a device, a device identification, etc.

The ID tokens 624 may be extracted by the identification module 316 using any secure information or mechanism, including, but not limited to, a root of trust code 620 (RoT code) and a root of trust data 622 (RoT data). For example, the RoT data 622 may represent information associated with a digital birth certificate of a device.

The term root of trust (RoT) referred to herein refers to a set of functions in a trusted or secured computing module that includes hardware components, software components, or a combination of hardware and software components. For example, these functions may be implemented in, but are not limited to, a boot firmware, a hardware initialization unit, a cross-checking component/chip, etc. Also, for example, the functions may be implemented using, but is not limited to, a separate compute engine that controls operations of a cryptographic processor.

The ID tokens 624 may be extracted from the RoT data 622 using the RoT code 620. The ID tokens 624 may be cryptographically protected and so may be decrypted only by the RoT code 620. The ID tokens 624 may be unique such that each secure object has its own identification and so none of the secure objects shares its identification with another secure object.

The RoT code 620 includes instructions or commands that are used to decipher data that may be used to identify a source of a device or to decode content. The RoT data 622 includes information that is protected and may only be decoded using the RoT code 620.

The RoT code 620 and RoT data 622 may be provided or generated by any secure mechanisms. For example, the RoT code 620 and RoT data 622 may be programmed into a secure storage area of a device during programming or configuring the device.

Also, for example, the RoT code 620 and RoT data 622 may be sent from a host server or system to the secure programming system 100 in a secure manner such that only the secure programming system 100, which has been authorized and validated to receive the RoT code 620 and RoT data 622. Further, for example, the host server or system may include the security master system 104 of FIG. 1 that sends the security keys 106 of FIG. 1 to the secure programming system 100 for identification or authentication before the secure programming system 100 may be able to receive or decrypt information from the security master system 104.

As an example, the secure storage area may include, but is not limited to, a one-time programmable memory or any other storage areas that are known only to authorized users or devices. As another example, the secure storage area may include, but is not limited to, a storage or memory that is accessible only with authorized information or identification without which permission would be denied.

For example, the RoT code 620 and RoT data 622 may be preprogrammed into a device, such as the secure objects, at the time when the device is programmed or configured before the device is integrated or operated in a production environment or system. Also, for example, the production environment or system may include, but is not limited to, a portable device, a computer, a server, an electronic circuit board, etc.

The authentication module 320 can be used to verify whether an identification token 624 is authorized for access to a secure object. After the identification module 316 extracts the ID tokens 624, the authentication module 320 verifies the ID tokens 624 to identify whether a secure object is a valid object that may communicate with an authorized system to send or receive secure information. For example, if one of the ID tokens 624 is not valid, the secure object may not be allowed to exchange information with the programmer 112 of FIG. 1.

After the authentication module 320 verifies that the ID tokens 624 of the secure object is valid, the authentication module 320 may generate a combination of one of the ID tokens 624, a key token 628, and a cryptographic token 626. The key token 628 includes information employed for authentication of the ID tokens 624. The cryptographic token 626 includes information employed for cryptographically encode or decode information for information security or data confidentiality.

In one or more embodiments, the ID tokens 624, the key token 628, or the cryptographic token 626 may be generated from the RoT data 622 using the RoT code 620. In one or more embodiments, the ID tokens 624, the key token 628, or the cryptographic token 626 may be cryptographically protected and so may be decrypted only by the RoT code 620.

The cryptography module 318 can provide data encryption and decryption for secure information exchanged between the secure objects or between a secure object and an external system. The external system that may exchange the secure information with the secure objects may include, but is not limited to, the programmer 112, the security master system 104, a host system, etc.

In one or more embodiments, after the identification module 316 extracts the ID tokens 624 or the authentication module 320 validates the ID tokens 624, the cryptography module 318 may generate the ID tokens 624, the key token 628, and the cryptographic token 626. The cryptographic token 626 may be generated by the cryptography module 318 using the RoT code 620 to decode information from the RoT data 622.

In one or more embodiments, the cryptography module 318 may generate the ID tokens 624 or the key token 628 using the cryptographic token 626 to further decode other information from the RoT data 622. In an embodiment, elimination of a data breach is greatly simplified using the cryptography module 318 having multiple levels of protection that improve information security or data confidentiality.

In one or more embodiments, the cryptography module 318 may include cryptography methods including, but is not limited to, symmetric-key cryptography, public-key cryptography, etc. For example, the cryptography module 318 may include a cryptographic method in which both sender and receiver may share the same key or different keys that may be computed using a predetermined algorithm.

As an example, the cryptographic method may include, but is not limited to, block cipher methods, cryptographic hash functions, etc. As another example, the cryptographic method may include, but is not limited to, Data Encryption Standard (DES), Advanced Encryption Standard (AES), triple-DES, MD4 message-digest algorithm, MD5 algorithm, Secure Hash Algorithms 1 and 2, etc.

As an example, the cryptographic method may include, but is not limited to, a public-key or an asymmetric key cryptography in which two different but mathematically related keys may be used—the public key and the private key. As another example, a public key system may be constructed so that calculation of one key (e.g., a private key) may be computationally infeasible from the other key (e.g., a public key), even though they are related. Both public and private keys may be generated secretly as an interrelated pair.

For example, in public-key cryptosystems, a public key may be freely distributed, while its paired private key may remain secret. In a public-key encryption system, a public key may be used for encryption, while a private or secret key may be used for decryption.

The code signing module 322 verifies the integrity of code information exchanged between systems or devices. The code signing module 322 can verify whether content of exchanged information has been altered or tampered.

For example, the code signing module 322 may include a process of digitally signing executables or scripts to confirm a software author or generator and validates that an executable code or script has not been altered or corrupted. Also, for example, a code may be verified as altered or corrupted since it was signed by way of, but is not limited to, a cryptographic hash, checksum, etc.

In one or more embodiments, after the identification module 316 extracts the ID tokens 624 or the authentication module 320 validates the ID tokens 624, the code signing module 322 may generate the ID tokens 624, the key token 628, and the cryptographic token 626. The cryptographic token 626 may be generated by the code signing module 322 using the RoT code 620 to decode information from the RoT data 622.

In one or more embodiments, the code signing module 322 may generate the ID tokens 624 or the key token 628 using the cryptographic token 626 to further decode other information from the RoT data 622. In an embodiment, elimination of data breach is greatly simplified using the code signing module 322 having multiple levels of protection that improve information security or data confidentiality.

A secure object, such as the first secure object 602 or a second secure object 604, may interface with a secure execution engine 606. The secure execution engine 606 includes a mechanism that manages or controls operations of the secure object. The secure execution engine 606 includes a secure execution unit 324 and a secure storage unit 326.

The secure execution unit 324 is a block that executes code or computer instructions in a protected environment. The environment in which the secure execution unit 324 operates may create a flexible, scalable solution to problems of creating a large-scale, wide-area secure environment in which only trusted, authenticated application code can operate. The secure execution unit 324 may enable the programmer 112 and the secure objects to work together in a secure environment.

The secure execution unit 324 may execute trusted code that have been stored by the secure storage unit 326 when the secure objects were previously programmed, configured, tested, or certified before the secure objects operate in an end-user production environment. The trusted code executed by the secure execution unit 324 may be signed and authenticated.

The secure storage unit 326 stores and provides trusted code for the secure execution unit 324 to execute. In an embodiment, secure environment is greatly simplified using the secure execution engine 606 that stores program code in the secure storage unit 326 and executes the program code using the secure execution unit 324, thereby providing an additional level of protection against data breach.

For example, the trusted code may be previously stored in a secure storage or memory area of the secure objects when the secure objects were previously programmed, configured, tested, or certified. Also, for example, the trusted code may be decoded by the cryptography module 318 using information sent from the programmer 112 to the secure objects.

Figure 7:
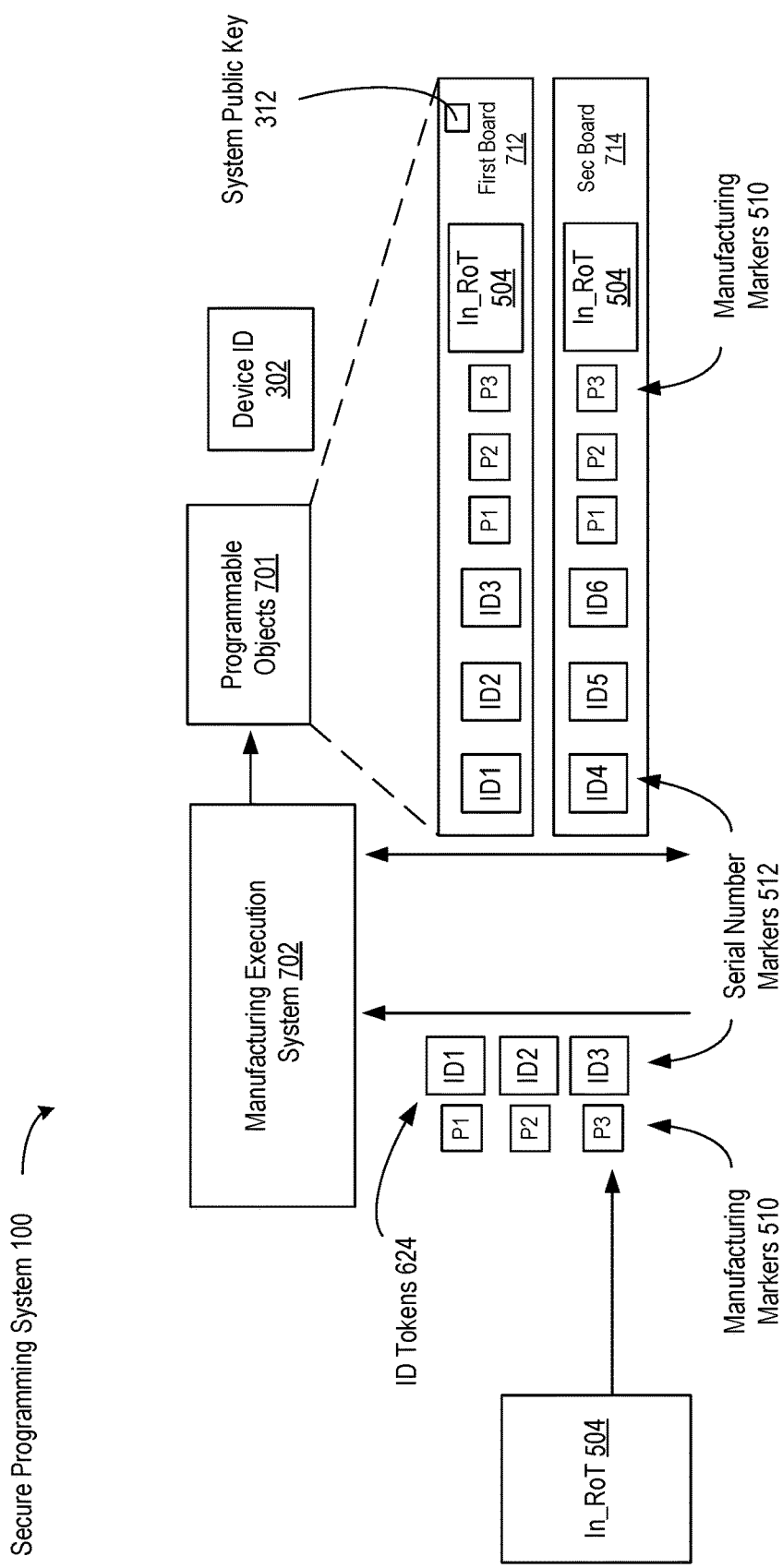
FIG. 7 depicts an example of a second block diagram of the secure programming system.

FIG. 7 illustrates an example of a second block diagram of the secure programming system 100. The example diagram shows a data flow of secure information during programming of secure objects 701.

For example, the identification tokens 624, depicted as ID1, ID2, and ID3, are component level identifiers for each of the programmable devices 128 of FIG. 1. The identification tokens 624 may include serial number markers 512 of the secure objects. The serial number markers 512 are unique information assigned to each secure object, such as one of the programmable devices 128. The serial number markers 512 of a secure object can be unique and different from another of the serial number markers 512 of another secure object such that there may not be two secure objects share the same serial number marker 512. The serial number markers 512 may be generated by the programmer 112 of FIG. 1 or embedded at silicon manufacture time.

An incoming root of trust 504 (In_RoT) of FIG. 5 may include, but is not limited to a programmer identification 216 of FIG. 2. The incoming root of trust 504, denoted as In_RoT 504, includes information that have been previously programmed or configured prior to programming the secure objects 701.

In one or more embodiments, the previously programmed information may have been programmed into a combination of adapters for programming the secure objects, the programmer 112, and the secure objects. For example, the In_RoT 504 can be a serial number implanted in the secure object at silicon manufacture time.

The manufacturing markers 510, such as P1, P2, P3, etc., may correspond with the identification tokens 624, such as ID1, ID2, ID3, etc., respectively. The In_RoT 504 can be used as a filter to qualify the manufacturing markers 510 to detect counterfeit devices.

The In_RoT 504 may be separate or different from the ID tokens 624. The In_RoT 504 may include information previously programed that is different from information to be programmed into the secure objects 701.

For example, the In_RoT 504 may include, but is not limited to, serial numbers or unique keys that were embedded or programmed into components at the time of manufacturing the components. Also, for example, the time of manufacturing the components may be, but is not limited to, a time when the components were manufactured at silicon level or a system level prior to programming the components.

In one or more embodiments, the In_RoT 504 may be ingested or input by a manufacturing execution system 702 (MES). The In_RoT 504 could also already reside in the MES 702 and the secure programming system 100 may verify the correctness of the In_RoT 504. The In_RoT 504 may be combined with a programmer generated unique RoT, such as the ID tokens 624, to generate a unique system-level RoT. The In_RoT 504 may include information from a digital birth certificate that has been previously programmed into a component during the manufacture of the component.

The In_RoT 504 may include any number of manufacturing markers 510, denoted as P1 and P2. The manufacturing markers 510 include information associated with components when the components are manufactured. For example, the manufacturing markers 510 may include, but is not limited to, a component ID, a programmer ID, a chip wafer location, a wafer number, a wafer mask identifier, a location of manufacture of a component, a date and a time of manufacture of a component, or similar values.

The ID tokens 624 are component level identifiers for each of the programmable devices 128. Each of the ID tokens 624 can be associated with the manufacturing markers 510. The ID tokens 624 can be associated with the In_RoT 504. The In_Rot 504 could be an id, a certificate, a key, or a similar value. The In_RoT 504 can be combined with the component information and registered in MES 702. This can occur before the programmable devices 128 are installed on one of the boards.

When the programmable devices 128 are installed on one of the boards, the MES 702 will be updated to define the relationship between the ID tokens 624 and the board id where they are installed. This allows the calculation of the system level identifier by combining the In_RoT 504, the manufacturing markers 510, the ID tokens 624 of each of the components, and the board information indicating which components are associated with which board.

The manufacturing execution system 702 is a computerized system used in manufacturing for product quality control purposes. The MES 702 may track and document transformation of raw materials to finished goods. The MES 702 may provide information about how current conditions on a plant floor can be optimized to improve production output. The MES 702 work in real time to enable control of multiple elements of a production process (e.g., inputs, personnel, machines, support services, etc.).

In one or more embodiments, the MES 702 may receive the In_RoT 504 along with the ID tokens 624 to program the programmable devices 128 and the component identifiers. The In_RoT 504, the ID tokens 624, and the component identifiers may be used to generate the device identification 302 of one of the secure objects 701. The device identification 302 includes information that is unique and associated with only one device or one of the secure objects 701.

The device identification 302 may include unique information that may be programmed into a system, such as the secure objects 701 including a first board 712 or a second board 714. The first board 712 or a second board 714 are board-level systems with a number of secure objects 701 assembled and connected with each other in the systems.

The first board 712 may include a system public key 154 of FIG. 1 for cryptography. The system public key 154 may be implemented in the first board 712 for a public key encryption system. The system public key 154 may be part of one of the key pairs 150 of FIG. 1. Security information may be encrypted by one of the secure objects 701 using the public key 154 of one of the key pairs 150 and decrypted by the first board 712 using the private key 152 of FIG. 1.

The first board 712 may use the system public key 154 to encrypt secure information and send to one of the secure objects 701, which may decrypt the encrypted information using the private key 152. Although the system public key 154 is described for the first board 712, it is understood that a system public key may be implemented in the second board 714.

System 100 illustrates only one of many possible arrangements of components configured to provide the functionality described herein. Other arrangements may include fewer, additional, or different components, and the division of work between the components may vary depending on the arrangement. For example, in some embodiments, some of the security modules may be omitted, along with any other components relied upon exclusively by the omitted component(s). As another example, in an embodiment, system 100 may further include multiple serial numbers or other system identifiers.

Figure 8:
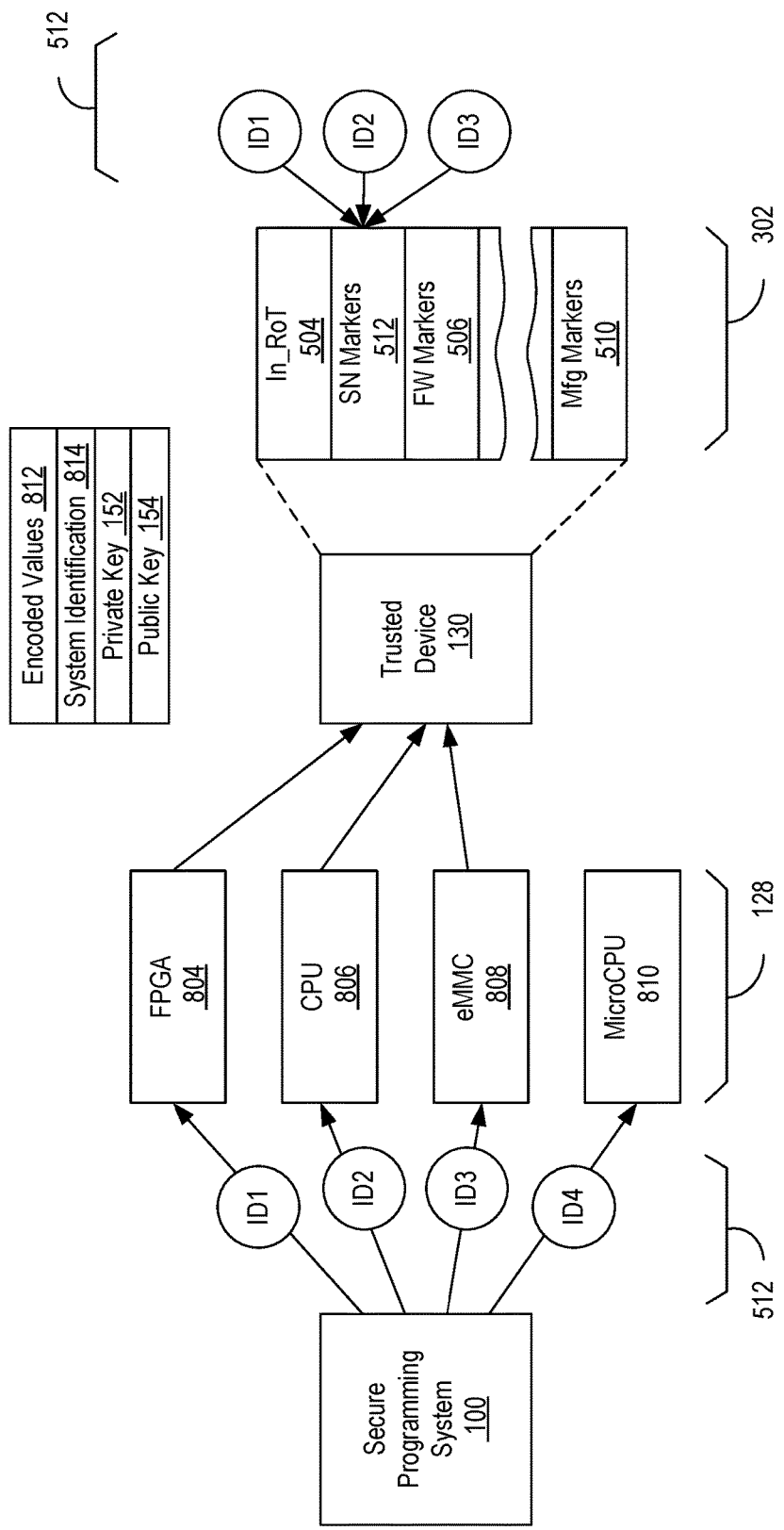
FIG. 8 is an example of provisioning one of the trusted devices.

FIG. 8 illustrates an example of provisioning one of the trusted devices 130. The provisioning process can program security data into the programmable devices 128 and associate the trusted devices 130 with another one of the trusted devices 130. In addition, the provisioning process can associate the trusted devices 130 with the secure programming system 100.

The secure programming system 100 can encode one or more of the serial number markers 512 using the public key 154 of the secure programming system 100 and program the encrypted values in the programmable devices 128. For example, the programmable devices 128 can include a field programmable gate array 804, a programmable central processing unit 806 (CPU), an embedded multimedia memory controller 808 (eMMC), a microCPU 810, or a similar device.

Thus, each of the programmable devices 128 can have one of the serial number markers 512 that can only be decrypted using the private key 152 associated with the secure programming system 100. In an illustrative example, the serial number markers 512 can represent a system identification 814 of the secure programming system 100. This can provide a security linkage between the secure programming system 100 and the programmable devices 128. The security linkage indicates a relationship between the secure programming system 100 and the programmable devices 128.

Although the provisioning process is described using the private key 152 of the secure programming system 100, it is understood that one of the serial number markers 512 of a different system component can be used. For example, the programmable devices 128 can be provisioned using the serial number markers 512 for the programmer 112 of FIG. 1.

After being provisioned, the programmable devices 128 can then be installed on one of the trusted devices 130, such as a circuit board, that can also be provisioned with the public key 154 of the secure programming system 100. The circuit board can then identify the programmable devices 128 by decrypting the encoded values 812 and compare the results to confirm that the serial number markers 512 match.

In another example, the secure programming system 100 can receive the serial number markers 512 for one of the trusted devices 130, such as the circuit board, and provision the programmable devices 128 with the encoded values 812 generated by encrypting the serial number markers 512 of the circuit board and programming the information into the programmable devices 128. After installation, the circuit board can decrypt the encoded values 812 and compare the serial number markers 512 to the serial number of the circuit board.

The trusted devices 130 can be provisioned with the device identification 302. The device identification 302 for one of the trusted devices, such as the circuit board, can include the incoming root of trust 504, the serial number markers 512, the firmware markers 506, the manufacturing markers 510, or a similar identifier. For example, the serial number markers 512 can include the identifiers ID1, ID2, and ID3 associated with different types of the programmable devices 128. Each of the programmable devices 128 associated with the appropriate identifier can be identified and authenticated by the circuit board where the circuit board has been provisioned with the public key 154 of the appropriate component. ID1, ID2 and ID3 can already be recorded in the MES 702 of FIG. 7 and can be crossed checked at this stage to ensure they have been provisioned by a trusted source. Validating the ID values recorded during the provisioning stage can enable the cross checking during the creation of the device birth certificate 512 of FIG. 5.

Although the provisioning process is described as using the serial number markers 512 to identify the related and authorized systems, it is understood that other elements within the device identification 302 can be used as well. For example, the programmable devices 128 can use another portion of the device identification 302, such as the manufacturing markers 510 or the firmware markers 506, to establish the security linkage between the trusted devices 130, such as the circuit board, and the programmable devices 128.

An advantage of the encoding a portion of the device identification 302 using the public key 154 associated with one of the elements of the secure programming system 100 is to provide an authentication mechanism to limit the interoperability of the programmable devices 128 and the trusted devices 130. By provisioning the programmable devices 128 with a value encoded by the public key 154 of one of the elements, the trusted devices 130 can verify that the programmable devices 128 are authorized to operate with the trusted devices 130 using the private key 152.

Figure 9:
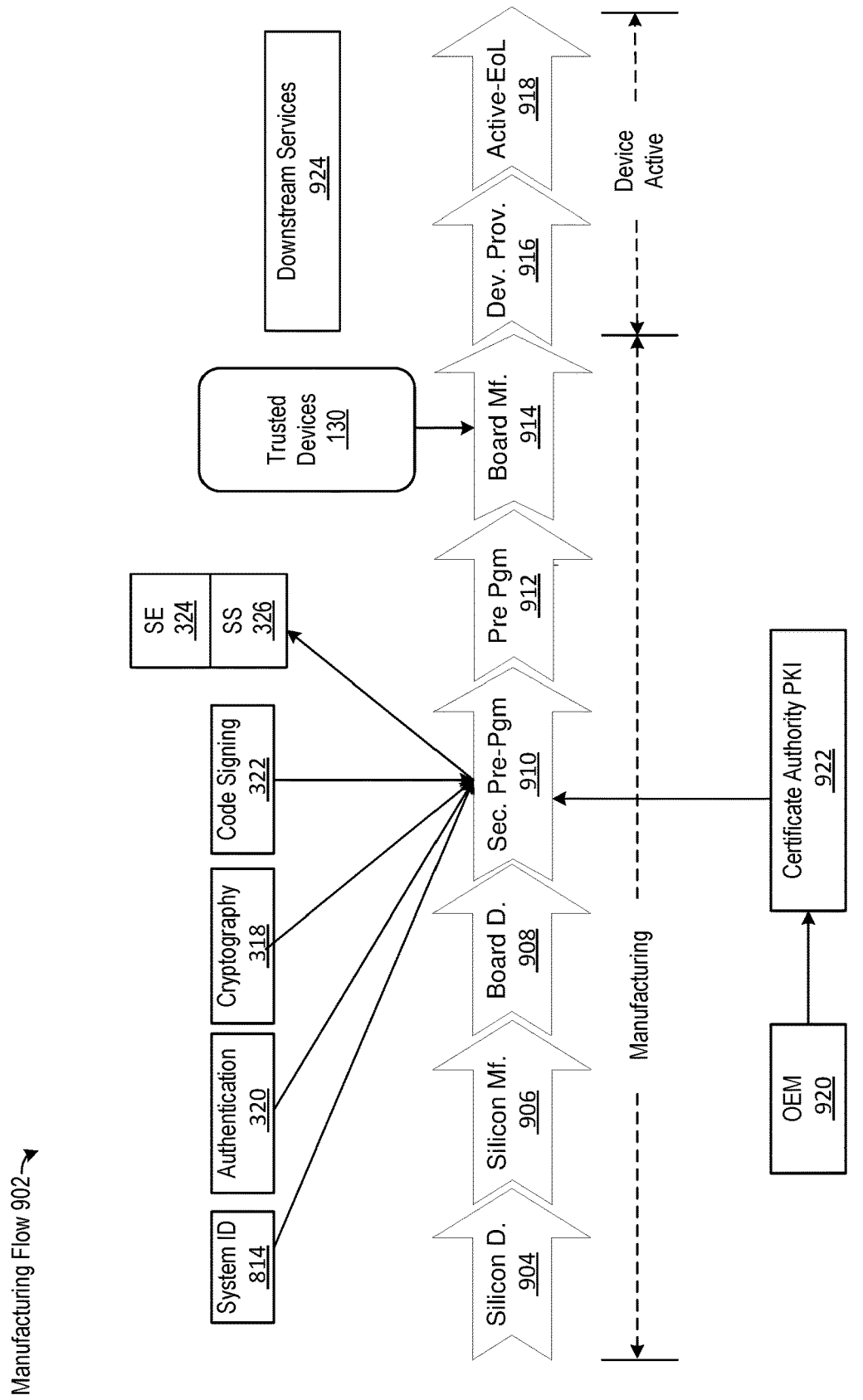
FIG. 9 is an example of a manufacturing flow for the trusted devices.

FIG. 9 illustrates an example of a manufacturing flow 902 for the trusted devices 130. The manufacturing flow 902 can describe the functionality for each stage of the manufacturing process for configuring the trusted devices 130 in the device life cycle.

The manufacturing flow 902 can include multiple stages for configuring the trusted devices 130. For example, the manufacturing flow 902 can include a silicon design stage 904, a silicon manufacturing stage 906, a board design stage 908, a security pre-programming stage 910, a pre-programming stage 912, a board manufacturing stage 914, a device provisioning stage 916, and a device operation stage 918.

In the silicon design stage 904, the design of the programmable devices 128 of FIG. 1 can provide for the inclusion of the system identification 814, root of trust factors, serial numbers, or other unique hardware level identifiers. For example, at the silicon design stage 904, the structure of a Flash memory unit can be configured to embed unique hardware level identifiers in pre-defined blocks or memory locations. In another example, the structure of a hardware security unit can be configured to include storage for the unique hardware level identifiers.

In the silicon manufacturing stage 906, the trusted devices 130 can be manufactured and configured based on the silicon design stage 904 information. For example, the trusted device 130 can be configured with the authentication module 320 and the cryptography module 322. The trusted devices 130 can also be configured with the values of the unique hardware level identifiers, such as the system identification 814, root of trust factors, serial numbers, or other similar identifiers.

In the board design stage 908, the system level board design for the trusted devices 130 can be established. The board level design can include the utilization and integration of the programmable devices 128 of FIG. 1, the secure execution unit 324, the secure storage unit 326, and other security related elements on the board. During the board design stage 908, the integration of the programmable devices 128 onto the board level of the other systems including another one of the trusted devices 130 can be performed. In one example, the integration of the programmable devices 128 into the system board design can create another embodiment of the trusted devices 130 by configuring the system board to include the programmable devices 128.

In the security pre-programming stage 910, the security certificates and other hardware level security information can be pre-calculated for programming into the programmable devices 128 in a later stage. The security pre-programming stage 910 can perform the security programming for the system. The security information may be used to certify that a device has a particular root of trust factor or other security information embedded in it. The security certificate can include the public key 154 of FIG. 1, encrypted data, encrypted code, or other security data or keys.

The security pre-programming stage 910 can include a variety of security actions. For example, the security pre-programming stage 910 can include receiving the key pairs 150 of FIG. 1 having the private key 152 of FIG. 1 and the public key 154 from a certification authority public key infrastructure unit 922 (certificate authority PKI) controlled by an external party, such as an original equipment manufacturer 920 (OEM). In another example, the security pre-programming stage 910 can receive the system identification 814 and the information from the authentication module 320, the cryptography module 318, and the code signing module 322 and prepare them for storage in the secure storage unit 326. The certificate authority PKI 922 can generate a security certificate. The security certificates are pre-programmed to certified that a device has a particular root of trust embedded in it. The security certificates can include the public key 154 associated with a particular root of trust. For example, each of the foundational roots of trust can be embedded in the programmable devices 128 using a separate certificate that can be generated externally by the OEM and signed by the certificate authority PKI 922. The private key 152 associated with the public key 154 of the key pairs can be stored in a hidden area of the secure storage unit 326. The security certificate can be stored in a read only area of the secure storage unit 326.

The unique hardware level identifiers, such as the root of trust factors, can be embedded into the secure storage unit 326 and enabled for the secure execution unit 324 via security programming in the security pre-programming stage. The security programming can be performed before the pre-programming of the programmable devices 128 and can include firmware and data programming.

Having the root of trust factors and other hardware level security identifiers implemented in the programmable devices 128 at design and manufacturing time increase security and improves the level of counterfeit detection. The hardware level security identifiers are configured to be difficult to spoof and are used to authenticate the pedigree of the devices.

Further, the root of trust and hardware level security identifiers are injected into the secure storage unit 326 using secure techniques to provides a strong system level root of trust and increase overall security. This can support the detection of counterfeit boards and devices.

The security pre-programming stage 910 can provide varying degrees of support for the secure execution unit 324 and the secure storage unit 326 to accommodate different needs of manufacturers and users. This provides a scalable, cost controllable, and simple process.

The security pre-programming stage 910 can provide a secret and secure programming process via custom tools in the programmer 112 of FIG. 1 which can provide individualized security configurations for each of the programmable devices 128. The programmer 112 can include a standardized set of security algorithms configured for each different device type of the programmable devices 128.

The secure programming system 100 of FIG. 1 provides a secure manufacturing environment by detecting and removing counterfeit devices, providing strong device identity and authentication support, and allows differentiated downstream services. Extending the firmware and data programming model extends data programming to security. This helps simplify the security programming model for securing the programmable devices 128. In an illustrative example, the silicon vendor can provide the device information, such as the In_RoT 504, serial number range, or other unique values, for each of the individual programmable devices 128. The device information can then be used to detect non-registered devices, which can then be removed as unregistered or counterfeit.

The pre-programming stage 912 can encrypt data and firmware elements and program the security information in the programmable devices 128 before the devices are installed in other systems and boards. The pre-programming stage 912 can configure the each of the programmable devices 128 with a unique security configuration including security identifiers, security keys, security algorithms, encrypted data and code, software version numbers, cyclic redundancy codes(CRC), data size, and other programmable information features. Such data can be stored in a database, MES, or other data system for later use.

The board manufacturing stage 914 is for implementing the information from the board design stage 908. The board manufacturing stage 912 can include constructing the systems and boards comprising the trusted devices 130. This can include installing the programmable devices 128 for implementing the security configuration of the boards and systems.

The device provisioning stage 916 can allow for updating the programmable devices 128 within the trusted devices 130. For example, the programmable devices 128 can be updated using a network connection, wired or wireless, for transferring secure information to the trusted devices 130 which can update the programmable devices 128 internally. In another example, the trusted devices 130 can receive updates, security data, additional security keys, or other security information and be configured outside of the secure programming system 100.

The device operation stage 918 can allow the trusted devices 130 to actively operate in the real-world. The device operation stage 918 can cover the device active time period and can last until the trusted devices 130 reach their end of life (EOL). The device active time period can include the time where the trusted devices 130 are manufactured and then operated in the real-world.

The trusted devices 130 can also receive downstream services 924 during the device active time period. The device active time period can encompass the device provisioning stage 916 and the device operation stage 918. The downstream services 924 can include provisioning operations, anti-tampering actions, and updates of the firmware, the operating systems, the applications, or other software and firmware components.

The secure manufacturing system 100 can enable secure manufacturing services for the trusted devices 130. The secure manufacturing system 100 overcomes the component level and the system level problems experienced by less secure systems. At the component level, few components have root of trust elements at silicon manufacture time. This allows the proliferation of counterfeit components because there is not mechanism to identify that pedigree of the components.

At the system level, many manufacturing systems are not embedding a separate root of trust element at the board level that reflects the component hardware and software that makes the system. This can include internet of things devices. In addition, some of the root of trust elements are injected into insecure storage system or are installed using insecure methods, both of which increase the level of insecurity.

In general, there is a lack of strong system level root of trust, which can result in a proliferation of system/board level counterfeits. Further, the lack of standard procedures provides varying degrees of support for secure storage and execution, leads to inconsistent security at best.

Secure programming issues include the security issues related to needing custom solutions, depending on secret programming processes using customized tools, using individually customized security algorithms, and the issues of scalability, cost and complexity.

The secure manufacturing system 100 enables secure manufacturing to allow the detection and removal of counterfeits, strong device identity and authentication, and enabling differentiated downstream services. The secure manufacturing system 100 extends the firmware/data programming model by extending data programming to include security features and simplifying security programming.

Adding security programming to data programming can help expand the market for pre-programming services. This can simplify the process by combining one algorithm for both data and security programming and help increase market share and adoption rates. In addition, leveraging security concerns can pull programming demand from external network vendors. Secure programming can keep keys and sensitive intellectual property more secure.

The secure manufacturing methodology creates strong and secure system level identity. The identity of the devices is created at the birth of the device. It is derived from the components used to build the systems and boards. The identity spans hardware, firmware, and software components. The identity of the devices is unique across all manufacturers, factories, subcontractors, and distributors. In addition, the identity can be stored securely off devices or on the devices.

A strong system identification enables a much higher level of device security, trust, and traceability for the remainder of the device lifecycle including the device operation period. By creating a unique system level identification based on existing silicon roots of trust and unique manufacturing data, the manufacturing supply change can be secured. Counterfeit parts will not have the required root of trust and can be eliminated. In addition, compromised firmware in components and boards can be detected and flagged as an error condition. Further, downstream services can leverage system identification as a foundation to build and offer trusted services.

Figure 10:
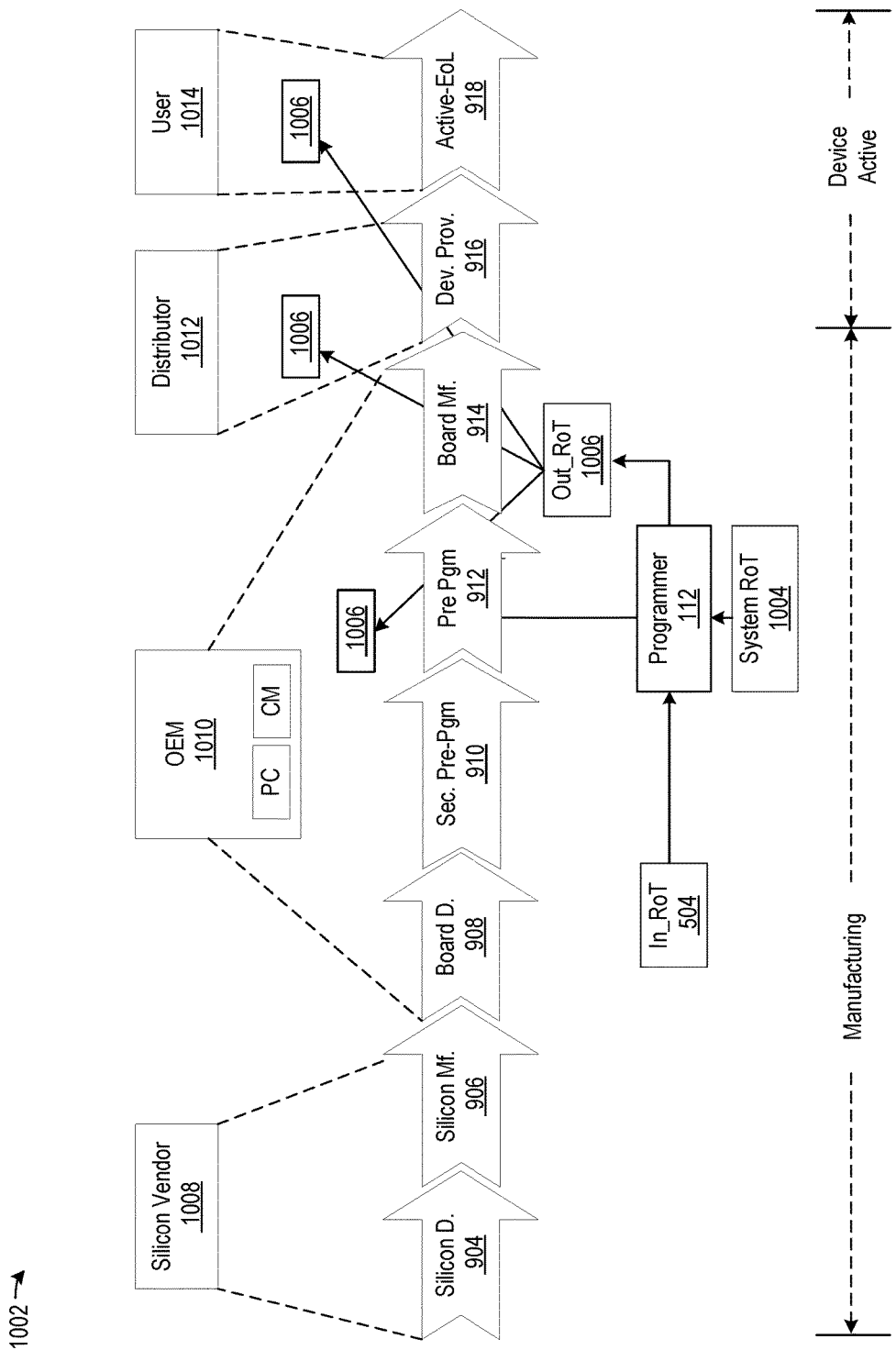
FIG. 10 is an example of a root of trust data flow for the trusted devices.

FIG. 10 illustrates an example of a root of trust data flow 1002 for the trusted devices 130 of FIG. 1. The root of trust data flow 1002 can describe the data flow of the incoming root of trust 504, the system root of trust 1004, and the outgoing root of trust 1006 in the device lifecycle.

The incoming root of trust 504 can represent the roots of trust already programmed into the component devices in a previous phase such as the silicon manufacturing stage 906 be received by the programmer 112.

The system root of trust 1004 is a security element for component devices. The system root of trust 1004 can be an identifier for the secure programming system 100 of FIG. 1, the secure programming unit 110 of FIG. 1, the programmer 112, or a similar identifier. The system root of trust 1004 represent the components comprising the system, such as the components on a board.

The system root of trust 1004 can have a variety of configurations. For example, the system root of trust 1004 can include a serial number of a component of the secure programming system 100, a unique security identifier, a location of the secure programming system 100, or other unique identifier related to the secure programming system 100.

The outgoing root of trust 1006 is a security element. The outgoing root of trust 1006 is an identifier incorporating the incoming root of trust 504 of each of the programmable devices 128 of FIG. 1 and the system root of trust 1004 from the secure programming system 100 or related component. The outgoing root of trust 1006 can be programmed into each of the trusted devices 130 to provide an individualized security identifier that can link the trusted devices 130 with the secure programming system 100.

The outgoing root of trust 1006 can be used at different stages of the device lifecycle. For example, the outgoing root of trust 1006 can be programmed into the trusted devices 130 at during the security pre-programming stage 910 or the pre-programming stage 912. In another example, the outgoing root of trust 1006 can be used during manufacturing to verify the trusted devices 130 during the device provisioning stage 916. This verification can be used to determine if a device is genuine including detecting counterfeit devices, unauthorized devices, or other improper devices. In yet another example, the outgoing root of trust 1006 can be received by one of the trusted devices 130 after manufacture and during the device operation stage 918.

The outgoing root of trust 1006 is calculated based on the incoming root of trust 504 and the system root of trust 1004 and can have a variety of configurations. For example, the outgoing root of trust 1004 can be a calculated value based on the two other roots of trust. The outgoing root of trust can be calculated by concatenation, hashing the input values, encrypting the input values, values, combining the input values using a mathematical algorithm, or a combination thereof. The outgoing root of trust 1006 can be a single value, a multiple value data structure, an encrypted value, a clear alphanumeric value, a matrix, a binary value, or a combination thereof.

The root of trust data flow 1002 can describe the entities involved in the overall device life cycle. For example, a silicon vendor 1008 can provide the programmable devices 128 to be programmed by the secure programming system 100. The silicon vendor 1008 is involved in the device lifecycle during the silicon design stage 904 and the silicon manufacturing stage 906.

An original equipment manufacturer 1010 (OEM) can be involved in the device lifecycle during the board design stage 908, the security pre-programming stage 910, the pre-programming stage 912, and the board manufacturing stage 914. The OEM 1010 can receive the outgoing root of trust 1006 and utilize it during the various stages. For example, the OEM 1010 can receive the outgoing root of trust 1006 and embedded it on the board during the security pre-programming stage 910. The OEM 1010 can be associated programming centers (PC) and contract manufacturing (CM) facilities that can be authorized to perform security and data programming for the OEM 1010.

The device lifecycle can also address distributors 1012. The distributor 1012 can provide the trusted devices 130 and provision them using the outgoing root of trust 1006. The distributor 1012 can receive the outgoing root of trust 1008 and distribute it to the appropriate devices as needed.

A user 1014 can also be part of the device lifecycle. The user 1014 can receive the outgoing root of trust 1006 and use it to enable functionality or content on the trusted devices 130. The outgoing root of trust 1006 can be distributed to the users electronically, in physical form, by direct contact, or a combination thereof.

For data, firmware, and application programming, different types of security information can be received by the trusted devices 130 using different channels during the device lifecycle based on the size of the data. For example, at the silicon manufacturing stage 906, the programming information transferred for the silicon manufacturing can be less than 1 kilobytes (KB). The information transferred during the pre-programming stage 912 can typically be between 50 KB and 32 gigabytes (GB). This is a typical example for the programmable devices 128 of FIG. 1.

The information transferred via an internet service provider (ISP) can also be between 50 KB and 32 GB. This information can be transferred during the board manufacturing stage 914.

The secure programming system 100 can increase effectiveness and flexibility for secure manufacturing. The system can provide a variety of secure manufacturing features including programming support, security programming, counterfeit detection, traceability and intellectual property protection, trust-enabled devices, and many other security features.

The trusted devices 130 can provide secure device service and secure application services. For example, the trusted devices 130 can provide pay per use access to third party user, device, and application services. In another example, the trusted devices 130 can provide device level services and user level services.

Figure 11:
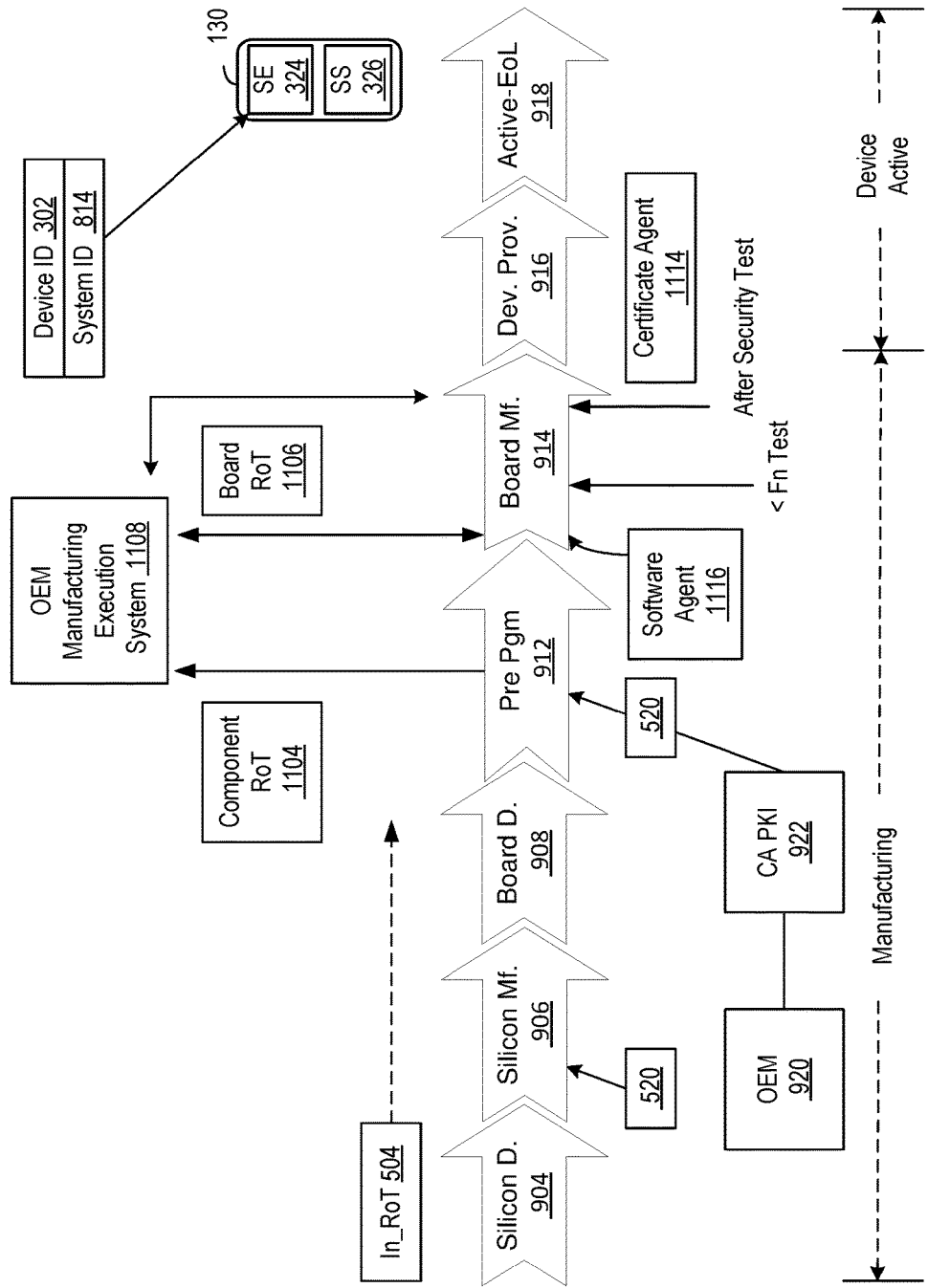
FIG. 11 is an example of a secure device manufacturing flow.

FIG. 11 illustrates an example of a secure device manufacturing flow 1102. The secure device manufacturing flow 1102 can describe the data flow of the incoming root of trust 504, a component root of trust 1104, and a board root of trust 1106 in the device lifecycle.

The secure device manufacturing flow 1102 can describe the device lifecycle including the silicon design stage 904, the silicon manufacturing stage 906, the board design stage 908, the pre-programming stage 912, the board manufacturing stage 914, the device provisioning stage 916, and the device operation stage 918. The secure device manufacturing flow 1102 shows the implementation and embedding of the roots of trust during manufacture of the trusted devices 130.

The component root of trust 1104 is generated by combining the In_RoT 504 on one of the programmable devices 128 and roots of trust that are generated during the programming phase. This can include the other components of the device birth certificate 520.

At the board level, the board root of trust 1106 is created during the board manufacturing stage 914. The board root of trust 1106 cannot be created during pre-programming stage 912 because at the pre-programming stage 912, the components have not been associated or placed on any particular board. The pairing of each of components, such as one of the programmable devices 128, with one of the boards is established during the board manufacturing stage 914.

When one of the trusted devices 130 is booted the first time, a software agent 1116, such as a boot time identifier read agent, can execute on the trusted device 130. The software agent 1116 can read the component root of trust 1104 associated with the components on the board to create the board root of trust 1106. Thus, the board root of trust 1106 is directly linked with each of the component root of trust 1104 of the devices used to manufacture the board.

The system identification 814 can be formed in a variety of ways. For example, the system identification 814 can be a combination or hash value of the component root of trust 1104 of the devices installed on a particular board.

A device certificate can be associated with one of the trusted devices 130. The board root of trust 1106 can be the device birth certificate for one of the trusted devices 130. An empty or incomplete device certificate can be formed during the pre-programming stage 912. A certificate agent 1114 can update the empty device certificate with the board roots of trust and/or system identification 814 after it is created during the board manufacturing stage 914.

In another example, the incoming root of trust 504 can be combined with the component root of trust 1104 in the pre-programming stage 912 to uniquely identify the trusted devices 130. The component root of trust 1104 is a root of trust associated with one of the programmable devices 128. Each of the programmable devices 128 can have an individual component root of trust 1104. The component root of trust 1104 can be calculated using the device birth certificate 520 for each of the components.

The component root of trust 1104 can be a combination of the ID tokens 624 of FIG. 6, the manufacturing markers 510 of FIG. 5, the incoming root of trust 504 of FIG. 5, and other security values. The component root of trust 1104 can be recorded and received by an OEM manufacturing execution system 1108 (OEM MES). The OEM MES 1108 can manage the manufacturing environment including capturing and managing manufacturing data including the installation information about the programmable devices 128 on the boards. The OEM MES 1108 can coordinate the calculation of the board root of trust 1106 for each of the boards being manufactured and transfer the board root of trust 1106 to the boards of the trusted devices 130 or back to the OEM MES 1108. The calculation of the board root of trust 1108 can be performed at board manufacture time and before the functional testing of the boards during the board manufacturing stage 914.

The trusted device 130 can receive the device birth certificate 520 having the system identification 814 and the device identification 302 during the board manufacturing stage 914. As part of the board manufacturing stage 914, the system can perform an after security test to validate the certificate agent 1114.

The system level root of trust can be kept in the OEM MES 1108 or embedded in the trusted devices 130. The certificate agent 1114 can update a dummy certificate having component information in it that has not been finalized to include the board root of trust 1106.

Figure 12:
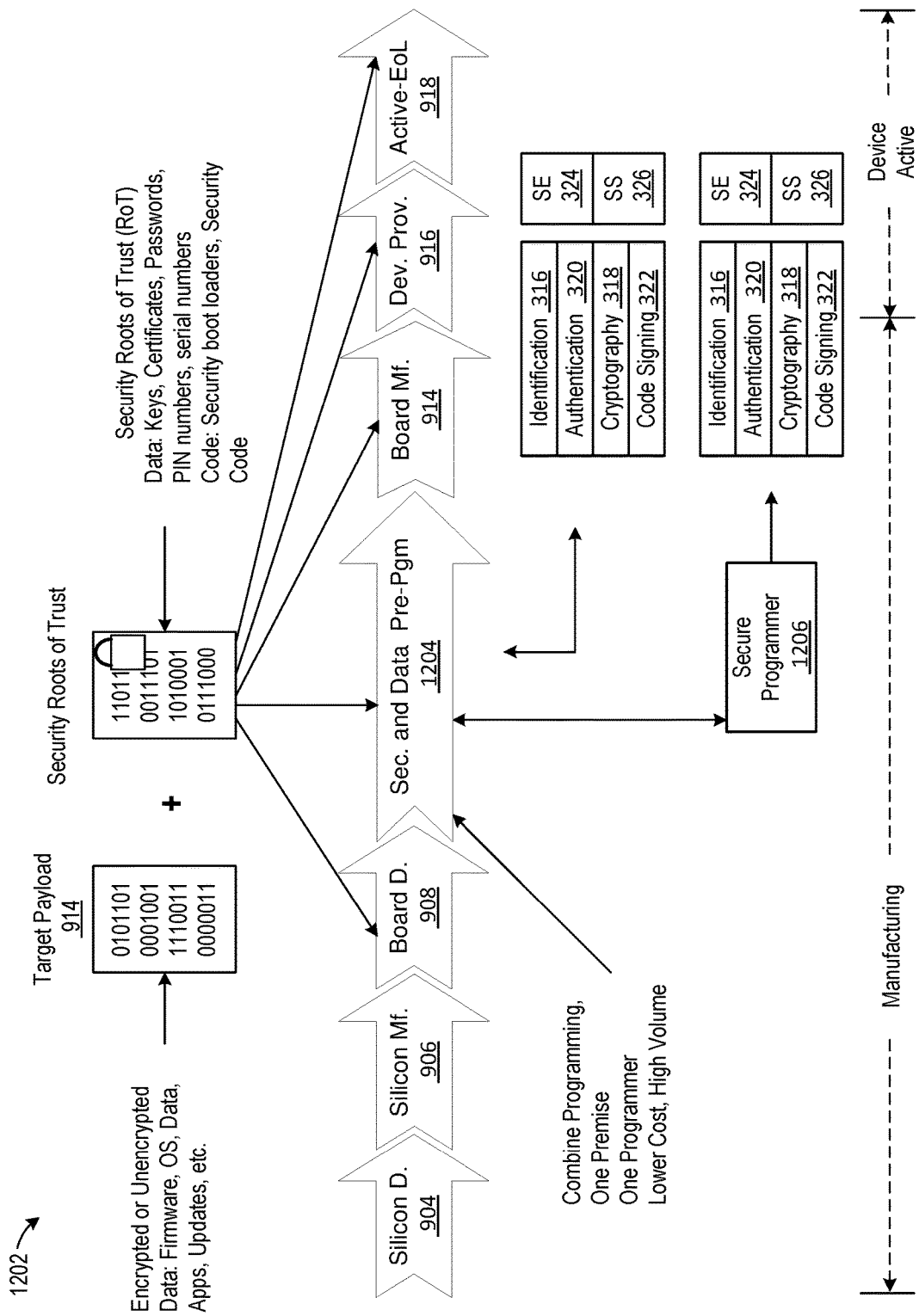
FIG. 12 is an example of the secure programming process flow.

FIG. 12 illustrates an example of a secure programming process flow 1202. The secure programming process flow can write security information to the trusted devices 130 of FIG. 1 during a security and data pre-programming stage 1204. The sequence of stages includes the silicon design stage 904, the silicon manufacturing stage 906, the board design phase 908, the security and data pre-programming stage 1204, the board manufacturing stage 914, the device provisioning stage 916, and the device operation stage 918.

The secure programming system 100 of FIG. 1 can program the trusted devices 130 with the target payload 914. The target payload 914 can include encrypted or unencrypted data, firmware, and applications in a secure manner using the secure programmer 1206. The secure programmer 1206 can embed encrypted or unencrypted data such as firmware, operating system, data, application, updates, etc. In addition, the secure programmer can install the security roots of trust in the trusted devices 130. This can include both data and code. The data can include keys, certificate, passwords, PIN numbers, and other similar security data elements. The code can include security boot loaders, security code, and other similar active code elements.

The secure programming system 100 can combine the programming of code and data using the secure programmer 1206. This can reduce costs for high volume production of devices.

The secure programmer 1206 can be enhanced with security features including having the identification module 316, the authentication module 320, the cryptography module 318 and the code signing module 322. The security modules can execute in the secure execution unit 324 and access the secure storage unit 326. Additionally, the trusted devices 130 may also access the secure modules. In order to program the foundational roots of trust into component devices, the programmer 112 of FIG. 1 must be a trusted device. It must embody the foundational roots of trust in the design and architecture of the programmer 112.

Figure 13:
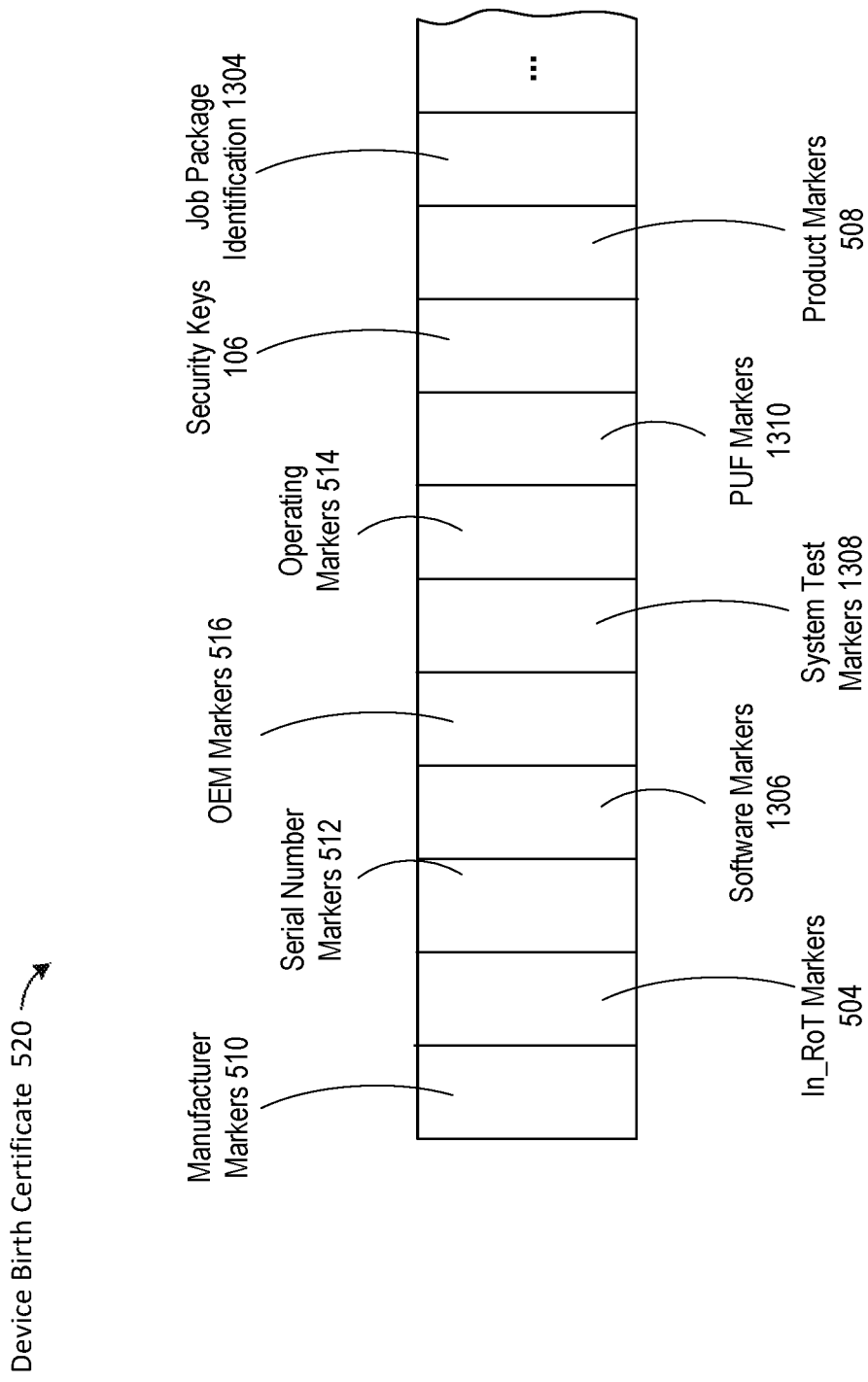
FIG. 13 is an example of a device birth certificate.

FIG. 13 illustrates an example of the device birth certificate 520. The device birth certificate 520 is a set of secure data parameters that are embedded in each of the programmable devices 128 that form a system device at manufacture time. The device birth certificate 520 can include information on the entities and locations where the programmable devices 128 of FIG. 1 were manufactured to provide a way to authenticate the programmable devices 128.

The device birth certificate 520 can include a variety of information. The device birth certificate 520 can include the manufacturing markers 510, incoming roots of trust markers 504, the serial number markers 512, the software markers 1306, the OEM markers 516, the system test markers 1308, the operating markers 514, physically unclonable functions 1310 (PUF), the security keys 106, the product markers 508, a job package identification 1304, location identification, facility information, programming center information, or other similar security values. The device birth certificate 520 can include the device identification 302 of FIG. 3 and extends the information by including additional information about each step in the manufacturing process such as component manufacture, programming configuration, programming location, job package information, and other related properties.

The physically unclonable functions 1310 are physical entities embodied in a physical structure that is easy to evaluate but hard to predict. The physically unclonable functions 1310 are physical features in one of the programmable devices 128 that can be added during manufacturing process, but are difficult to duplicate. This can be considered the hardware equivalent of a one-way function.

The device birth certificate 520 or components of the device birth certificate 520 may be stored in secure non-volatile memory areas of the programmable devices 128 with a variety of features. Each of the secure non-volatile memory areas may provide varying degrees of security. For example, the features may include one-time programming (OTP) areas, device private OTP areas, hardware fuses, Read-Only Memory (ROM), write protected memory, cryptographically controlled memory access areas (e.g., Replay Protected Memory Block (RPMB), etc.), etc. Also, for example, these features may apply to the programmable devices 128.

Figure 14:
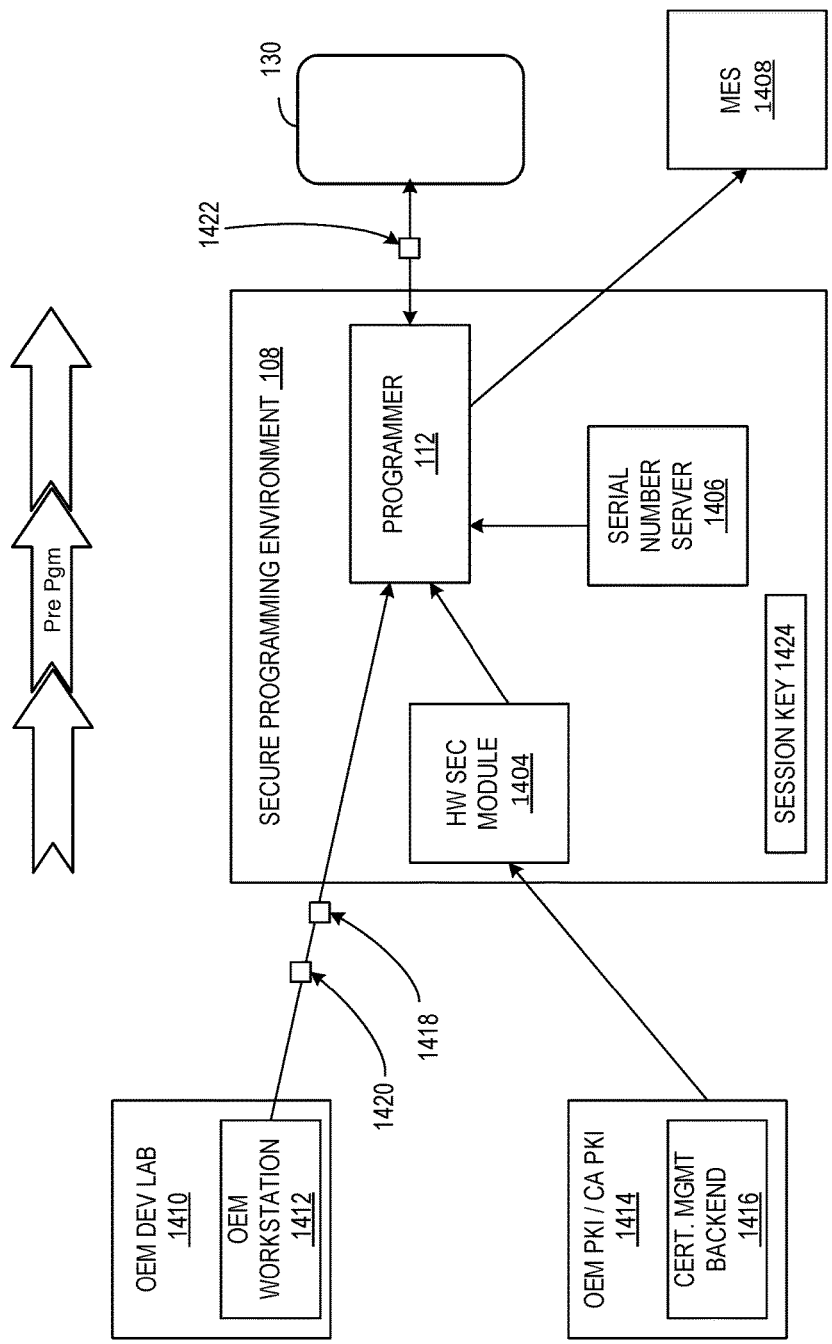
FIG. 14 is an example of a secure programming environment.

FIG. 14 illustrates an example of the secure programming environment 108. The secure programming environment 108 can include additional security elements to increase the level of security for the programmer 112.

The secure programming environment 108 can have a variety of configurations for performing different functions. For example, the secure programming environment 108 can include the programmer 112, a hardware security module 1404, and a serial number server 1406. The hardware security module 1404 can provide the programmer 112 with additional security functionality such as encryption, decryption, and other similar functions. The hardware security module 1404 can generate the security elements needed to embed the foundational roots of trust, such as the security keys, key pairs, or other similar elements. The hardware security module 1404 can be used by the programmer 112 to execute cryptographic and security code.

The serial number server 1406 can provide the programmer 112 with the serial numbers for the programmable devices 128 of FIG. 1. The serial number server 1406 can provide serial numbers in a variety of ways. For example, the serial number server 1406 can generate serial numbers, provide serial numbers from a feed, or a combination thereof. The serial numbers can be distributed over a particular serial number range, be contiguous, noncontiguous, uniformly distributed, or based on a mathematical formula.

The secure programming environment 108 can receive a job control package 1418 from an OEM workstation 1412 associated with an OEM development laboratory 1410. The job control package 1418 can be associated with a target payload 1420 and other security and control to be programmed into the programmable devices 128. The target payload 1420 can be encrypted to form an encrypted payload 1422 that can be transferred to the programmable devices 128.

The target payload 1420 is the information to be encrypted and programmed into the programmable devices 128. The target payload 1420 can include data, code, security keys, and other information. For example, the target payload 1420 can be secure firmware code to be executed on the trusted devices 130. In another example, the target payload 1420 can include different data elements combined together, such as a set of additional security keys and one or more software modules.

The job control package 1418 comprises the information needed to configure and program the programmable devices 128 with the target payload 1420. The job control package 1418 can include programming instructions, security information, programmer configuration information, device configuration information, and other similar job information.

The secure programming environment 108 can receive security information from an OEM/CA public key infrastructure system 1414 having a certificate management backend 1416. The certificate management backend 1416 can calculate the security keys and the individual device certificates for each of the programmable devices 128 to be programmed.

The programmer 112 can encrypt the target payload 1420 individually for each of the programmable devices 128. For example, the certificate management backend 1416 and the hardware security module 1408 can provide individual security keys 106 of FIG. 1 for each of the programmable devices 128. In another example, the programmer 112 can combine the security keys 106 with the individual serial numbers provided by the serial number server 1406 to generate the encrypted payload 1422. The programmer 112 can then transfer the encrypted payload 1422 to the specific one of the trusted devices 130 mounted in the device adapters 208 of FIG. 2 and individually customize each of the programmable devices 128.

In another embodiment, the security provisioning of devices can be performed by embedding the roots of trust in the programmable devices 128. The key pairs 150 of FIG. 1 are generated in the hardware security module 1408 and then the private keys 152 of FIG. 1 can be programmed into the programmable devices 128 without being exposed outside of the secure programmable environment 108. The public keys 154 of FIG. 1 of the key pairs 150 are transformed into certificates in the hardware security module 1404. The certificates can then be programmed into the programmable devices 128. The public keys 154 for each of the key pairs 150 can also be extracted and put into an OEM key management system back end server infrastructure, such as the certificate management backend 1416.

In an illustrative example, the secure programming system 100 of FIG. 1 can program encrypted firmware into the programmable devices 128 where the encrypted firmware has been encrypted using a symmetric key K1. The encrypted firmware can be an encrypted payload 1422. The firmware can be code such as boot loaders, applications, operating system elements, or other code elements. There are two variants on how the problem is solved.

In the first variant, the encrypted firmware can be programmed into programmable device and then decrypted on one of the programmable devices 128 using the symmetric key K1. This requires that encrypted firmware image and the symmetric key K1 are programmed into the programmable devices without being exposed. A programming job, such as the job control package 1418, can be created from the encrypted firmware image and then programmed into one of the programmable devices 128. The symmetric key K1 can then be securely injected first into the hardware security module 1404. The programmer 112 and hardware security module 1404 can authenticate each other using the symmetric key K1 and create a shared secret key, such as a session key 1424, that is used to encrypt the symmetric key K1 in the hardware security module 1404 and send it to the programmer 112. The programmer 112 can use the session key 1424 to decrypt the encrypted symmetric key K1 and then program symmetric key K1 into one of the programmable devices 128. This is the most secure methodology. Because the session keys 1424 are dynamic in nature, the programmer 112 knows a priori what the encryption key is.

In a second variant, if the programmable devices 128 lacks encryption/decryption capability, the decryption of the firmware image can be done on the programmer 112 and then the firmware image can be programming into one of the programmable devices 128 by the programmer 112.

The secure programming environment 108 and the programmer 112 can be integrated with the hardware security module 1404 to enable secure key and certificate programming, as well as security kernel programming.

The secure programming environment 108 can enhance job control and job running to protect data and firmware intellectual property. The secure programming environment 108 can support data and firmware integrity such that intellectual property cannot be changed in transit to devices. The secure programming environment can support data and firmware confidentiality such that the intellectual property cannot be stolen and reverse engineered. Unauthorized entities cannot access the secure content.

The secure programming environment 108 can utilize an Enhanced programmer architecture. The programmer 112 can cryptographically identify and authenticate itself (PKI citizen) to other systems accessible on the secure network. The programmer 112 can securely boot itself. The programmer 112 can securely decrypt the firmware and data elements without exposure of the data or the security keys. Finally, the programmer 112 can read device serial numbers and cryptographically authenticate devices.

The programmer 112 can program security kernels, program keys, locally generated read keys, program data and firmware, and other security elements. The programmer 112 can operate in a secure premise having sufficient physical and access security to detect or prevent external access and tampering.

The secure programming environment 108 can support and interface to the manufacturing execution system 1408 to record per device information, such as serial numbers, public keys, public certificates, per device programming data, and job control information. The MES 1408 can be secured to prevent unauthorized access and to protect the secure data.

Figure 15:
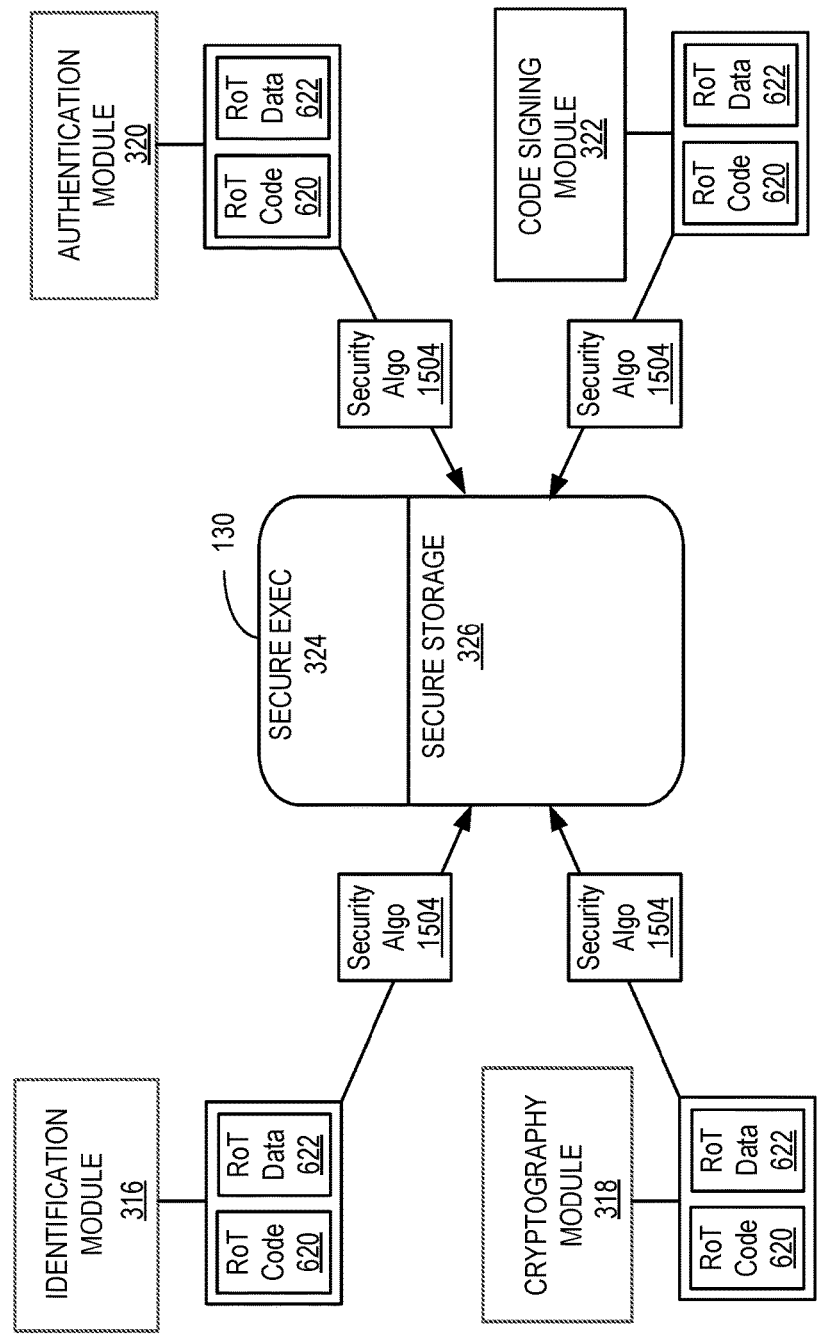
FIG. 15 is an example of a manufacturing flow with security algorithms.

FIG. 15 illustrates an example of a manufacturing flow with security algorithms 1502. The manufacturing flow with security algorithms 1502 provides a simplified method of manufacturing the trusted devices 130.

The secure programming system 100 of FIG. 1 can program a variety of the programmable devices 128 of FIG. 1. For example, the programmable devices 128 can be flash memory devices, FPGA devices, hardware security modules, smart phones, consumer devices, or similar electronic products that have a need for security. Because each of the device types can require different operations to program it, the secure programming system 100 can implement a system of security algorithms 1504 to provide a uniform programming interface to simplify device programming.

The security algorithms 1504 can be used at each interface between the system and the trusted devices 130. For example, the security algorithms 1504 can receive the root of trust code 620 and the root of trust data 622 from the identification module 316, the authentication module 320, the cryptography module 318 or the code signing module 322. Each of the security algorithms 1504 can be used to provide a uniform interface to access the security features of the particular type of the trusted devices 130 being programmed. The security algorithms 1504 can provide a uniform interface with the secure execution unit 324 and the secure storage unit 326 for each of the modules.

The security algorithms 1504 can be used to embed the roots of trust into the trusted device 130. The security algorithms 1504 can be customized for each device type and can store code and data for each root of trust in the secure storage unit 326. The security algorithms 1504 can configure the data and code to run in the secure execution unit 324 and utilize the secure execution features of one of the trusted devices 130.

The security algorithms 1504 can expose a standardized programming interface for access by the device firmware. The security algorithms 1504 simplify security programming by abstracting away the complexity of mapping the key security use cases to a system. This simplifies embedding the uses cases into the devices.

In another example, the security algorithms 1504 can be used to implant different roots of trust in the secure storage unit 326. The programmable devices 128, such as flash memory units, can require specialized actions to write the data into the secure storage unit 326. The specialized action can include identifying a private block of memory, activating a security fuse, using write only memory, or similar actions.

Figure 16:
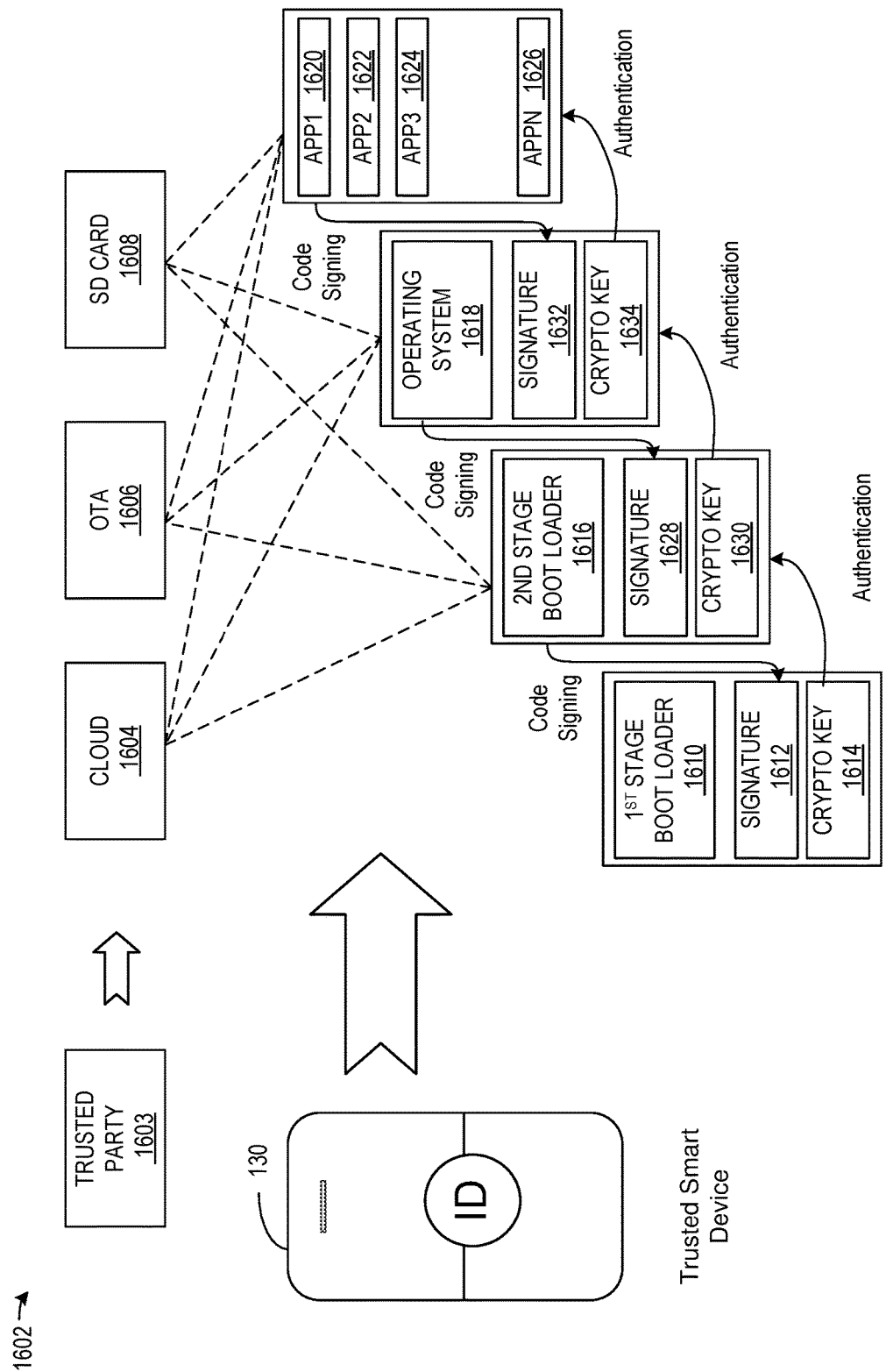
FIG. 16 is an example of a secure boot use case.

FIG. 16 illustrates an example of a secure boot use case 1602. The secure boot use case 1602 can describe the process for booting one of the trusted device 130 in a secure manner using only authenticated boot code. In addition, the secure boot use case 1602 can be used for performing an over the air firmware update, install over the air applications, and peripheral authentication.

Before loading code on to one of the trusted devices 130, it must be authenticated that the code came from a trusted party 1603 and that the code has not been tampered with. Encrypted items, such as software items, can be signed with a signature key to authenticate the source. For example, an item encrypted using the private key of the key pair can be authenticated using the public key.

The code can include a first stage boot loader 1610, a second stage boot loader 1616, an operating system 1618, firmware, applications, or other similar code elements. Each of the code elements can include a signature and a cryptographic key for authentication.

The first stage boot loader 1610 can authenticate the second stage boot loader 1616 by sending a cryptographic key 1614 to the second stage boot loader 1616 and receiving a signature 1612 back. The second stage boot loader 1616 can authenticate the first stage boot loader 1610 if the signature 1612 and the cryptographic key 1614 are correct.

The second stage boot loader 1616 can authenticate the operating system 1618 by sending a cryptographic key 1630 to the operating system 1618 and receiving a signature 1628 back. The second stage boot loader 1616 can authenticate the operating system 1618 if the signature 1628 and the cryptographic key 1630 are correct.

The operating system 1618 can validate applications before execution by passing a cryptographic key 1634 to the applications and getting a signature 1632 back. The operating system can authenticate the applications, if the signature 1632 and the cryptographic key 1634 are correct. The applications can include a first application 1620, a second application 1622, a third application 1624, and a nth application 1626.

The first stage boot loader 1610 is programmed into one of the trusted device 130 at manufacture time. The second stage boot loader 1616, the operating system 1618, and the applications can be received in a variety of ways. For example, they can be received at manufacture time, from the cloud 1604, as an over the air download 1606, from a removable secure digital card 1608, or a combination thereof.

An authentication key can be used to authenticate with the peripheral medium on which the update is stored. By authenticating a security element with the authentication key, the system can insure that the content has been provided by the owner of the authentication key. A signature key can also be used to guarantee the authenticity of the party that released the software update, such as an OEM. The signature key can also be used to verify that the software update has not been modified in transit.

Figure 17:
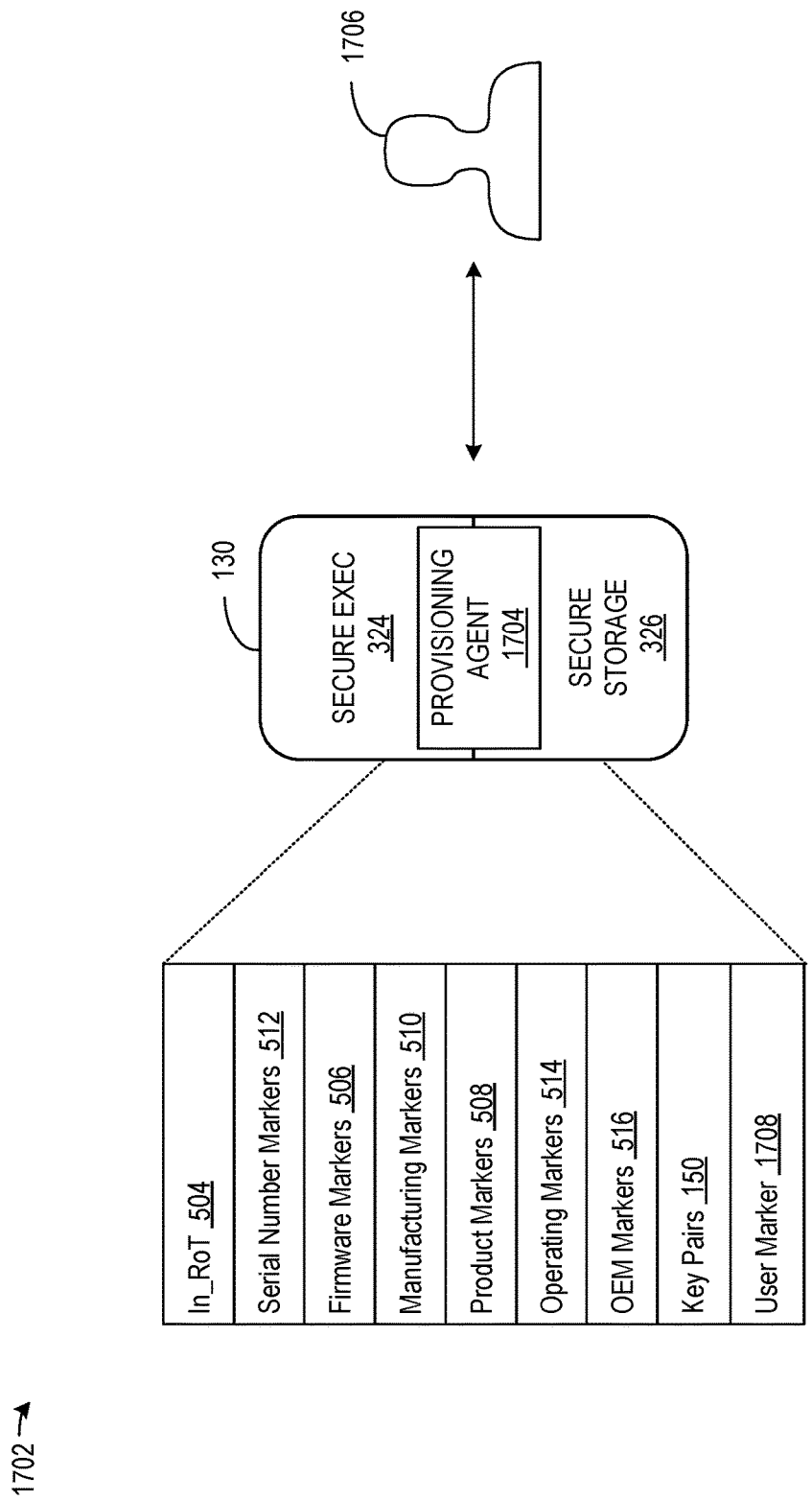
FIG. 17 is an example of a device provisioning use case.

FIG. 17 illustrates an example of a device provisioning use case 1702. The device provisioning use case 1702 can show the process for deploying new code and data to one of the trusted devices 130 by an original equipment manufacturer, a network operator, or a telecommunications carrier.

During the operational stage of the device lifecycle for the programmable devices 128 of FIG. 1, a provisioning agent 1704 can be activated on one of the trusted devices 130. The provisioning agent 1704 can securely receive updated code and data and installed them within the trusted device 130.

The provisioning agent 1704 can validate and authenticate the incoming code and data to ensure that the provisioning operation is allowed. The provisioning agent 1704 can access the device birth certificate 520 of FIG. 5 and verify that the embedded values of the incoming code and data are consistent with the values in use. The incoming code and data can be tagged with the correct security elements for the targeted one of the trusted devices 130.

The provisioning process can be initiated automatically by an authorized service provider such as the OEM, the network operations, or the telecommunications carrier. Alternatively, the provisioning process can be initiated manually by a provisioning user 1706.

The device birth certificate 520 can include the incoming root of trust 504, the serial number markers 512, the firmware markers 506, the manufacturing markers 510, the product markers 508, the operating markers 514, the OEM markers 516, the key pairs 150 of FIG. 1, user markers 1708, or other similar security elements. The provisioning agent 1704 can execute on the trusted device 130 having the secure execution unit 324 and the secure storage unit 326. For example, the user markers can include user information such as name, address, email, phone, carrier plan, or other similar user information elements.

The provisioning agent 1704 can be software or firmware executing with the secure execution unit 324 and using data from the secure storage unit 326. The provisioning agent 1704 can include internal checksums or markers that can be calculated by a code signing module and used to authenticate code of the provisioning agent 1704. The code of the provisioning agent 1704 can be checked at manufacture or provisioning time or can be checked by another module within the one of the trusted devices 130.

In an illustrative example, the provisioning agent 1704 can be used to provision the user information on one of the trusted devices 130. The provisioning agent 1704 may add the user related metadata to a device birth certificate by extending it to include the user data during the active phase, such as when a new user is introduced. The provisioning agent 1704 allows secure updates of the security metadata of one of the trusted devices 130.

Figure 18:
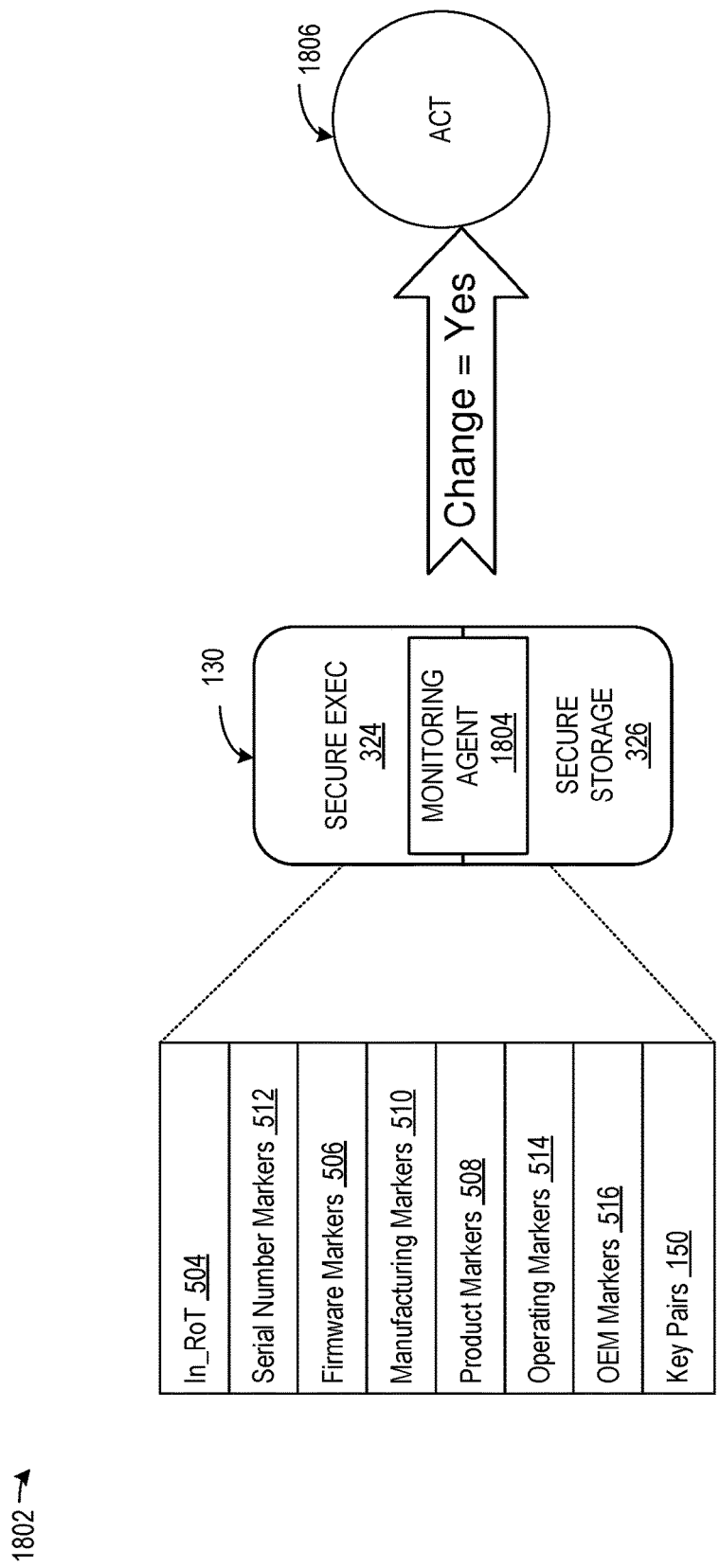
FIG. 18 is an example of a tamper detection use case.

FIG. 18 illustrates an example of a tamper detection use case 1802. The tamper detection use case 1802 describes the detection of unauthorized changes in code or data in the programmable devices 128 of FIG. 1.

During the operational stage of the device lifecycle for the programmable devices 128, a monitoring agent 1804 can be activated on one of the programmable devices 128. The monitoring agent 1804 can access the device birth certificate 520 of FIG. 5 and verify that the embedded values are consistent with the values in use.

The device birth certificate 520 can include the incoming root of trust 504, the serial number markers 512, the firmware markers 506, the manufacturing markers 510, the product markers 508, the operating markers 514, the OEM markers 516, key pairs 150, or other similar security elements. The monitoring agent 1804 can execute on the trusted device 130 having the secure execution unit 324 and the secure storage unit 326.

The monitoring agent 1804 can be software or firmware executing with the secure execution unit 324 and using data from the secure storage unit 326. The monitoring agent 1804 can include an internal checksum or marker that can be calculated by a code signing module and used to authenticate code of the monitoring agent 1804. The code of the monitoring agent 1804 can be checked at manufacture or provisioning time or can be checked by another module within the one of the trusted devices 130.

In an illustrative example, the monitoring agent 1804 can check the serial number markers 512 against the available serial number of one of the programmable devices, such as a trusted smart device. If the two values do not match, then the monitoring agent 1804 can detect the change and initiate the appropriate security action 1806. The security action 1806 can include stopping operation, sending a security message, displaying a security message, providing an error message, quarantining the device, or a combination thereof.

In another example, the monitoring agent 1804 can check the firmware markers 506 against the currently available firmware within the trusted smart device. If the values do not match, then the currently available firmware can be deleted and a new version requested to correct the problem.

Figure 19:
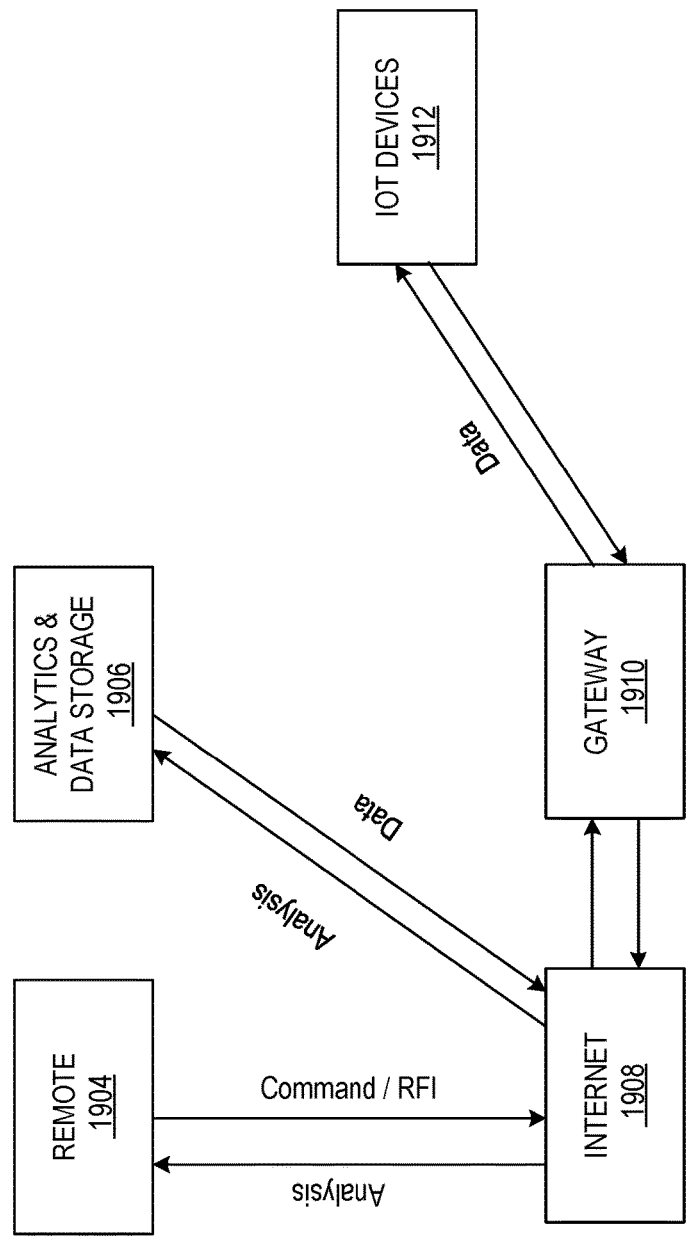
FIG. 19 is an example of an internet of things use case.

FIG. 19 illustrates an example of an internet of things use case 1902. The internet of things use case can describe the flow of secure information for deployed IoT device, such as the trusted devices 130 of FIG. 1.

The IoT devices 1912 can communicate with the internet 1908 via a gateway 1910. A remote system 1904 can exchange data and analysis information via the internet 1908 to an analytics data storage unit 1906.

Each of the IoT devices 1912 can have the device identification 302 of FIG. 3. Each of the IoT devices 1912 can be serialized and have separate and unique values for the device identification 302.

The system can protect communication between devices and between devices and peripherals. This can be accomplished by building trust between devices using device authentication. Additionally, the confidentiality of data transfer can be increased by using data encryption and decryption to protect the data in transit.

The system can implement device hardening to protect devices from attack. This can be done by limiting the execution of code on the devices to authorized code for both firmware and application code. This can be done using secure boot protocols, code signing, and other similar techniques. In addition, the devices can implement runtime protection to help prevent code and data interception attacks using application sandboxing and virtualization. For example, the system can utilize secure execution modules and secure storage modules such as the ARM TrustZone® or similar systems.

Secure device management can be implementing using secure over the air update of firmware and software during provisioning in the operational portion of the device lifecycle. This can provide additional protection for code and data updates transferred over less secure channels.

Finally, the overall system security is enhanced by leveraging Internet of Things analytics to flag anomalies. For example, big data analysis can be provided by the analytics and data storage module 1906 to evaluate and detect unusual network and data events related to potential security threats.

In an illustrative example, the system can send a shutdown command to all of the IoT devices 1912 that are shown to be compromised. In another example, the remote system 1904 can send the request for information to some of the IoT devices 1912 to gather additional information needed to evaluate a security threat.

Figure 20:
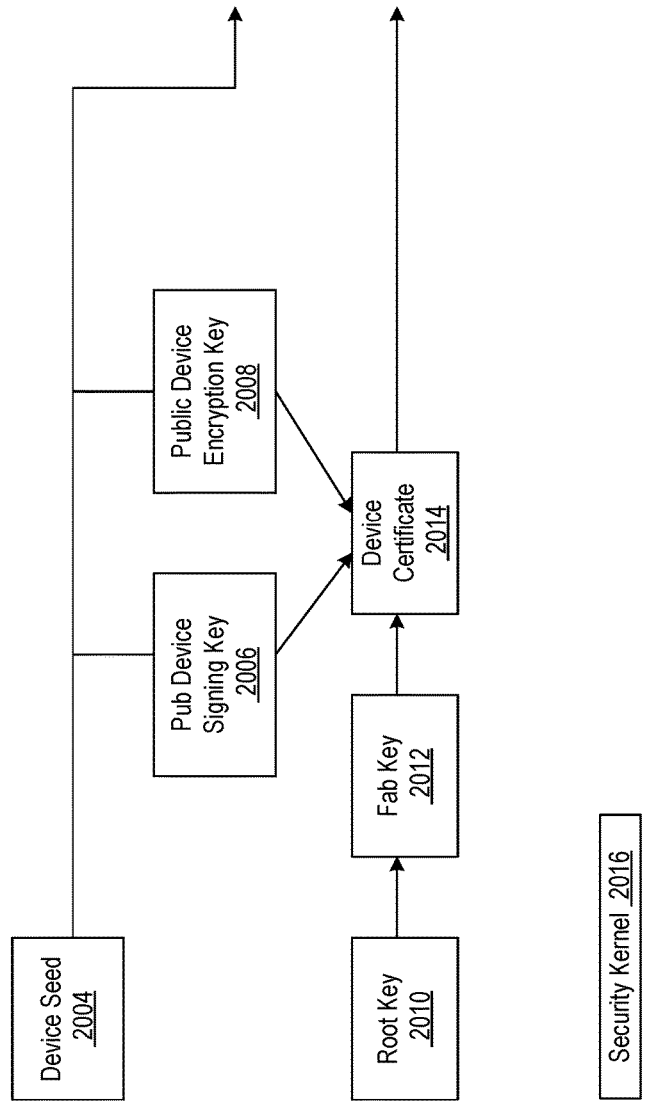
FIG. 20 is an example of a security and data programming use case.

FIG. 20 illustrates an example of a security and data programming use case 2002. The security and data programming use case 2002 can include performing security and data programming on a microcontroller unit (MCU).

The security portion of the security and data programming use case 2002 can include programming blank devices, installing a security kernel, provisioning the device keys, installing device certificates 2014, locking a device and enabling secure storage and secure execution, or a combination thereof. The device certificates 2014 can include an identification, a public signing key, a public encryption key, or other similar elements.

The data and firmware portion of the security and data programming use case 2002 can include programming an encrypted firmware image, decryption of secured content on the device, or a combination thereof. This can also include encrypting the target payload 1420 of FIG. 14 to form the encrypted payload 1422 of FIG. 14, decrypting the encrypted payload 1422, decrypting signatures for validation, calculating and comparing hash values, or other similar actions.

In a device personalization example, the device certificate 2014 can have a data encryption public key 2008 extracted from a data encryption key pair. Any other system or device that wants to send encrypted data to the trusted devices 130 of FIG. 1 can use the data encryption public key 2008 to encrypt the data. The private key 152 of FIG. 1 can be programmed into a hidden area on the device, such as in a non-volatile memory area. The private key 152 can be used to decrypt the encrypted data.

The device certificate 2014 can also include a public device signing key 2006 extracted from a device signing key pair. Any data that will leave this device will be signed by the private key of the device signing key pair. The public key portion of the device signing key pair can be used by the receiver to authenticate that the message came from the signer.

The overall problem is to create these key pairs and the device certificate 2014 with these keys. The private keys and the device certificate with the public keys will both be programmed into the device. In addition, any device that wants to communicate data with a particular device will need to get access to its device certificate before exchanging data securely.

The device certificate 2014 must be signed by a certificate authority. The certificate authority is an entity that certifies that the information in the certificate is correct. This is done cryptographically by the private key of the FAB key pair. The FAB key pair represent a third party where microcontroller unit silicon is fabricated. The public key of the FAB key pair is put into a FAB certificate which is then signed by the private key of a root key pair. The FAB certificate is a separate data certificate used to hold the FAB key pair. A root key 2010 can represent the initial security key of the silicon vendor for the microcontroller unit. The public key of the silicon vendor key is available publicly and can be retrieved as needed. In this example, the programming of the device certificate is anticipated to be performed in the FAB factory.

Both the device certificate 2014 and the FAB certificate are programmed into the trusted devices 130 to ensure the trust chain between the silicon vendor and the trusted devices 130 can be established by any agent who wants to verify the authenticity of the trusted devices 130 starting with the public key of the silicon vendor. If the public key of the silicon vendor is known, then the FAB Certificate can be validated to get the public key of the FAB key 2012. Using the public key of the FAB key 2012, the Device Certificate 2014 can be validated and used to get the Public Keys of the Device Certificate 2014.

A device seed 2004 can be a unique value associated with one of the programmable devices 128 of FIG. 1. For example, the device seed 2004 can be a device level root of trust, a serial number, a security key, a random number, or similar unique security values.

Figure 21:
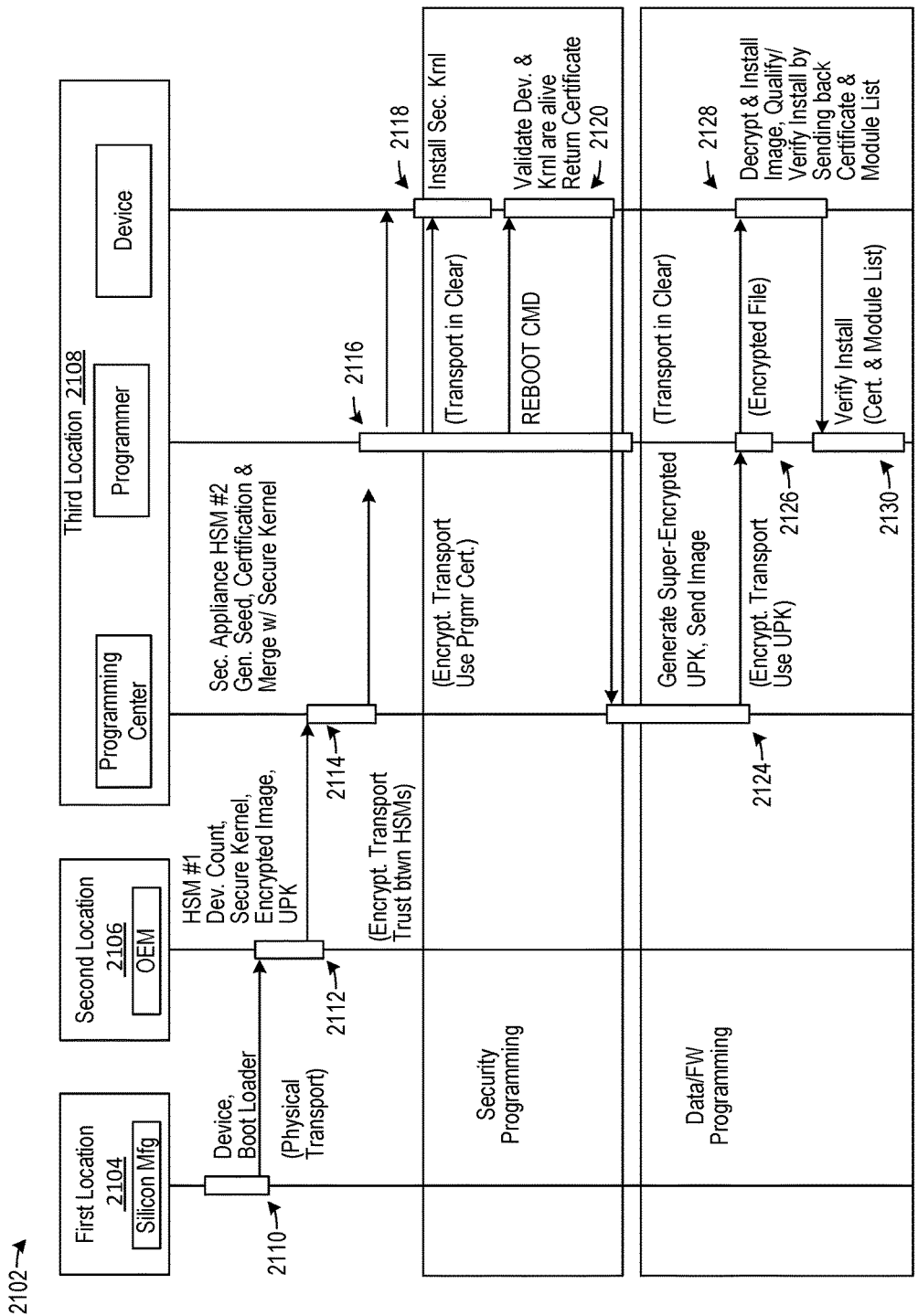
FIG. 21 is an example of an off device seed and certificate generation use case.

FIG. 21 illustrates an example of an off device seed use case 2102. The off device seed use case 2102 can be performed in a hardware security module at a programming center.

In the off device seed use case 2102, the security elements can be instantiated and managed between several locations. The locations can include a variety of configurations. For example, the first location 2104 can be a silicon manufacturer. A second location 2106 can be an original equipment manufacturer (OEM) location. The third location 2108 can be the device manufacturing or provisioning location. The third location 2108 can be a programming center where the programmer 112 of FIG. 1 and the programmable devices 128 of FIG. 1 are located. The third location 2108 can include 24-hour video surveillance of both the programmer 112 and the programmable devices 128 to prevent any tampering. The programmable device 128 can include security appliances, chips, memory devices, boards, or a combination thereof.

In a step 2110, the blank programmable devices 128 and the reference boot loader software can be provided by the microcontroller unit silicon vendor and be physically transported to the second location 2106 for further processing. The physical transport is a secure physical transport to prevent unauthorized access to the blank programmable devices 128 and the security software.

In a step 2112, the programmable devices 128 can be received at the second location 2106, such as an OEM. The OEM can develop the security kernel and/or a security boot loader by modifying the reference boot loader software. The OEM can also develop and provide the encrypted firmware image and the firmware encryption key (UPK). The OEM can also provide a total count of the devices that need to be produced. This information is kept in a first hardware security module (HSM #1) appliance at the OEM and can be provided to the programming center via encrypted transport into an on premise second hardware security module security appliance (HSM #2).

In a step 2114, the security appliance in the second hardware security module can generate all the signed device certificates and FAB certificates for each of the programmable devices 128 using random seeds generated in the second hardware security module. The HSM #2 security appliance can merge the seed, certificate, and secure kernel for each device as a programmable payload P. The security information can be transferred to the programmer 112 using an encrypted transport using the programmer certificate.

In a step 2116, the programmer 112 can program the trusted devices 128 with the programmable payload P and then lock the device from any modification of the programmable payload. The private keys of the key pairs do not need to be programmed into the device because the device can use the seed to generate the private keys on demand at any time on the device. This generation of the private key is part of the security kernel and can only be securely accessed through security kernel. In a step 2118, one of the programmable devices 128 can be programmed with the security kernel.

In a step 2120, the programmer 112 can issue a reboot command to validate that the device and security kernel are alive and then return with the device certificate. In a step 2124, the security appliance uses the public data encryption key from the device certificate of the device to generate the device specific super encrypted UPK. The super encrypted key and the encrypted firmware image can then be sent back to the programmer 112 for programming into one of the programmable devices 128.

In a step 2126, the encrypted file can be programmed into one of the programmable devices 128. The encrypted file can be transferred to one of the programmable devices 128 as an encrypted file.

In a step 2128, the programmer 112 can transfer the encrypted file to one of the programmable devices 128 where the image is decrypted and installed in one of the programmable devices 128. The installation of the image is qualified and verified by sending back the certificate and the module list to the programmer 112.

In a step 2130, the programmer 112 can verify the installation of the encrypted file on the programmable devices by matching the certificate and module list to a list of known certificates and modules.

Generating the device seed in the second hardware security module at the programming center increases the overall level of manufacturing security by reducing the number of opportunities for leaking the security elements. Because the programming center is a controlled environment with 24-hour a day video surveillance, the programmable devices 128 can be programmed with a higher degree of security and integrity.

Figure 22:
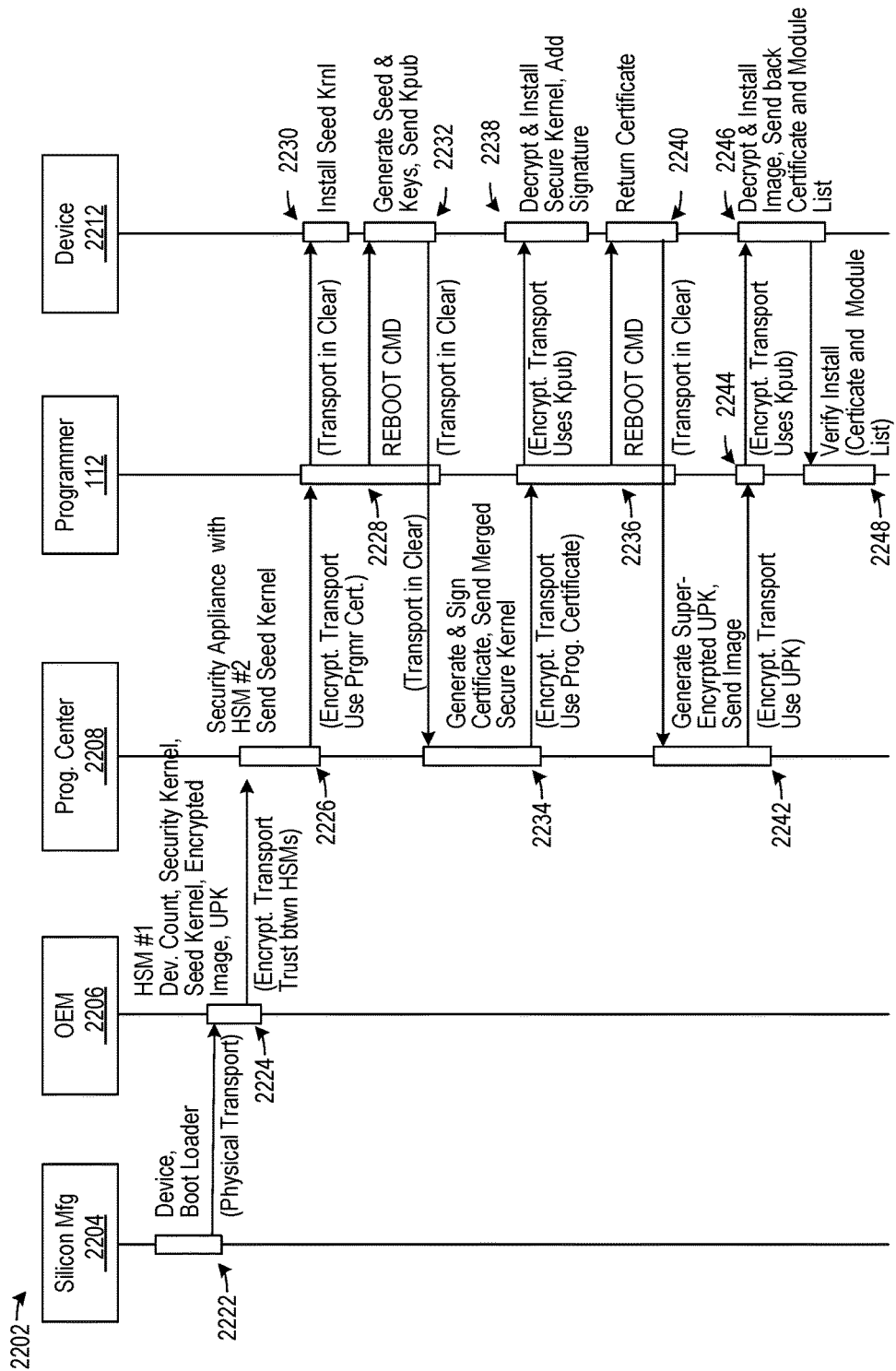
FIG. 22 is an example of an on device seed and certificate generation use case.

FIG. 22 illustrates an example of an on device see use case 2202. The on device seed use case 2202 can be performed in a hardware security module at an original equipment manufacturer location.

In the on device seed use case 2202, the security elements can be instantiated and managed between several locations. The locations can include a variety of configurations. The locations can include a silicon manufacturer 2204, an original equipment manufacturer 2206, a programming center 2208, a manufacturing center, or similar location. Further, the use case can include data and actions embedded at the programmer 112 level and the device level 2212.

In a step 2222, the blank programmable devices 128 of FIG. 1 and the reference boot loader software can be provided to the microcontroller unit silicon vendor and physically transported to the second location, such as the OEM 2206, for further processing. The physical transport is a secure physical transport to prevent unauthorized access to the blank programmable devices 128 and the security software.

In a step 2224, the programmable devices 128 can be received at the second location, such as an OEM. The OEM can develop the security kernel and a security boot loader by modifying the reference boot loader software. The OEM can also develop and provide the encrypted firmware image and the firmware encryption key (UPK). The OEM can also provide a total count of the devices that need to be produced. The security kernel and the seed kernel can be kept in a first hardware security module (HSM #1) appliance at the OEM and can be provided to the programming center via encrypted transport into an on premise second hardware security module security appliance (HSM #2).

In a step 2226, the second hardware security module of a security appliance can send the seed kernel to the programmer 112 of FIG. 1. The seed is generated on the HSM#2 of the device. The seed kernel needs to be programmed into the device which will execute on device to generate the seed and key pairs. The public key will go into the device certificates and private key can be programmed into the devices.

Step 2226 can send the seed kernel to the programmer 112 which will program the seed kernel into the device. The device is then re-booted and the seed kernel is executed. They seed kernel can then generate the key pairs. The private keys are stored in hidden memory area on the device. The public keys (Kpub) are returned back to the HSM #2. The HSM#2 can also generate signed certificates, merge them with the security kernel, and program it into the device.

This use case is the most secure use case because the device secret, the seed kernel, and the subsequent private keys are generated in the HSM#2 and are never exposed outside the device. The public keys can be send and exposed outside the device. Thus, the data exchange between the programmer 112 and the device is secure and minimizes security vulnerabilities even though some data is exchanged in the clear. This is different from the off device seed use case 2102 of FIG. 21 where the security kernel and seed programming are transferred between the programmer and device in clear. This can potentially be a security breach if the data is intercepted and requires stricter premise security requirements.

In a step 2228, the programmer 112 can program the trusted devices 128 with the programmable payload P and then lock the device from any modification of the programmable payload. The private keys of the key pairs do not need to be programmed into the device because the device can use the seed to generate the private keys on demand at any time on the device. This generation of the private key is part of the security kernel and can only be securely accessed through security kernel.

In a step 2230, one of the programmable devices 128 can be programmed with the seed kernel. After the seed kernel has be installed, the step 2228 can continue and the programmer can issue a reboot command to the device.

In step 2232, the device can generate the device seed and security keys 106 of FIG. 1 and then generate and send the public key to the programming center level, such as the MES. The public key can be sent in the clear because the public key can be shared and is not a hidden value.

In a step 2234, the system can generate and sign the device certificate. Then the secure kernel can be merged with the device certificate and sent to the programmer 112. The merged secure kernel is sent using encrypted transport using the programmer certificate.

In a step 2236, the programmer 112 can receive the secure kernel and provision one of the programmable devices 128 with the secure kernel. The secure kernel can be sent to one of the programmable devices 128 using an encrypted transport channel using the public key.

In a step 2238, the device can decrypt and install the secure kernel. In addition, the signature can be added to the device. After the secure kernel has been installed, step 2236 can sent a reboot command to the device and the device can return the certificate in a step 2240.

In a step 2242, the security appliance uses the public data encryption key from the device certificate of the device to generate the device specific super encrypted UPK. The super encrypted key and the encrypted firmware image can then be sent back to the programmer 112 for programming into one of the programmable devices 128.

In a step 2244, the encrypted file can be programmed into one of the programmable devices 128. The encrypted file can be transferred to one of the programmable devices 128 as an encrypted file using the public key.

In a step 2246, the programmer 112 can transfer the encrypted file to one of the programmable devices 128 where the image is decrypted and installed in one of the programmable devices 128. The installation of the image is qualified and verified by sending back the certificate and the module list to the programmer 112.

In a step 2248, the programmer 112 can verify the installation of the encrypted file on the programmable devices by matching the certificate and module list to a list of known certificates and modules.

Generating the device seed in the second hardware security module at the programming center increases the overall level of manufacturing security by reducing the number of opportunities for leaking the security elements. Because the programming center is a controlled environment with 24-hour a day video surveillance, the programmable devices 128 can be programmed with a higher degree of security and integrity.

Figure 23:
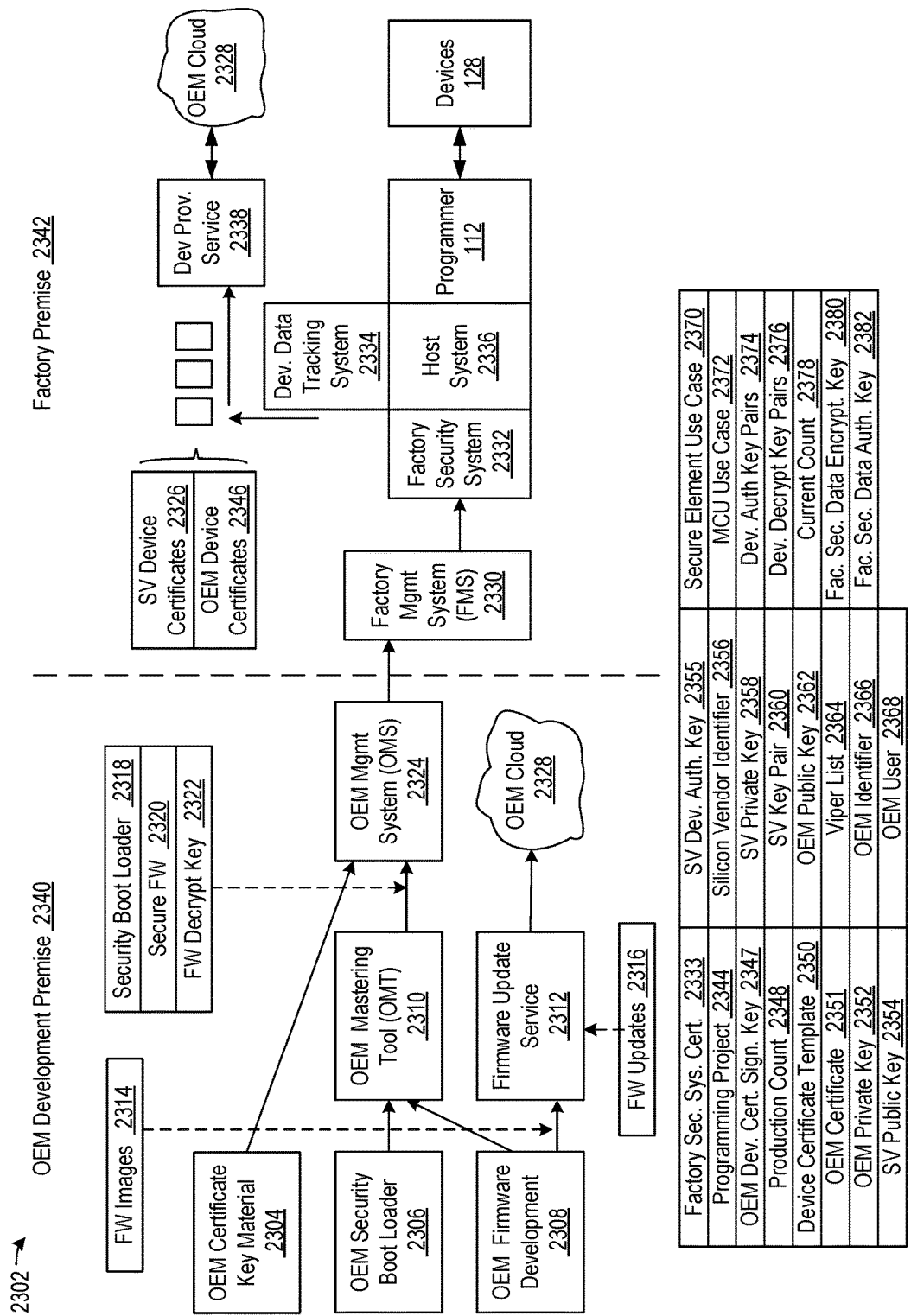
FIG. 23 is an example of a managed and security processing system.

FIG. 23 illustrates an example of a managed and security processing system 2302 (MSP system). The MSP system 2302 can securely deploy and provision the programmable devices 128.

The MSP system 2302 can individually configure data devices and trusted devices with cryptographic information to provide a secure programming and operation environment. The MSP system 2302 can allow the secure programming of the programmable devices 128 at a secure location, such as a contract manufacturer, an original equipment manufacturer (OEM) site, or other similar location.

The MSP system 2302 can be one of the embodiments of the secure programming system 100 of FIG. 1. The elements of the MSP system 2302 can be implemented using the element of the secure programming system 100.

The MSP system 2302 can support the operation of the system distributed in part across multiple locations or premises. The MSP system 2302 can include an OEM development premise 2340 and a factory premise 2342. The OEM development premise 2340 can be used to prepare for the actual programming and provisioning of the programmable devices 128. The OEM development premise 2340 can be used to prepare programming information for multiple factories. The OEM development premise 2340 is a location where an OEM can prepare a programming project 2344 having the information for configuring a set of secure devices, such as the programmable devices 128, secure elements, trusted devices 130 of FIG. 1, or other similar devices.

Although there are differences between the different types of secure devices, the terms are generally understood to be interchangeable and are general in nature. The secure devices, secure elements, programmable devices 128, trusted devices 130, and other similar elements can be used interchangeably in this description for convenience and brevity.

The OEM development premise 2340 can take firmware images 2314 that are used to provision the programmable devices 128 and prepare the programming project 2344. The programming project 2344 can then be securely transferred to the factory premise 2342 and used to control the programming of the programmable devices 128.

The OEM development premise 2340 can have a set of secure manufacturing systems and data stores for facilitating creating the programming project 2344. For example, the OEM development premise 2340 can include OEM certificate key material 2304, an OEM Security boot loader 2306, the OEM firmware development system 2308, an OEM mastering tool 2310, a Firmware Update Service 2312, and an OEM Management system 2324.

The factory premise 2342 is a location for programming and provisioning the programmable devices 128. The factory premise 2342 can be a programming center, a fabrication facility, a contract manufacturer site, or a similar location. In an embodiment, the factory premise 2342 is where the programmer 112 and the programmable devices 128 are locate and operated.

The MSP system 2302 can include a security boot loader 2318. The security boot loader 2318 is the secure programming code that can be executed at boot time on the programmable devices 128 to insure compliance with the security protocols. The OEM security boot loader 2306 creates device identity, creates the ability to accept an encrypted data stream and de-crypt on device and initializes a secure run time environment on the device so that firmware can run securely on the device.

The MSP system 2302 can also include secure firmware 2320. The secure firmware 2320 is software code and data to be embedded in non-volatile memory of the programmable devices 128. The secure firmware 2320 can be transferred in an encrypted state and decrypted at the programmer 112.

The MSP system 2302 can include a firmware decrypt key 2322. The firmware decrypt key 2322 can be used to decrypt the secure firmware 2320 that has been encrypted using the encryption key related to the firmware decrypt key 2322. For example, the firmware decrypt key and the encryption key can be part of a symmetric key pair used for encryption.

The MSP system 2302 can include firmware images 2314 from the OEM: The firmware images 2314 are embedded application code that will be loaded by OEM security boot loader 2306 and run on the programmable devices 128 during and after manufacturing.

The MSP system 2302 can include the OEM certificate key material 2304: The OEM certificate key material 2304 can include information such as a silicon vendor device authentication key 2355, an OEM device certificate signature key 2347 used to sign an OEM device certificate 2346, and an OEM device certificate template 2350. For example, the silicon vendor device authentication key 2355 can be an authentication key used to authenticate content from the silicon vendor. The OEM device certificate signature key 2347 can be a signature key used to sign content to securely identify the OEM. The signature key can be linked to a verification key to verify the signature. In another example, the signature key and the verification key can be a public and private key of an authentication key pair.

The OEM device certificate template 2350 is a block of information used to form the OEM certificate 2351. It includes the basic required information for the OEM certificate 2351. The OEM certificate 2351 is a block of information that defines an OEM user 2368. The OEM certificate 2351 can include an OEM identifier 2366, an OEM public key 2362 and an OEM private key 2352. The OEM identifier 2366 is a value that uniquely identifies the OEM.

A silicon vendor is an entity that can manufacture or provide the programmable devices 128. The silicon vendor can be identified with a silicon vendor identifier 2356. The silicon vendor identifier 2356 is a value linked to the silicon vendor. For example, the silicon vendor identifier 2356 can be linked to the company that actually makes the integrated circuits or components that form the programmable devices 128. The silicon vendor can also be a company that pre-configures the programmable devices 128 before delivering them for programming by the system.

The MSP system 2302 can include a OEM firmware development system 2308. The firmware development system 2308 supports the development of firmware images 2314 for deployment to the programmable devices 128.

The MSP system 2302 can include the OEM Mastering Tool 2310 (OMT): The OEM mastering tool 2310 is a security application or system that can bind the OEM security boot loader 2306 to the firmware images 2314. The OEM mastering tool 2310 can sign and encrypt the firmware images 2314 and prepare the firmware images 2314 for field updates. The field upgrades can allow the firmware deployed in the programmable devices 128 to be changed remotely in a secure fashion. The OEM mastering tool 2310 can product the secure firmware 2320 by encrypting the firmware images 2314 using the firmware decrypt key 2322. The OEM mastering tool 2310 can include a HSM or TSM and be implemented in hardware or software.

The MSP system 2302 can include an OEM management system 2324. The OEM management system 2324 is a system for defining the programming project 2344 for an OEM user. The programming project 2344 is an information package that defines a secure production run of the programmable devices 128.

The OEM management system 2324 can bind the OEM Security Boot Loader 2306, the firmware images 2314, the OEM certificate 2351, the OEM certificate key materials 2304, and a production count 2348 to the programming project 2344. Once the programming project 2344 is initially created, the programming project 2344 can updated to include the references, code, and data of the OEM security boot loader 2306, the firmware images 2314, the OEM certificate key materials 2304, the OEM certificate 2351, and the production count 2348. The binding process means that the information is part of the parameters of the programming project 2344. The OEM management system 2324 can also bind the programming project 2344 to a specific security programming system at the factory premise 2342. The programming project 2344 can include the system identification 814 of FIG. 8 of a programming system or subsystem such as the secure programming system 100, the programming unit 110, the programmer 112, or a combination thereof. Then the programming project 2344 can only be performed on a system having the system identification 814.

The production count 2348 is an indicator describing the number of secure devices to be produced in the production run. The production count 2348 can be compared to an incrementing number that is updated when a secure device begins or completes production. The programmer 112 receiving the programming project 2344 can use the production count 2348 to limit the number of devices programmed and provisioned to prevent unauthorized production of the programmable devices 128. During production, a current count 2378 can indicate the current number of the products that have been produced. The system can stop programming the devices by comparing the current count 2378 to the production count 2348 and stopping when the current count 2378 is equal to the production count 2348.

The OEM management system 2324 can be configured in a variety of ways. For example, the OEM management system 2324 can be implemented in a shared configuration and generate the programming project 2344 for deployment to multiple OEMs each having their own factory, such as the factory premise 2342. The OEM management system 2324 can be implemented using the secure master storage system 102 of FIG. 1, the security master system 104 of FIG. 1, the secure programming system 100 of FIG. 1, or a combination of systems and subsystems thereof.

The MSP system 2302 can include a factory management system 2330. The factory management system 2330 is a system for managing the secure programming components at the factory premise 2342. The factory management system 2330 can receive the programming project 2344 from the OEM management system 2324 and the decrypt and distribute the manufacturing information to the other security and programming systems located at the factory premise 2342.

The factory management system 2330 can be implemented in a variety of ways. For example, the factory management system 2330 can be implemented with the manufacturing execution system 702 of FIG. 7, the programming processor 202 of FIG. 2, the host computer system, or another similar processing system.

The MSP system 2302 can include a factory security system 2332. The factory security system is an HSM based security appliance that generates keys and certificates to be programmed into the programmable devices 128. The factory security system 2332 can support a multi-tenant OEM architecture by isolating the security information of one OEM from that of another. This allows the factory security system 2332 to program and provision different sets of the programmable devices 128 for different OEMs in different programmers.

The factory security system 2332 can be configured in a variety of ways. For example, the factory security system 2332 can be implemented using the security master system 104 of FIG. 1, the security controller 114 of FIG. 1, the programming processor 202 of FIG. 2, the first security module 116 of FIG. 1, the second security module 118 of FIG. 1, the nth security module 120 of FIG. 1, or a combination thereof. The factory security system 2332 can be implemented in a centralized or distributed fashion using one or multiple security components in the MSP system 2302.

The factory security system 2332 can provide high security encryption services including key pair generation, encryption, decryption, certificate management, secure storage, secure execution, and other similar security processing features. The factory security system 2332 can also support secure development, secure mastering, secure deployment of data and code, secure provisioning, secure programming, and secure updates.

The factory security system 2332 can perform device authentication based on device certificates, deployment management and versioning, digital lifecycle management, and application management. The factory security system 2332 can provide symmetric encryption, hash functions, data encapsulation, digital signatures, key agreement and transport, key management, and user access control.

The factory security system 2332 can include a factory security system certificate 2333 for authenticating the identity of the factory security system 2332. The factory security system certificate 2333 can be used to sign information transferred from the OEM development premise 2340 and the OEM management system 2324 to the factory management system 2330 and the factory security system 2332. The factory security system 2332 can include a factory security data encryption key 2380 and a factory security data authentication key 2382. The keys can be used to securely encrypt, decrypt, sign, and authenticate secure information.

The MSP system 2302 can include a host system 2336 at the factory premise 2342. The host system 2336 is a computer system for controlling the execution of the programming project 2344 and managing the communication between the programmer 112 and Factory security system 2332.

The host system 2336 can be implemented in a variety of ways. For example, the host system 2336 can be implemented using the security controller 114, the programming processor 202, or another similar computing system coupled to the secure programming system 100. The host system 2336 can be coupled to the factory security system 2332, the programmer 112, the factory management system 2330, or other similar systems.

The MSP system 2302 can include the programmer 112 for programming the programmable devices 128. The programmer 112 can receive a set of blank or partially programmed devices and securely program the programmable devices 128 with the information from the programming project 2344.

The programmer 112 can create serial data lists 2364 for programming the programmable devices 128. The serial data lists 2364 are lists of device specific data to be programmed into the programmable devices 128. This can include the firmware images 2314, the OEM device certificate 2346, code, data, or other information. The serial data lists 2364 can vary based on the individual device information, such as serial numbers, device identification, data certificates, or similar device specific parameters.

The MSP system 2302 can include device certificates to protect the programmable devices 128. The device certificates can include silicon vendor device certificates 2326, original equipment manufacturer device certificates 2346 (OEM device certificates 2346), or other device certificates. The device certificates can include information about the programmable devices 128 including public keys, the device identification 302 of FIG. 3, a silicon vendor identifier 2356, the OEM identifier 2366, or other similar information.

The silicon vendor device certificate 2326 is set of data elements that securely define the identity of one of the secure elements, such as the programmable devices 128 or trusted device 130 of FIG. 1. The silicon vendor device certificate 2326 can include the device identification 302 of FIG. 3, a silicon vendor public key 2354, and/or other security information. Information encrypted by a silicon vendor private key 2358 can be decrypted using the silicon vendor public key 2354 of a silicon vendor key pair 2360.

The silicon vendor device certificate 2326 can be programmed into a secure storage unit of the secure element by the silicon vendor or manufacturer before the secure elements are transferred to other manufacturers or users. The silicon vendor device certificate 2326 can be stored in a write-once secure storage unit where additional information may be added to the silicon vendor device certificate 2326, but existing information cannot be erased or modified. Portions of the secure storage unit can be locked when no further changes are required. The secure storage unit can include one or more data elements, such as multiple device certificates and other related security data.

The silicon vendor device certificates 2326 can be implemented in a variety of ways. For example, the silicon vendor device certificates 2326 can be implemented using the manufacturing markers 510 of FIG. 5, the security certificate 306 of FIG. 3, the security algorithm 304 of FIG. 3, the product markers 508 of FIG. 5, the operating markers 514 of FIG. 5, the incoming root of trust 504 of FIG. 5, the trusted certificate 402 of FIG. 4, or another similar data element.

The MSP system 2302 can include a device data tracking system 2334 for providing device level programming statistics in real time. The device data tracking system 2334 can track device level information for the secure programming system 100 in the local factory or for devices being provisioned remotely. The device data tracking system 2334 can track device level information for each of the programmable devices 128 configured by the programmer 112 in the MSP system 2302. The device data tracking system 2334 can track data such as the silicon vendor device certificates 2326, the system identification 814 of FIG. 8, the device identification 302, or other data elements that have been programmed into devices. The device data tracking system 2334 can track device status including validity status, configuration status, duplicate status, or other device level status.

The MSP system 2302 can include a device provisioning service 2338. The device provisioning service 2338 is a system for provisioning the programmable devices 128 over the Internet. The device provisioning service 2338 can be a combination of hardware and software that can securely deliver provisioning information to the programmable devices 128 in the field. The device provisioning service 2338 can distribute security information, data updates, software updates, and other security and operational information needed for continued secure operation of the devices.

The MSP system 2302 can include a firmware update service 2312. The firmware update service 2312 is a system for updating the firmware of the programmable devices 128 over the Internet, such as an OEM cloud 2328. The firmware update service 2312 can securely deliver firmware updates 2316 to a system having one or more of the programmable devices 128 and update the programmable devices 128 with the new firmware. The firmware updates 2316 are software and data packages used to update the firmware in the programmable devices 128. The firmware update service 2312 can be part of a system having security software and hardware that can deploy the firmware updates 2316 and associated security information to ensure the programmable devices 128 are updated securely.

The MSP system 2302 can be operated in a variety of ways. In an illustrative example, the MSP system 2302 can be operated based on a secure element use case 2370. The secure element use case 2370 can describe one way to use the MSP system 2302 to securely program the programmable devices 128 where the programmable devices 128 are already configured with firmware and have the silicon vendor device certificate 2326 pre-installed at the silicon vendor facility.

The secure element use case 2370 can include two major steps. In step 1, the silicon vendor device certificate 2326 is extracted from one of the programmable devices 128 and the device is authenticated. In step 2, the OEM device certificate 2346 is created based on the silicon vendor device certificate 2326 of the authenticated device. Then the OEM device certificate 2346 is programmed into the device.

In this use case, an HSM-based security system, such as the factory security system 2332, can be integrated as part of the secure programming system 100, such as a system for programming secure microcontroller units with integrated security areas. The integrated security areas can be protected areas of memory that can be written once and not changed. This allows the non-modifiable storage of security data such as keys, code, or certificates.

The system can include an OEM management system 2324, the factory management system 2330, a job creation and job runner system, and the device data tracking system 2334 to manage the status data for the programmable devices 128. The various systems can be implemented in a variety of ways. For example, the OEM management system 2324, the factory management system 2330, a job creation and job runner system, and the device data tracking system 2334 can all be executed as software on the host system 2336. In another example, the systems can each run on dedicated hardware.

In this security model, the factory premise 2342 can act as a proxy for the OEM user and can execute the functionality of the OEM management system 2324. This effectively implies that the OEM user 2368 implicitly trusts the factory premise 2342 with providing the OEM certificate key materials 2304 and the OEM certificate 2351 and setting the production count 2348 for the programmable devices 128. Since this activity is done on the host system 2336 of the programming unit 110 of FIG. 1, the job setup, the generation of the OEM certificate key material 2304, and the configuration of the secure programming system 100 be done by authorized personnel at a physically secure location within the factory premise 2342.

Some implementations can focus on the provisioning of the OEM device certificates 2346 onto the programmable devices 128 that are being configured as secure elements. However, it is understood that securing the flow of the OEM certificate key material 2304 and secure updating of the production count 2348 by the OEM systems are protected by physical security means and secure data channels.

The OEM data from the OEM development premise 2340 is secure and encrypted from OEM management system 2324 all the way to the factory security system 2332 as the data is encrypted and tied to a specific one of the factory security system 2332. For example, the programming project 2344 can be encrypted using the factory security system certificate 2333 which can only be decrypted by the intended one of the factory security system 2332.

In another example, the transfer of the OEM certificate key material 2304, including the OEM device certificate signature key 2347 is done securely because the material is encrypted during transmission. The OEM device certificate signature key 2347 can include a private key component.

In an illustrative example, since the private key 152 of the programmable devices 128 never leaves the device and the import of the OEM device certificate signature key 2347 into OEM management system 2324 is done securely. This can reduce the need for physical security since the data is encrypted.

In another illustrative example, the MSP system 2302 can be operated based on a microcontroller unit use case 2372 where the MSP system 2302 is used for provisioning the programmable devices 128 and trusted devices 130 of FIG. 1, such as secure microcontroller units. The secure microcontroller units can include secure processing and secure storage facilities.

The MCU use case 2372 can include two primary steps. In the first step, the OEM security boot loader 2306 can be programmed into the programmable devices 128. Afterward, the programmable devices 128 can be booted using the OEM security boot loader 2306 to create device authentication key pairs 2374 and device decryption key pairs 2376 for the programmable devices 128. Then the OEM device certificate 2346 can be constructed, programmed, and signed using portions of the two key pairs. For example, the system can include an authentication key pair having a signature key and a verification key, an encryption key pair having an encryption key and a decryption key, or similar key pair structures. The public key and the private key of the key pair are linked to one another.

In the second step, the MSP system 2302 can read the silicon vendor device certificates 2326 and authenticate the programmable devices 128. The firmware decrypt key 2322 can be encrypted with device decryption key from the silicon vendor device certificate 2326. The encrypted firmware and the encrypted firmware decrypt key 2322 can be programmed on the programmable devices 128.

The OEM security boot loader 2306, the OEM firmware development 2308, the OEM mastering tool 2310, the OEM management system 2324, and the generation of the OEM certificate key material 2304 can all be performed at the OEM development premise 2340. The overall project definition and the determination of the production count 2348 are controlled by OEM user 2368.

The OEM software execution environment can be hosted on a computer at the OEM development premise 2340. All the OEM Roots of Trust are securely transported from the OEM development premise 2340 to the factory premise 2342. The factory management system 2330, the factory security system 2332, and the device data tracking system 2334 can execute at the factory premise 2342 on the host system 2336.

In an embodiment, because the first step requires secure provisioning of the programmable devices 128, it must be performed in a secure facility, such as an OEM trusted factory, a silicon vendor factory, an OEM factory, or a programming center. Step 2 can then be performed at a facility with a lower level of security, such as an untrusted Factory, a Contract Manufacturer, third party partner, or a similar type of facility.

In this Security model, the OEM Roots of Trust and the programming project 2344 are defined at the OEM development premise 2340 and the distributed to the factory premise 2342. It is important that an OEM user should manager their own Roots of Trust to improve security of the supply chain for the OEM products.

In an illustrative example, the MCU use case 2372 requires physical security because the key pair 150 of FIG. 1 of the programmable devices 128 is generated in the factory security system 2332 and can potentially be exposed at the factory premise 2342. The physical connection between the programmable devices 128 and the programmer 112 is in the clear, so someone with physical access to the systems of the factory premise 2342 could snoop and steal important information. Thus, physical security should be implemented to protect the security information.

In an alternate example of the MCU use case 2372, the programmable devices 128 can be blank and not pre-programmed with the silicon vendor device certificate 2326. In this case, the OEM device certificate 2346 can be used for authentication. In addition, the firmware decrypt key 2322 can be encrypted using the public decryption key from the OEM device certificate 2346, such as the OEM public key 2362.

In another illustrative example, the system can implement a challenge response authentication protocol by sending an identification token that has been encrypted by a public key to the programmable device 128, such as a secure microcontroller, and verifying the identification token by decrypting the identification token with a private key. The public key can be the device public key for the programmable device and the private key can be the device private key for the programmable device. Implementing the challenge response authentication can improve security by verifying the identity of sender of content.

Figure 24:
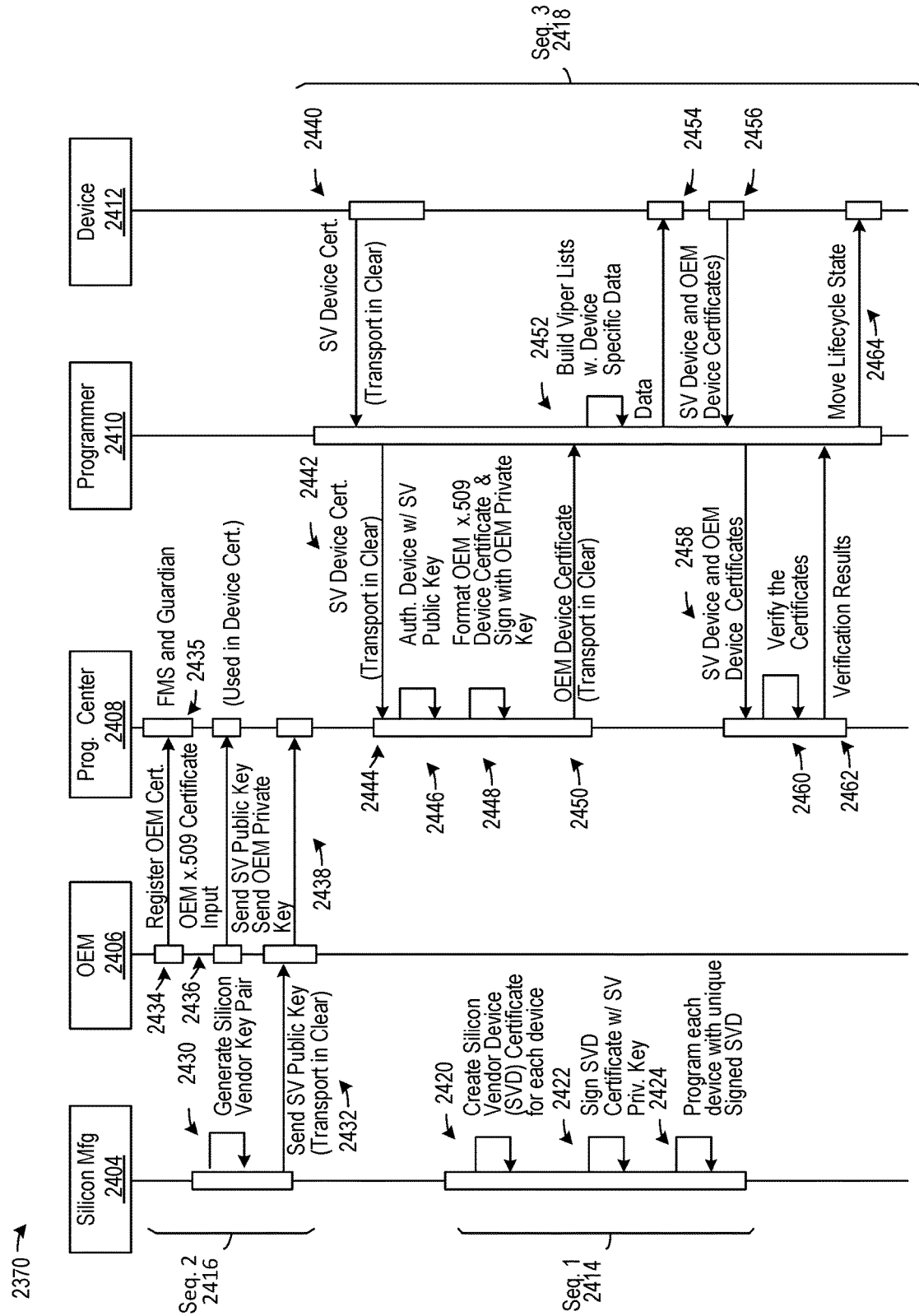
FIG. 24 is a detailed example of a secure element use case.

FIG. 24 illustrates an example of the secure element use case 2370. The secure element use case 2370 describes the process for securely configuring the secure elements, such as the programmable devices 128 of FIG. 1. The MSP system 2302 of FIG. 23 can securely deploy and provision each of the programmable devices 128 of FIG. 1 according to the secure element use case 2370.

In the secure element use case 2370, the secure elements can be instantiated, transferred, and managed at different premises. The premises can include different types of locations such as a silicon manufacturer 2404, an OEM location 2406, a programming center 2408, a programmer location 2410, and a device location 2412. Each of the premises represents a location where some type of secure programming related actions can occur. Further, the use case can include data and actions embedded at the programmer 112 of FIG. 1 and the device location 2412.

The secure element use case 2370 can include three different sequences of events, each for performing a different secure activity. In a first sequence 2414, the MSP system 2302 of FIG. 23 can initialize the factory security system 2332 of FIG. 23 using OEM management system 2324 of FIG. 23. This can be performed at the OEM development premise 2340 of FIG. 23, the factory premise 2342 of FIG. 23, or another similar location. For example, the secure elements can be programmed at the silicon vendor factory with a silicon vendor device certificate.

The MSP system 2302 can also initialize the factory management system 2330 of FIG. 23 at the factory premise 2342, the programming center 2408, or another similar location. The factory management system 2330 can be updated with the current count 2378, a silicon vendor public key 2354 of FIG. 23, an OEM private key 2352 of FIG. 23, and a OEM device certificate template 2350 of FIG. 23. The factory management system 2330 can forward the information to the factory security system 2332 for secure processing.

In the second sequence 2416, the secure elements are programmed at the silicon vendor (SV) factory with a silicon vendor device certificate 2326 of FIG. 23. For example, the factory security system can be initialized using the OEM management system 2324 and the factory management system with a count, the silicon vendor public key, the OEM signature key, and the OEM device certificate.

In a third sequence 2418, the MSP system 2302 can cryptographically authenticate each of the devices, such as the programmable devices 128 or trusted devices 130 of FIG. 1, using the silicon vendor device certificate 2326 that was pre-installed in the second sequence 2416. Then the OEM device certificate 2346 of FIG. 23 can be constructed and programmed into the programmable devices 128.

The OEM device certificate 2346 can be constructed by re-using the public key portions of the device identity key pair from the silicon vendor device certificate 2326, such as the silicon vendor public key 2354. Therefore, the silicon vendor public key 2354 can be used to calculate the OEM device certificate 2346, so both certificates are certified using the same certificate. Alternatively, a different key pair can be used to represent the OEM identity separate from the silicon vendor key pair. This can be performed by the factory security system 2332 or on the secure element itself.

In the second sequence 2416, step 2420 is performed at the silicon manufacturer 2404. The silicon manufacturer 2404 can be the company that creates the raw secure elements. The silicon vendor device certificates 2326 of FIG. 23 are created for each of the secure elements, such as the programmable devices 128 or trusted devices 130. The silicon vendor device certificates 2326 can include unique information about each of the secure elements, such as the device identification 302 of FIG. 3, serial numbers, product type, manufacture date, or similar device information.

Step 2422 is also performed at the silicon manufacturer 2404. Each of the silicon vendor device certificates 2326 is signed with the silicon vendor private key 2358 of FIG. 23 of the silicon manufacture with the silicon vendor identifier 2356 of FIG. 23. Signing the silicon vendor device certificate 2326 encrypts the data of the certificate. The data can be decrypted only with the silicon vendor public key 2354.

Step 2424 is also performed at the silicon manufacturer 2404. Each of the programmable devices 128 is programmed with the silicon vendor device certificate 2326 that was signed with the silicon vendor private key 2358. The silicon vendor device certificate 2326 signed by the silicon vendor private key 2358 shows that the device is approved or provided by the silicon vendor. Successfully decrypting the silicon vendor device certificate 2326 with the silicon vendor public key 2354 can authenticate that the programmable device 128 is from the silicon vendor that signed it.

The second sequence 2416 can uniquely tag each of the programmable devices 128 with a unique and individual instance of the silicon vendor device certificate 2326 that has been further signed with the silicon vendor private key 2358. This provides that the silicon vendor device certificate 2326 can be decoded using the silicon vendor public key 2354 to verify that the silicon vendor device certificate 2326 was provided by the silicon vendor having the silicon vendor identifier 2356. This allows the factory or other device user to determine the authenticity of the programmable devices 128.

The first sequence 2414 is performed at the silicon manufacturer 2404, the OEM location 2406, and the programming center 2408. The first sequence 2414 can configure the programming components at the programming center 2408 for secure programming.

In a step 2430, the silicon vendor can generate the silicon vendor key pair 2360 having a silicon vendor public key 2354 and a silicon vendor private key 2358.This can be a silicon vendor key pair 2360 having a silicon vendor private key 2358 and silicon vendor public key 2354.

In a step 2432, the silicon vendor public key 2354 can be transferred to the OEM user 2406. The silicon vendor public key 2354 can be sent in the clear and unencrypted. For example, the silicon vendor public key 2354 can be sent over a network link.

In a step 2434, the OEM user 2406 can register the OEM certificate 2351 of FIG. 23 with the factory management system 2330 of FIG. 23 and the factory security system 2332 of FIG. 23 of the programming center 2408. The OEM certificate 2351 can include the OEM public key 2362 of FIG. 23 to decrypt and authenticate information that was encrypted or signed with the OEM private key 2362. The registration of the OEM certificate at the programming center 2408 can be performed securely to provide the programming center 2408 with the security information for the OEM user 2406. The registration can be performed to introduce and identify the OEM credentials into the factory management system 2330 and the factory security system 2332.

In a step 2435, the factory management system 2330 and the factory security system 2332 can send a factory security data encryption key 2380 to the OEM management system 2324 in a secure exchange process. The factory security data encryption key 2380 can be used to encrypt information sent from the OEM user 2406 to the factory management system 2330 and the factory security system 2332 to support the secure transfer of information. The factory security system 2332 can send the factory security system data encryption key to the OEM management system 2324.

In a step 2436, the OEM user 2406 can create aa package having the SV device authentication public key, the OEM device certificate signature key, and the OEM device certificate template 2350. The OEM device certificate signature key can be created in OEM management system 2324 or import from an external security system such as an external HSM.

The package can be encrypted in the OEM management system 2324 using the factory security data encryption key 2380 and then sent to the factory management system 2330 and the factory security system 2332. Because the package has been encrypted using the factory security data encryption key 2380 of the factory security system 2332, it can only be decrypted using the factory security data authentication key 2382 of the factory security system 2332.

The OEM device certificate template 2350 is a template for the OEM device certificate 2346 that includes the public key 154 of the device having the device identification 320 of FIG. 3 and then signed by the OEM Private Signature key. The OEM public key 2362 is a cryptographic value tied to the OEM user 2406. The OEM public key 2362 have a variety of formats.

For example, the key can be formatted as an X.509 public key certificate or another public key format. The X.509 standard defines a public key certificate to show the ownership of a public key. The OEM public key 2362 can provide validation information for a public key. The OEM public key 2362 can be used for device certification in the programming center 2408.

In a step 2438, the OEM user 2406 can send the package having the silicon vendor public key 2354, the OEM private key 2352, and the OEM device certificate template 2350 to the programming center 2408. The information in the package can then be used to sign the programmable devices 128.

The third sequence 2418 is performed on the programmer 112 and the programmable devices 128 at the programming center 2408 or a factory premise 2342. The third sequence 2418 can authenticate the secure elements, provision and cryptographically sign the secure elements with the OEM information, and verify that the provisioned devices are authorized. For example, the system can cryptographically authenticate the secure element device, one that already has the programmed silicon vendor device certificate from the first sequence. Then the system can construct and program a new OEM device certificate into the device. The OEM device certificate can be created re-using the device identity key pair from the silicon vendor certificate. The same key pair is used for both certificates. Alternatively, a new key pair can be generated to represent the OEM identity separate from the silicon vendor key pair. This can be performed in the factory security system or in the device itself.

In a step 2440, the programmer 112 can read the silicon vendor device certificate 2326 of each of the programmable devices 128 to be programmed. The silicon vendor device certificates 2326 are transferred in the clear from the programmable devices 128 to the programmer 112.

In a step 2442, the silicon vendor device certificates 2326 can be transferred from the programmer 112 to the factory management system 2330 and the factory security system 2332. The factory management system 2330 controls the programming operation and the factory security system 2332 will manage the device and system security.

In a step 2444, the silicon vendor device certificates 2326 are received at the factory management system 2330 of the programming center 2408. The programmer 112 is located at the factory premise 2342 of FIG. 23.

In a step 2446, the programmable devices 128 can be authenticated using the silicon vendor public key 2354. This step confirms that the devices to be programmed are provided by the silicon vendor having the silicon vendor identifier 2356. The programmable devices 128 are authenticated when the silicon vendor device certificate 2326 that was signed with the silicon vendor private key 2358 in sequence 1 is decrypted using the silicon vendor public key 2354. If the information in the silicon vendor device certificate 2326 can be accessed using the silicon vendor public key 2354, then the device is authenticated.

In a step 2448, the OEM device certificate 2346 is formatted based on the OEM device certificate template 2350. Then OEM device certificate 2346 is signed with the OEM private key 2352.

In an illustrative example, a device certificate, such as the OEM device certificate 2346, can be generated for the programmable devices 2412 by the programmer 2410. The OEM device certificate 2346 can be created by the OEM using the programmer 2410 to create a device certificate for the programmable devices 128 that are passive. Passive examples of the programmable devices can include memory device without controllers or processors. Such device can externally programed with the device certificate to provide identity and security support.

In a step 2450, the OEM device certificate 2346 is transferred to the programmer 112. Because the OEM device certificate 2346 has been encrypted and signed with the OEM private key 2352, it can be transferred in the clear.

In a step 2452, the programmer 112 can build the serial data lists 2364. The serial data lists 2364 are list of device specific data to be programmed into the programmable devices 128. This can include the serial numbers, the device identification, the OEM device certificate 2346, manufacturing markers, code, data, markers, mac addresses, device specific keys, or other information.

In a step 2454, the device specific data included on the serial data lists 2364 can be programmed into the programmable devices 128 by the programmer 112. The serial data lists 2364 can indicate where the device specific data should be stored. For example, the OEM device certificate 2346 can be stored in the secure storage unit.

In a step 2456, the silicon vendor device certificate 2326 and the OEM device certificate 2346 are re-extracted and retrieved from the secure elements, such as the programmable devices 128 or the trusted devices 130, by the programmer 112. Even though copies of the silicon vendor device certificate 2326 and the OEM device certificate 2346 may already exist in the factory security system 2332 or elsewhere in the system, the device certificates are re-extracted to verify the programmable devices 128 and to detect potential duplicate production runs, unauthorized duplication, or other improper activities. The validation steps can be used to ensure that the device certificates have been programmed without errors. This can include programming failures, device damages, bit errors, or similar errors.

In a step 2458, the silicon vendor device certificate 2326 and the OEM device certificate 2346 are sent to the factory security system 2332 for verification and further use. The retrieved device certificates can be used for a second round of authentication to verify that the proper ones of the programmable devices 128 were programmed. This can be used to prevent unauthorized duplicate of the programmable devices 128 and to prevent counterfeiting the devices.

In a step 2460, the silicon vendor device certificate 2326 and the OEM device certificate 2346 are verified to make sure that the programmable devices 128 are proper. This can include validating the silicon vendor device certificate 2326 using the silicon vendor public key 2354 and validating the OEM device certificate 2346 with the OEM public key 2362. Validation of the device certificate involves comparing the public key in the device certificate with the public key in the silicon vendor certificate to ensure they match. In addition, the certificate can be processed through a certificate validation tool (not shown) to ensure that the format of the certificate is valid. The signature on the certificate is also validated using the factory security system 2332.

In a step 2462, the verification results are sent back to the programmer 112. In a step 2464, the programmer 112 can processed the completed devices. If the programmable devices 128 are not validated, then the programmer 112 can identify the devices with a validation status indicating a bad device and transfer them to a bad devices receptacle (not shown) for disposal. If the programmable devices 128 are properly verified, then the programmable devices 128 can be updated with a verified state value and passed along as verified components. Alternatively, the programmer 112 can generate a validation report to log the device identification and the validation status of each of the programmable devices 128 in the production run. The programmable devices 128 that are invalid can be removed or destroyed at a later time.

3.0. Functional Overview

Figure 25:
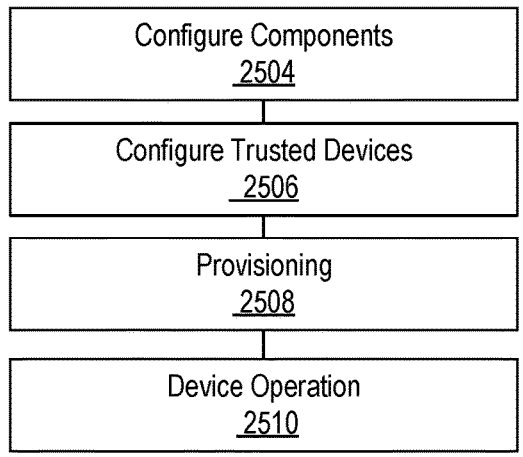
FIG. 25 is an example of a secure provisioning process flow for the programmable devices.

FIG. 25 illustrates an example of a secure provisioning process flow 2502 for the programmable devices 128 of FIG. 1 in accordance with one or more embodiments. The various elements of the secure provisioning process flow 2502 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The secure provisioning process flow 2502 is responsible for securely programming, configuring, provisioning, and operating the programmable devices 128. The programmable devices 128 can be programmed with the target payload 1420 of FIG. 14 provided by the secure programming system 100. The secure provisioning process flow 2502 can be responsible for configuring the programmable devices 128, configuring the programmable devices 128, provisioning the programmable devices 128, and validating the programmable devices 128.

The secure provisioning process flow 2502 can have a variety of configurations. For example, the secure provisioning process flow 2502 can include a configure components module 2504, a configure trusted devices module 2506, a provisioning module 2508, and a device operation module 2510.

The configure components module 2504 can implement a component configuration process to configure the programmable devices 128, including the data devices 132 of FIG. 1, as described earlier in this document. The configure components module 2504 can receive the target payload 1420 of FIG. 14 and encrypt it to form the encrypted payload 1422 of FIG. 14 and program the encrypted payload 1422 into the programmable devices 128 using the programmer 112 of FIG. 1. The encryption process can include extracting the incoming root of trust 504 of FIG. 5 from the programmable devices 128 and using the incoming root of trust 504 as part of the encryption process to allow the programmable devices 128 to have the encrypted payload 1422 decrypted only if the incoming root of trust 504 is available to one of the programmable devices 128.

The configure trusted devices module 2506 can implement a trusted devices configuration process to configure the trusted devices 130 including installing other programmable devices 128 into the trusted devices 130, associating security elements with the programmable devices 128 and the trusted devices 130, and transferring the encrypted payload 1422 of FIG. 14 into the programmable devices 128. The trusted devices 130 can include circuit boards for a wide variety of electronic products including smart phones, consumer electronic devices, industrial electronic devices, networking equipment, computers, and other similar devices.

The provisioning module 2508 can implement a provisioning process for the trusted devices 130 by transferring security data and code to the trusted devices 130. The provisioning process can take place during or after the manufacturing stages. The provisioning module 2508 can transfer the information in a variety of ways. For example, the information can be transferred over a network link, via a memory card, over the air using a wireless network link, or a combination thereof.

The device operation module 2510 can implement a variety of operational processes to operate the trusted devices 130 using the information transferred by the previous modules. The device operation module 2510 can implement the use cases described earlier.

The device operation module 2510 can implement a secure boot process as described in the secure boot use case shown in FIG. 16. The secure boot process can boot the trusted devices 130 in a secure manner using the first stage boot loader 1610 of FIG. 16, the second stage boot loader 1616 of FIG. 16, the operating system 1618 of FIG. 16, and the applications, such as the first application 1620 of FIG. 16, the second application 1622 of FIG. 16, the third application 1624 of FIG. 16, and the nth application 1626 of FIG. 16.

The device operation module 2510 can implement a device provisioning process as described in the device provisioning use case shown in FIG. 17. The device operation module 2510 can use the provisioning agent 1704 of FIG. 17 to receive the provisioning information and deploy the information to the trusted device 130.

The device operation module 2510 can implement a tamper detection process as described in the tamper detection use case shown in FIG. 18. The tamper detection process can use the monitoring agent 1804 of FIG. 18 to detect changes in the code and data stored in the trusted devices 130.

The device operation module 2510 can implement an internet of things process as described in the internet of things use case shown in FIG. 19. The internet of things use case can facilitate the communication between the internet of things devices 1912 of FIG. 19 and back end systems.

The device operation module 2510 can implement a security and data programming process as described in the security and data programming use case 2002 of FIG. 20. The security and data programming process can generate security elements based on the device seed 2004 of FIG. 20 and the root key 2010 of FIG. 20. The security elements can include the security kernel, the security boot loader, the device certificate 2014 of FIG. 20, the public device signing key 2006 of FIG. 20, the data encryption public key 2008 of FIG. 20, and other similar security values.

The off device seed use case 2102 of FIG. 21 can implement an off device seed and certificate generation process as described in the off device seed use case 2102 as shown in FIG. 21. The off device and certificate generation process can program security elements into the trusted devices 130 and verify the installation based on the device certificate and the module list.

The second off device seed use case 2102 can implement a second off device seed and certificate generation process as described in the second off device seed use case 2102 as shown in FIG. 21. The second off device and certificate generation process can program security elements into the trusted devices 130 and verify the installation based on the device certificate and the module list.

The second off device seed use case 2102 can implement a second off device seed and certificate generation process as described in the second off device seed use case 2102 as shown in FIG. 21. The second off device and certificate generation process can program security elements into the trusted devices 130 and verify the installation based on the device certificate and the module list.

For example, the provisioning module 2508 can program each of the programmable devices 128, such as the data devices 132, with the files of encrypted payload 1422. The provisioning module 2508 can include specific information for configuring each different device type of the programmable devices 128. The data devices 132 can be coupled to the programmer 112 using the device adapters 208 of FIG. 2.

In another example, the provisioning module 2508 can provision each of the programmable devices 128. It is understood that the programmable devices 128 can include the trusted devices 130, secure objects, smart devices. The trusted devices 130 can include smart phones, circuit boards, security devices, or similar devices. The trusted devices 130 can be coupled to the programmer 112 directly in the device adapters 208, via a data link such as a wired or wireless connection, or a combination thereof.

Provisioning is the installation of the content on the programmable devices 128. For example, provisioning can include copying firmware code, software, data, images, video, or other content onto the programmable devices 128. Provisioning can include securely installing the content onto the programmable devices 128 by authenticating the content before deployment, by storing the content in the secure storage unit 326, encrypting the content on the programmable devices 128, storing the content in a write-once storage area, write protecting the content, or using other secure storage techniques.

In an illustrative example, the secure programming system 100 can establish the identity of each of the programmable devices 128 based on the components used to build the system. For each of the trusted devices 130, such as smart phones or circuit boards, the device identification 302 of FIG. 3 can include serial numbers or other identifiers for each of the components within the trusted devices 130. The identity of the programmable devices 128 can span hardware, software, and/or firmware components.

Because the device identification 302 can include the OEM markers 516 of FIG. 5, the identification can be unique across all manufacturers and vendors. In addition, because the device identification 302 can be encrypted by the secure programming system 100 at manufacturing time, the identity of the programmable devices 128 can be stored securely off the device and on the device using the device identification 302 and the security keys 106 of FIG. 1

Another advantage of the secure programming system 100 is that the system identification 814 of FIG. 8 can be used to provide a higher level of device security. By encoding the programmable devices 128 with an encrypted version of the system identification 814, the programmable devices 128 have a higher level of trust and traceability for the remainder of the lifecycle of each of the programmable devices 128.

Yet another additional advantage of the secure programming system 100 is that the manufacturing supply chain is more secure because the use of the system identification 814 provides a root of trust at the silicon device level. The system identification 814 is programmed into the programmable devices 128 and is based on and includes unique manufacturing data. The system identification 814 allows compromised firmware to be detected because the firmware would not have the system identification 814 available in the proper encrypted form.

The block diagram shows only one of many possible flows for secure programming. Other flows may include fewer, additional, or different elements, in varying arrangements. For example, in some embodiments, the security modules may be omitted, along with any other elements relied upon exclusively by the omitted element(s). As another example, in an embodiment, a flow may further include a hash generation module for calculating a hash value to determine the integrity of the content stored on the programmable device 128.

Figure 26:
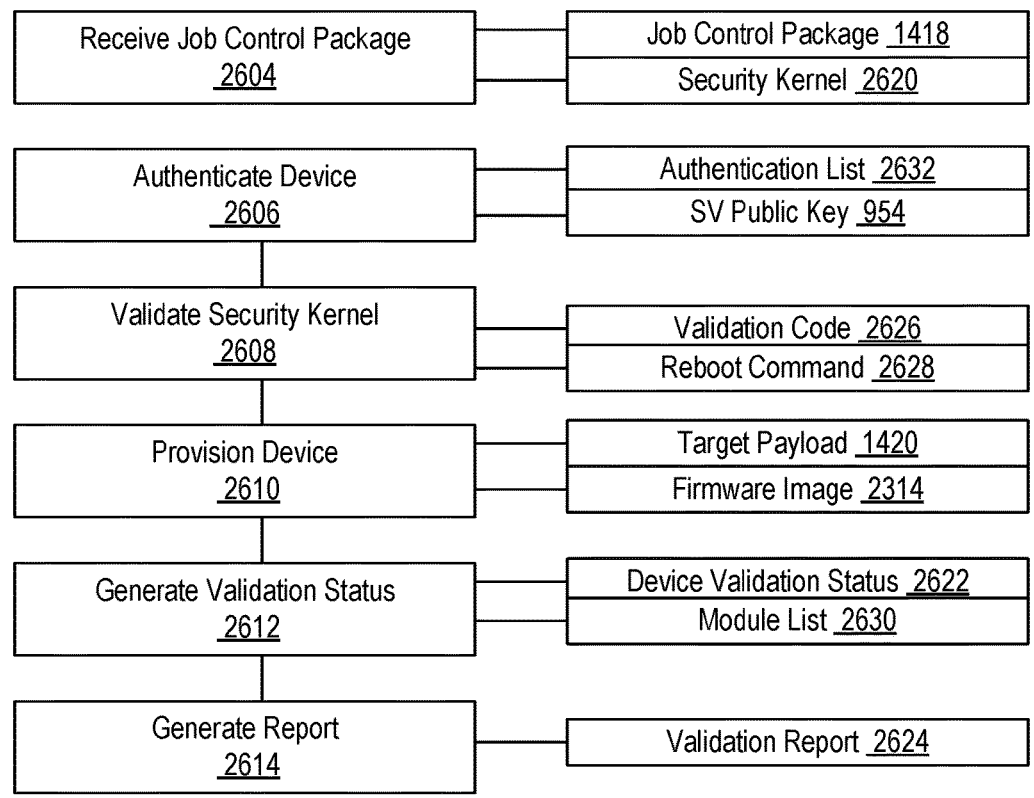
FIG. 26 is an example of a secure programming process flow.

FIG. 26 illustrates a secure programming process flow 2602. The secure programming process flow 2602 can configure the programmable devices 128 with a security kernel 2620, securely install the target payload 914, and then validate the content in the programmable devices 128. The various elements of the secure programming process flow 2602 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The secure programming process flow 2602 can load a set of the programmable devices 128 into the programmer, validate the devices, securely install and validate the security kernel 2620 in the secure storage unit 326 of the programmable devices 128, provision and validate the programmable devices 128 with the target payload 1420, and generate a validation report 2624 for the configured devices. Although the specification refers to programming the programmable devices 128 for clarity, it is understood that this term can include the trusted devices 130, individual chips, and secure systems such as smart phones, device controllers, consumer devices, industrial devices, and other systems.

The secure programming process flow 2602 can have a variety of configuration. For example, the secure programming process flow 2602 can include a receive job control package module 2604, an authenticate device module 2606, a validate security kernel module 2608, a provision device module 2610, a generate validation status module 2612, and a generate report module 2614.

The receive job control package module 2604 can receive the job control package 1418 that defines the parameters of the operations to be performed on the programmable devices 128. The job control package 1418 can be provided from the OEM 2406, a known third party, a user at the programming center 2408, or other trusted sources. The job control package 1418, which can include the programming project 2344, drives the device programming process.

The job control package 1418 can be configured to authorize the programming of a set of the programmable devices 128. The job control package 1418 can be created and authorized by an authorized entity, such as a manufacturer, an OEM, or other entity responsible for authorizing the production of the devices. For example, the job control package 1418 could be create by a consumer product manufacturer who is authorizing the production and programming of devices containing the software to operate their latest products. Limiting the job control package 1418 allows the manufacturer to prevent unauthorized manufacturer of their products, such as smart phones or other intelligent devices.

The job control package 1418 can be configured to limit production to specific programmers, specific locations, or specific secure programming systems. For example, the OEM use can use the OEM development laboratory 1410 to create the job control package 1418. The job control package 1418 can include the target payload 1420 and the security kernel 2620 having the security boot loader 2318.

The job control package 1418 can be completely or partially encrypted to protect the content. The OEM can generate one or more of the key pairs 150 for protecting the job control package 1418 and the target payload 1420. In one example, the key pairs 150 can be generated using the OEM/CA public key infrastructure system 1414 having the certificate management backend 1416. This can include generating the key pairs 150 for the job control package, the target payload 1420, the programmable devices 128, the OEM, and other security entities in the system.

The job control package 1418 and the target payload 1420 can be encrypted and then sent to the secure programming environment 108. The key pairs 150 can be securely transferred to the hardware security module 1404 of the secure programming environment 108. The secure programming environment 108 is a specific configuration of the secure programming system 100 with the appropriate security modules. It is understood that the secure programming environment 108 can include interfacing with the factory management system 2330 to deploy the information to the proper systems.

The job control package 1418 can be securely received by the secure programming system 100 having the programming unit 110, the programmer 112, and the security controller 114. The job control package 1418 can include information about the devices to be programmed including the security kernel 2620, the target payload 1420, security keys, the production count 2348, and other information about the manufacturing job. The secure programming system 100 can be located in the programming center or other manufacturing location.

Secure reception can be performed in a variety of ways. For example, the job control package 1418 can be sent from an authorized user to the secure programming system 100 in encrypted format. Portions or the entirety of the job control package 1418 can be encrypted into an encrypted format using a hardware security module to encrypt the package using public keys associated with one or more of the system, users, entities, or locations related to the secure programming system 100.

The job control package 1418 can be decrypted by the secure programming system 100 using a private key associated with the secure programming system 100, such as the programmer private key, an OEM private key, the private key of the target manufacturing facility, or other similar encryption key. The secure programming system 100 can use the security controller 114, such as the hardware security module 1404, to perform cryptographic functions using enhanced hardware and software features to improve performance.

In another example, secure reception can be performed by physically delivering the content to the secure programming system 100 in a protected way. This could include delivering the content on a protected physical media, using dedicated network links, or other physical security techniques.

The security kernel 2620 is a device specific software or firmware module that can be deployed to the secure storage unit 326 and can be used to securely operate the programmable devices 128. The security kernel 2620 can be implemented in different ways, such as a security boot loader, a first boot loader, a secure operating system, or other secure system. The security kernel 2620 can be executed in the secure execution unit 324 on the programmable devices 128.

The job control package 1418 can include the security kernel 2620 and the target payload 1420 as encrypted content targeted for a specific OEM, factory, user, programmer 112, or secure programming system 100. For example, the security kernel 2620 can be included in the job control package 1418 in a format encrypted using the public key of the programmer 112 at a specific factory location. Once the job control package 1418 is received by the secure programming system 100, the security kernel 2620 can be extracted and decrypted using the internal private key of the programmer 112. The private key can be different for each particular one of the programmer 112 to allow targeted deployment to a particular unit for security reasons. Encrypting the security kernel 2620 and targeting a particular system or user prevents any other systems from using the security kernel 2620 in the job control package 1418. This can control unauthorized manufacture or distribution of the content.

In an illustrative example, the security kernel 2620 can be executed when the programmable devices 128 is booted, initialized, or powered up. The system is configured such that when the system is started, only the security kernel 2620 can be executed. The security kernel 2620 can be executed in a secure mode to prevent tampering or outside interference.

The target payload 1420 includes the content to be installed in the programmable devices 128. For example, the target payload 1420 can include firmware images, security information, data, and other content. The target payload 1420 can include content that is encrypted, signed with a security key, unencrypted, or partially encrypted.

Once the job control package 1418 has been received by the secure programming system 100, it can be processed by the programming unit 110 and the security controller 114. For example, the security controller 114 can decrypt the encrypted portions of the target payload 1420, verify digital signatures, and generate additional keys and device certificates.

In another example, the programming unit 110 can merge the content of the target payload 1420 with the security kernel 2620 to form a combined module for secure execution. Alternatively, the programming unit 110 and the security controller 114 can generate custom data to support the secure operation of the programmable devices 128.

The job control package 1418 can include data and instructions to limit the execution of the information in the job control package 1418 to a particular OEM, contract manufacturer, factory, programming center, programming system, or programmer. For example, the job control package 1418 can limit the execution of the production run to only a system that can authenticate using the OEM public key 2362 linked to the OEM certificate 2351 provided in the job control package 1418. After the receive job control package module 2604 has been completed, the control flow can be transferred to the authenticate device module 2606.

The authenticate device module 2606 can load a set of the programmable devices 128 into the programmer 110 and authenticate the devices. The authenticate device module 2606 can operate to prevent the use of unauthorized devices in a production run by detecting unauthorized devices and preventing the programming of such devices.

The job control package 1418 can include an authentication list 2632 to identify the set of the programmable devices 128 to be programmed. The authentication list 2632 is a data structure describing the devices authorized to be programmed.

The authentication list 2632 can be implemented in a variety of ways. For example, the authentication list 2632 can be a set of serial numbers or other device identifiers. The authentication list 2632 can also be a range of identifier values that can be used to identify the individual programmable devices, the silicon manufacturer or vendor, the type of devices, or a combination thereof. In another example, the authentication list 2632 can include structured data, such as a data structure having pairs of data items including the silicon vendor identifier 2356 and the serial number markers 512 for each of the authorized devices.

The authentication list 2632 can be used to limit the manufacture of the programmable devices 128. The authenticate device module 2606 can compare the serial number of the programmable device 128 to the serial numbers in the authentication list 2632. If the serial number, or other identifier, of the programmable device 128 matches an entry in the authentication list 2632, then the device can be programmed. If the serial number does not match an entry in the authentication list 2632, then the programmable devices 128 can be invalidated. Invalidation means that the devices are identified as unusable devices.

The programmable device 128 can be invalidated in a variety of ways. For example, the programmer 112 can overwrite the data in the programmable device 128 with blank or invalid data. The programmer 112 can move the programmable device 128 to a disposal bin. The programmer 112 can write an invalid status to the programmable device 128, such as in a secure storage area, to invalidate the device. The programmer 112 can program the programmable device 128 with an invalidation code to invalidate the device. It is understood that the programmable devices 128 can implement in differ ways based on the specific hardware configuration of the system.

Loading the programmable devices 128 can include mounting the programmable devices 128 in an adapter on the programmer 112 such that the programmer 112 can perform programming operations on the programmable devices 128. The programmable device 128 can be mounted in the destination sockets 210 of the device adapters 208. The programmable devices 128 can be received from the input device receptacle 206, a component tray, a device feeder, a bin, or other device source.

The authenticate device module 2606 can retrieve secure information, such as the silicon vendor device certificate 2326 or the OEM device certificate 2346, from the programmable devices 128 and authenticate the device by authenticating against the silicon vendor public key 2354 or the OEM public key 2362, respectively. The secure information can also include the serial number markers 512, the incoming root of trust 504, the firmware markers 506, the manufacturing markers 510, the product markers 508, the OEM markers 516, the operating markers 514, key pairs 150, or other similar information.

The authenticate device module 2606 can log the authentication status information into the device data tracking system 2334 to track the status of the devices. After the authenticate device module 2606 has been completed, the control flow can be transferred to the validate security kernel module 2608.

The validate security kernel module 2608 can program the security kernel 2620 into the programmable device 128 and then validate the proper operation of the security kernel 2620 within the programmable device 128 reboot or initialize the programmable device 128 to initiate the execution of the security kernel 2620 on the programmable device 128. Once the security kernel 2620 is operating, the programmer 112 can communicate with the kernel and verify that it is operating properly and installed on an authorized device.

The security kernel 2620 can be securely stored on the programmable device 128. For example, the security kernel 2620 can be stored in the secure storage unit 326, as an encrypted file in the data storage area, as a unencrypted file, or a combination thereof. The security kernel 2620 can include a calculated hash value that can be used to verify file integrity on startup, during operation, or during storage.

The security kernel 2620 can provide a validation code 2626 to show that it is operating properly. The validation code 2626 is a data or code element that can identify the security kernel 2620 executing on the programmable device 128. The validation code 2626 can be sent directly at boot time, in response to a request, be available for retrieval from the secure storage unit 326, or a combination thereof. The validation code 2626 can have a variety of forms including a device certificate, a public key encoded value, a signed value, a device identifier, a serial number, and identification token, a dynamic value, or other similar values.

The secure programming system 100 can customize the security kernel 2620 to limit operation to a particular device. For example, the security kernel 2620 can be configured to only execute on the programmable device 128 with a pre-defined serial number. This would prevent the security kernel 2620 from operating on an unauthorized device. The modification of the security kernel 2620, or any other modified security-related code, can performed by the security controller 114 to verify the integrity of the new version of the security kernel 2620.

In an example, the programmer 112 of the programming unit 110 can send a reboot command 2628 to the security kernel 2620 on the programmable device 128 to initiate a device system reboot to start executing the security kernel 2620. The programmer 112 can then request the validation code 2626 from the security kernel 2620.

Rebooting the programmable device 128 in place in the programmer 112 reduces the amount of time needed to validate the security kernel 2620. It can also provide a high level of security by supporting live authentication of the security kernel 2620 while it is executing on the programmable device 128.

After the device has rebooted, the validate security kernel module 2608 can then retrieve the validation code 2626 and authenticate the validation code 2626 in a secure manner in the programming unit 110. In an illustrative example, the programming unit 110 can pass the validation code 2626 to the security controller 114, such as a hardware security module having dedicated cryptographic processing hardware, and then cryptographically authenticate the validation code 2626 using a signing code or security keys stored in the programming unit 110. The first security module 116 of the programming unit 110 can be the authentication system module having code and data to authenticate the validation code 2626 of the first data device 134.

The security kernel 2620 can provide the logic to generate the validation code 2626 in a variety of ways. The security kernel 2620 can activate after the programmable device 128 receives the reboot command and executes the security kernel 2620 in the secure execution unit 324. The security kernel 2620 can provide the validation code 2626 by retrieving the code from the secure storage unit 326, calculating the validation code 2626 in the secure execution unit 324, calculating the validation code 2626 using the security controller 114 of the programming unit 110, or other similar secure techniques.

In an illustrative embodiment, the security kernel 2620 can execute the security algorithm 304 to provide the logic to generate the validation code 2626. The security algorithm 304 can be a programmable code object that can execute on the programmable device 128, such as on the secure execution unit 324. Because the security algorithm 304 can be configured to execute only on the programmable device 128, it can generate the validation code 2626 based on security elements available within the secure storage unit 326.

In another example, after the reboot the security kernel 2620 can retrieve the validation code 2626, such as preprogrammed data element, that is stored in the secure storage unit 326 and send it to the programmer 112. The validation code 2626 can include the device certificate 2014, the silicon vendor device certificate 2326, the OEM device certificate 2346, or a similar identifying data object.

In yet another example, the security kernel 2620 can validate an identification value received from the secure programming system 100 and generate the validation code 2626 based on the identification value. The identification value can be the programmer identification, the system identification, the OEM identification, the identification token 624, the cryptographic token 626, or other identity value.

In another embodiment, the security kernel 2620 can be configured to initialize the security environment of the programmable device 128 the first time the device is booted. This can support the creation of the validation code 2626 and other security elements by the programmable device 128. Creating the security elements within the programmable device 128 increases the level of security by minimizing outside influences and access. The security elements can be created internal to the programmable device 128 and not be exposed outside the device.

When the programmable device 128 is booted the first time, the security kernel 2620 can include the software agent 1116, such as a boot time identifier read agent, that can execute in the secure execution unit 324 of the programmable device 128 and generate additional identification and security elements that can be stored in the secure storage unit 326. These additional identification elements can include the board root of trust 1106, updates to the device identification 302, the outgoing root of trust 1006, the device certificate or other security identification values.

For example, the secure programming system 100 can configure a target system, such as a circuit board with the programmable device 128 on the board. Then the software agent 1116 can read the component root of trust 1104 associated with the programmable device 128 and generate the board root of trust 1106 for the board or system. This can be the case when the target systems are smart phones, media boxes, or other complex systems. Thus, the board root of trust 1106 is directly linked with each of the component root of trust 1104 of the devices used to manufacture the board. The board root of trust 1106 is generated when the programmable device 128 is installed on the board is rebooted to generate the security information. The validation code 2626 can then be generated based on the component root of trust 1104, the board root of trust 1106, or other on-board security elements.

The programming unit 110 having the programmer 112 can be configured to support the rebooting of the programmable device 128. The programmer 112 can interface with the programmable device 128 to provide power, clock signals, actual or simulated data and control inputs, and other mechanical and electrical inputs required for proper operation. The programming unit 110 can use the security modules to provide the necessary logic and control needed to successfully reboot the programmable device 128 in place. Thus, the programming unit 110 and the programmer 112 can support rebooting the programmable device 128 and validating proper operation.

The programming unit 110 can use the security controller 114 to authenticate the validation code 2626 to verify that the security kernel 2620 has been properly installed on the programmable device 128. In one embodiment, the security kernel 2620 can return a signed device certificate, such as the silicon vendor device certificate 2326 or the OEM device certificate 2346, and then authenticate the device certificate with the correct public key to validate the operation of the security kernel 2620. It is understood that a silicon vendor and a silicon manufacturer can be the same or similar entities.

Once the security kernel 2620 has been validated, the status of the programmable device 128 can be logged by the system and the device is ready to be provisioned. After the validate security kernel module 2608 has been completed, the control flow can be transferred to the provision device module 2610.

The provision device module 2610 can install the target payload 1420 of the job control package 1418 onto the programmable devices 128. After the programmable device 128 and the security kernel 2620 have been verified and authenticated, the provision device module 2610 can program the devices with the content of the target payload 1420.

Provisioning the device can include decrypting encrypted content in the target payload 1420 before installing it on the programmable device 128. For example, the target payload 1420 can include firmware to be installed in the secure storage unit 326, images, video, software, data, security information, data, and other content.

The target payload 1420 can include content that is encrypted and signed with a security key. In one example, the security key can be linked to the validation code 2626 of the security kernel 2620. The programming unit 110 can use the security features of the security controller 114 to authenticate and decrypt the encrypted content of the target payload 1420. The security controller 114 can be a hardware and/or software module configured for high performance security operations.

The target payload 1420 can include utility and security software to be used by the programmable devices 128. For example, the target payload 1420 can include software for the identification module 316, the cryptography module 318, the authentication module 320, and the code signing module 322. The modules can also include the security algorithms 1504 to perform specific security tasks.

In an alternative remote provisioning embodiment, the programmable device 128 can be provisioned remotely over a network link using a remote provisioning service, such as the device provisioning service 2338, the firmware update service 2312, or a similar provisioning service feature. The programmable device 128 can include the provisioning agent 1704 to securely receive the target payload 1420 and then deploy the content of the target payload to the programmable device 128. The programmable device 128 can also include the monitoring agent 1804 to verify that the internal security keys are valid for the content of the target payload 1420.

The device data and tracking system 2334 can log the provisioning of the devices. After the provision device module 2610 has been completed, the control flow can be transferred to the generate validation status module 2612.

The generate validation status module 2612 can validate the programmable devices 128 after it has been provisioned. The generate validation status module 2612 can retrieve information about the programmable devices 128 via the programming unit 110 having the programmer 112 and the security controller 114. The generate validation status module 2612 can generate a device validation status 2622 to indicate if the programmable device 128 has been provisioned correctly.

The device validation status 2622 can be determined in a variety of ways. For example, the device validation status 2622 can have a true value when a module list 2630 in the job control package 1418 matches the list of object and modules in the programmable devices 128. In another example, the device validation status 2622 can be set based on the validation of a hash value calculated for the content of the programmable device 128. The device validation status 2622 can be set based on another status value provided by the security kernel 2620. After the generate validation status module 2612has been completed, the control flow can be transferred to the generate report module 2614.

The generate report module 2614 can generate a validation report 2624 on the status of the provisioning of the programmable device 128. The validation report 2624 can be based on each individual programmable device 128 or the set of devices being programmed.

Based on the validation report 2624, the programming unit 110 can instruct the programmer 112 to invalidate the programmable devices 128 that do not pass validation. The programmer 112 can physically move the invalid devices to a disposal station or mark the devices as invalid.

The validation report 2624 can also be sent to the factory management system 2330 for distribution to other system to identify the programmable devices 128 and their device validation status 2622. The information of the validation report 2624 can be used to detect the inappropriate use of the programmable devices 128, such as the existence of counterfeit devices, duplicate devices, invalid devices, and other similar device conditions.

Other examples of these and other embodiments are found throughout this disclosure.

4.0. Example Embodiments

Examples of some embodiments are represented, without limitation, in the following clauses and use cases:

According to an embodiment, a method of operation of a secure programming system comprises receiving a job control package having a security kernel and a target payload, installing the security kernel in a programmable device mounted in a programmer, rebooting the programmable device in the programmer by activating the security kernel, validating the security kernel of the programmable device based on a validation code, and provisioning the programmable device with the target payload.

In an embodiment, the method further comprises rebooting the programmable device includes sending a reboot command to the programmable device mounted in the programmer.

In an embodiment, the method further comprises retrieving a silicon vendor device certificate from the programmable device, extracting a silicon vendor public key from the target payload, generating the validation code by authenticating the silicon vendor device certificate with the silicon vendor public key, extracting an identification token from the silicon vendor device certificate, the identification token encrypted by the silicon vendor device public key, and authenticating the identification token using a silicon vendor device private key.

According to an embodiment, a method of operation of a secure programming system comprises receiving a job control package at a programmer, the job control package having a target payload, mounting a programmable device in the programmer, generating a device certificate for the programmable device, the device certificate having an authentication key and a decryption key, embedding the device certificate into a secure storage unit of the programmable device, encrypting the target payload using an encryption key linked to the decryption key, and provisioning the programmable device with an encrypted payload having the target payload.

In an embodiment, the method further comprises generating the device certificate includes generating the device certificate having a device identification of the programmable device.

In an embodiment, the method further comprises receiving an encrypted payload in the target payload, decrypting the encrypted payload with a decryption key, and installing the encrypted payload in an unencrypted format into the programmable device.

In an embodiment, the method further comprises receiving an encrypted payload in the target payload, the encrypted payload encrypted with a signing key, and verifying the encrypted payload with a verification key linked with the signing key.

According to an embodiment, a secure programming system comprises a programming unit configured to receive a job control package having a security kernel and a target payload, a programmer of the programming unit configured to install the security kernel in a programmable device mounted in the programmer, reboot the programmable device in the programmer by activating the security kernel, and provision the programmable device with the target payload, and a security controller of the programming unit configured to validate the security kernel of the programmable device based on a validation code received from the security kernel after rebooting.

In an embodiment, the system further comprises the programmer configured to send a reboot command to the programmable device mounted in the programmer.

In an embodiment, the system further comprises the programmer configured to retrieve a silicon vendor device certificate from the programmable device, and the security controller configured to extract a silicon vendor public key from the target payload, to generate the validation code by authenticating the silicon vendor device certificate with the silicon vendor public key, to extract an identification token from the silicon vendor device certificate, the identification token encrypted by the silicon vendor device public key, and to authenticate the identification token using a silicon vendor device private key.

In an embodiment, the system further comprises the security controller configured to extract a firmware image from the target payload and to decrypt the firmware image, and the programmer configured to copy the firmware image to the programmable device.

In an embodiment, the system further comprises the programming unit includes the security controller configured to calculate a device validation status based on a module list of the programmable device matching another module list of the target payload and configured to insert the device validation status into a validation report.

In an embodiment, the system further comprises the programming unit configured to receive the security kernel in an encrypted format in the job control package, the security controller configured to decrypt the security kernel with a public key pre-loaded in a programming unit, and the programmer configured to install the security kernel in an unencrypted format into the programmable device.

In an embodiment, the system further comprises a hardware security module outside the programming unit configured to encrypt the security kernel with a programmer public key, an OEM public key, or a silicon vendor public key and to form the job control package with the security kernel in an encrypted format.

According to an embodiment, one or more non-transitory computer-readable media storing instructions that, when executed by one or more computing devices, cause receiving a job control package having a security kernel and a target payload, installing the security kernel in a programmable device mounted in a programmer, rebooting the programmable device in the programmer by activating the security kernel, validating the security kernel of the programmable device based on a validation code, and provisioning the programmable device with the target payload.

In an embodiment, the non-transitory computer-readable media further comprises rebooting the programmable device includes sending a reboot command to the programmable device mounted in the programmer.

In an embodiment, the non-transitory computer-readable media further comprises retrieving a silicon vendor device certificate from the programmable device, extracting a silicon vendor public key from the target payload, generating the validation code by authenticating the silicon vendor device certificate with the silicon vendor public key, extracting an identification token from the silicon vendor device certificate, the identification token encrypted by the silicon vendor device public key, and authenticating the identification token using a silicon vendor device private key.

In an embodiment, the non-transitory computer-readable media further comprises extracting a firmware image from the target payload, decrypting the firmware image, and copying the firmware image to the programmable device.

In an embodiment, the non-transitory computer-readable media further comprises calculating a device validation status based on a module list of the programmable device matching another module list of the target payload, and inserting the device validation status into a validation report.

In an embodiment, the non-transitory computer-readable media further comprises receiving the security kernel in an encrypted format in the job control package, decrypting the security kernel with a public key pre-loaded in a programming unit, and installing the security kernel in an unencrypted format into the programmable device.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 27:
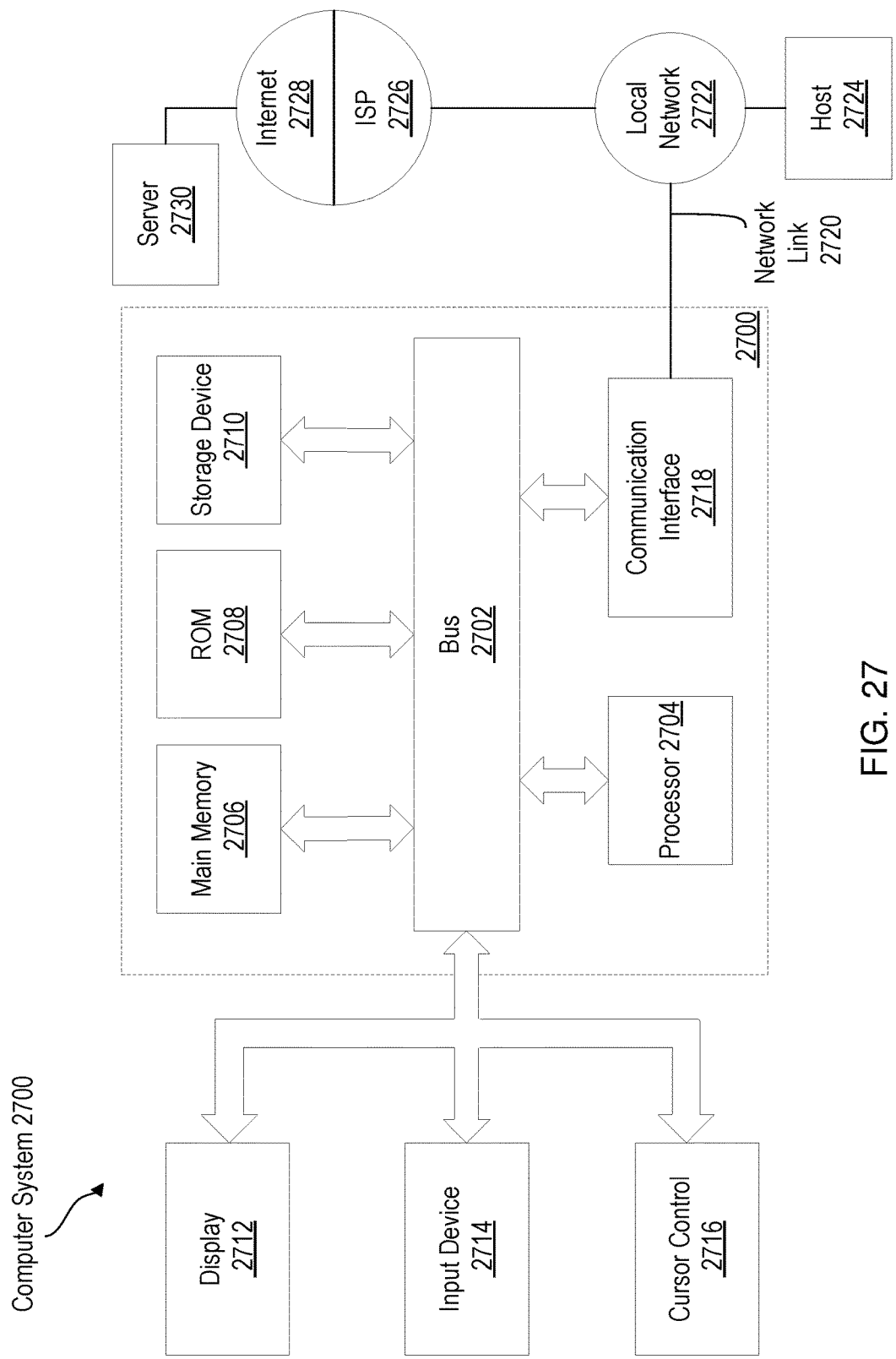
FIG. 27 is block diagram of a computer system upon which embodiments of the invention may be implemented.

FIG. 27 illustrates a block diagram that showing a computer system 2700 utilized in implementing the above-described techniques, according to an embodiment. Computer system 2700 may be, for example, a desktop computing device, laptop computing device, tablet, smartphone, server appliance, computing mainframe, multimedia device, handheld device, networking apparatus, or any other suitable device.

Computer system 2700 includes one or more busses 2702 or other communication mechanism for communicating information, and one or more hardware processors 2704 coupled with busses 2702 for processing information. Hardware processors 2704 may be, for example, a general purpose microprocessor. Busses 2702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 2700 also includes a main memory 2706, such as a random access memory (RAM) or other dynamic or volatile storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 into a special-purpose machine that is customized to perform the operations specified in the instructions.

Computer system 2700 further includes one or more read only memories (ROM) 2708 or other static storage devices coupled to bus 2702 for storing static information and instructions for processor 2704. One or more storage devices 2710, such as a solid-state drive (SSD), magnetic disk, optical disk, or other suitable non-volatile storage device, is provided and coupled to bus 2702 for storing information and instructions.

Computer system 2700 may be coupled via bus 2702 to one or more displays 2712 for presenting information to a computer user. For instance, computer system 2700 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 2712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 2712.

In an embodiment, output to display 2712 may be accelerated by one or more graphics processing unit (GPUs) in computer system 2700. A GPU may be, for example, a highly parallelized, multi-core floating point processing unit highly optimized to perform computing operations related to the display of graphics data, 3D data, and/or multimedia. In addition to computing image and/or video data directly for output to display 2712, a GPU may also be used to render imagery or other video data off-screen, and read that data back into a program for off-screen image processing with very high performance. Various other computing tasks may be off-loaded from the processor 2704 to the GPU.

One or more input devices 2714 are coupled to bus 2702 for communicating information and command selections to processor 2704. One example of an input device 2714 is a keyboard, including alphanumeric and other keys. Another type of user input device 2714 is cursor control 2716, such as a mouse, a trackball, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane. Yet other examples of suitable input devices 2714 include a touch-screen panel affixed to a display 2712, cameras, microphones, accelerometers, motion detectors, and/or other sensors. In an embodiment, a network-based input device 2714 may be utilized. In such an embodiment, user input and/or other information or commands may be relayed via routers and/or switches on a Local Area Network (LAN) or other suitable shared network, or via a peer-to-peer network, from the input device 2714 to a network link 2720 on the computer system 2700.

A computer system 2700 may implement techniques described herein using customized hard-wired logic, one or more ASICs or FPGAs, firmware and/or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2710. Volatile media includes dynamic memory, such as main memory 2706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 2700 can receive the data on the network and demodulate the signal to decode the transmitted instructions. Appropriate circuitry can then place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

A computer system 2700 may also include, in an embodiment, one or more communication interfaces 2718 coupled to bus 2702. A communication interface 2718 provides a data communication coupling, typically two-way, to a network link 2720 that is connected to a local network 2722. For example, a communication interface 2718 may be an integrated services digital network (ISDN) card, cable modem, satellite modem, or a modem to provide a data communication connection to a corresponding type of telephone line. As another example, the one or more communication interfaces 2718 may include a local area network (LAN) card to provide a data communication connection to a compatible LAN. As yet another example, the one or more communication interfaces 2718 may include a wireless network interface controller, such as an 802.11-based controller, Bluetooth controller, Long Term Evolution (LTE) modem, and/or other types of wireless interfaces. In any such implementation, communication interface 2718 sends and receives electrical, electromagnetic, or optical signals that carry digital data streams representing various types of information.

Network link 2720 typically provides data communication through one or more networks to other data devices. For example, network link 2720 may provide a connection through local network 2722 to a host computer 2724 or to data equipment operated by a Service Provider 2726. The Service Provider 2726, which may for example be an Internet Service Provider (ISP), in turn provides data communication services through a wide area network, such as the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are example forms of transmission media.

In an embodiment, computer system 2700 can send messages and receive data, including program code and/or other types of instructions, through the network(s), network link 2720, and communication interface 2718. In the Internet example, a server 2730 might transmit a requested code for an application program through Internet 2728, the Service Provider 2726, local network 2722 and communication interface 2718. The received code may be executed by hardware processors 2704 as it is received, and/or stored in storage device 2710, or other non-volatile storage for later execution. As another example, information received via a network link 2720 may be interpreted and/or processed by a software component of the computer system 2700, such as a web browser, application, or server, which in turn issues instructions based thereon to a hardware processor 2704, possibly via an operating system and/or other intermediate layers of software components.

In an embodiment, some or all of the systems described herein may be or comprise server computer systems, including one or more computer systems 2700 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a secure programming system comprising:
    retrieving a job control package having a security kernel, an authentication list, and a target payload;
    coupling a programmer to a provisioning agent of a programmable device over a wireless connection;
    deploying the target payload to the programmable device;
    initiating a provisioning operation in the provisioning agent over the wireless connection, the provisioning operation validates and installs the target payload in the programmable device, and deploys the security kernel to the programmable device;
    receiving an authentication value from the provisioning agent executing in a secure execution unit of the programmable device indicating the target payload is installed in the programmable device, and the programmable device is authenticated based on the authentication list.

2. The method as claimed in claim 1, wherein initiating the provisioning operation includes sending a reboot command to the programmable device over the wireless connection.

3. The method as claimed in claim 1, wherein initiating the provisioning operation includes:
    sending a reboot command to the provisioning agent to execute the security kernel.

4. The method as claimed in claim 1, wherein deploying the target payload includes:
    deploying an encrypted payload; and
    decrypting the encrypted payload using a security key in a device certificate of the programmable device.

5. The method as claimed in claim 1, wherein deploying the target payload includes sending the target payload to the provisioning agent of the programmable device over the wireless connection.

6. The method as claimed in claim 1, wherein initiating the provisioning operation includes sending a provisioning command to the provisioning agent of the programmable device over the wireless connection.

7. The method as claimed in claim 1, wherein receiving the authentication value includes calculating the authentication value based on a device identification from the programmable devices matching another device identification from the authentication list.

8. An apparatus comprising:
a programming unit configured to retrieve a job control package having a security kernel, an authentication list, and a target payload;
a programmer of the programming unit configured to couple the programmer to a provisioning agent of a programmable device over a wireless connection, configured to deploy the target payload to the programmable device, configured to initiate a provisioning operation in the provisioning agent over the wireless connection with the provisioning operation configured to validate and install the target payload in the programmable device, and deploy the security kernel to the programmable device, and configured to receive an authentication value from the provisioning agent executing in a secure execution unit of the programmable device indicating the target payload is installed in the programmable device, and the programmable device is authenticated based on the authentication list.

9. The system as claimed in claim 8, wherein the programmer is configured to send a reboot command to the programmable device over the wireless connection.

10. The system as claimed in claim 8, wherein the programmer is configured to send a reboot command to the provisioning agent to execute the security kernel.

11. The system as claimed in claim 8, wherein the program is configured to deploy an encrypted payload, and decrypt the encrypted payload using a security key in a device certificate of the programmable device.

12. The system as claimed in claim 8, wherein the programmer is configured to send the target payload to the provisioning agent of the programmable device over the wireless connection.

13. The system as claimed in claim 8, wherein the programmer is configured to send a provisioning command to the provisioning agent of the programmable device over the wireless connection.

14. The system as claimed in claim 8, wherein the programmer is configured to receive the authentication value based on a device identification from the programmable devices matching another device identification from the authentication list.

15. One or more non-transitory computer-readable media storing instructions that, when executed by one or more computing devices, cause:
retrieving a job control package having a security kernel, an authentication list, and a target payload;
coupling a programmer to a provisioning agent of a programmable device over a wireless connection;
deploying the target payload to the programmable device;
initiating a provisioning operation in the provisioning agent over the wireless connection, the provisioning operation validates and installs the target payload in the programmable device, and deploys the security kernel to the programmable device;
receiving an authentication value from the provisioning agent executing in a secure execution unit of the programmable device indicating the target payload is installed in the programmable device, and the programmable device is authenticated based on the authentication list.

16. The one or more non-transitory computer-readable media of claim 15, wherein initiating the provisioning operation includes sending a reboot command to the programmable device over the wireless connection.

17. The one or more non-transitory computer-readable media of claim 15, wherein initiating the provisioning operation includes:
sending a reboot command to the provisioning agent to execute the security kernel.

18. The one or more non-transitory computer-readable media of claim 15, wherein deploying the target payload includes:
deploying an encrypted payload; and
decrypting the encrypted payload using a security key in a device certificate of the programmable device.

19. The one or more non-transitory computer-readable media of claim 15, wherein deploying the target payload includes sending the target payload to the provisioning agent of the programmable device over the wireless connection.

20. The one or more non-transitory computer-readable media of claim 15, wherein initiating the provisioning operation includes sending a provisioning command to the provisioning agent of the programmable device over the wireless connection.

* * * * *